US010008916B2

(12) United States Patent
Holcomb

(10) Patent No.: US 10,008,916 B2
(45) Date of Patent: Jun. 26, 2018

(54) HIGH EFFICIENCY AC DC ELECTRIC MOTOR, ELECTRIC POWER GENERATING SYSTEM WITH VARIABLE SPEED, VARIABLE POWER, GEOMETRIC ISOLATION AND HIGH EFFICIENCY CONDUCTING ELEMENTS

(71) Applicants: REDEMPTIVE TECHNOLOGIES, LIMITED, Road Town, Tortola (VG); Robert Ray Holcomb, Road Town, Tortola (VG)

(72) Inventor: Robert Ray Holcomb, Sarasota, FL (US)

(73) Assignee: Redemptive Technologies Ltd, Tortola (VG)

( * ) Notice: Subject to any disclaimer, the term of this patent is extended or adjusted under 35 U.S.C. 154(b) by 443 days.

(21) Appl. No.: 14/402,007

(22) PCT Filed: May 21, 2013

(86) PCT No.: PCT/IB2013/054184
§ 371 (c)(1),
(2) Date: Nov. 18, 2014

(87) PCT Pub. No.: WO2013/171728
PCT Pub. Date: Nov. 21, 2013

(65) Prior Publication Data
US 2015/0145364 A1      May 28, 2015

Related U.S. Application Data

(60) Provisional application No. 61/688,669, filed on May 18, 2012, provisional application No. 61/688,668, (Continued)

(30) Foreign Application Priority Data

Dec. 13, 2012  (WO) ................ PCT/US2012/069449

(51) Int. Cl.
*H02K 16/00* (2006.01)
*H02K 53/00* (2006.01)
*H02K 21/02* (2006.01)

(52) U.S. Cl.
CPC ............. *H02K 53/00* (2013.01); *H02K 16/00* (2013.01); *H02K 21/029* (2013.01)

(58) Field of Classification Search
CPC ....... H02K 53/00; H02K 21/029; H02K 16/00
(Continued)

(56) References Cited

U.S. PATENT DOCUMENTS

| 7,567,006 B2 * | 7/2009 | Ichiyama | ............. H02K 21/028 310/156.48 |
| 7,608,967 B2 | 10/2009 | Durham et al. | |

(Continued)

FOREIGN PATENT DOCUMENTS

| GB | 2271025 A | * | 3/1994 | ............. H02K 16/04 |
| WO | WO 02091548 A1 | * | 11/2002 | ............. H02K 16/04 |

(Continued)

OTHER PUBLICATIONS

International Preliminary Report on Patentability for PCT/IB2013/054184 dated Sep. 12, 2014.
(Continued)

*Primary Examiner* — Alex W Mok
(74) *Attorney, Agent, or Firm* — Hoyng Rock Monegier LLP; David P. Owen

(57) ABSTRACT

A method and apparatus for reducing electromagnetic drag in an electric machine may include a laminated stator having wire slots disposed around the inner periphery spaced into sectors separated by a pole iron support structure. The slots contain induction windings. A series of wound lateral pole irons may be arranged around the inner periphery of the stator, the first ends of which extend into the slots in the
(Continued)

sectors. A support structure supports the lateral pole irons by forming a circular opening concentric with the inner periphery of the stator, A rotor may be inserted into the circular opening of the lateral pole iron support structure and supported at the stator lateral pole iron ends by a support means. A plurality of rotor inserts may contain free-wheeling permanent magnet inserts spaced along an outer periphery of the rotor. The rotor may be inserted into the circular opening of the lateral pole iron support structure and the free-wheeling permanent magnet inserts may be inserted into cavities along the outer periphery of the rotor.

34 Claims, 71 Drawing Sheets

Related U.S. Application Data filed on May 18, 2012, provisional application No. 61/852,304, filed on Mar. 15, 2013.

(58) Field of Classification Search
USPC ..................................... 310/113; 74/DIG. 9
See application file for complete search history.

(56) References Cited

U.S. PATENT DOCUMENTS

| | | | |
|---|---|---|---|
| 2009/0026864 A1* | 1/2009 | Ichiyama | H02K 21/028 310/154.28 |
| 2011/0221298 A1 | 9/2011 | Calley et al. | |

FOREIGN PATENT DOCUMENTS

| | | | | |
|---|---|---|---|---|
| WO | WO 02099954 A1 * | 12/2002 | | H02K 16/04 |
| WO | 2010079422 A1 | 7/2010 | | |
| WO | 2010079424 A1 | 7/2010 | | |
| WO | 2011048463 A1 | 4/2011 | | |
| WO | 2011048464 A1 | 4/2011 | | |
| WO | 2011067636 A1 | 6/2011 | | |
| WO | 2011098859 A1 | 8/2011 | | |
| WO | 2013090539 A1 | 6/2013 | | |

OTHER PUBLICATIONS

International Search Report and Written Opinion for International Application No. PCT/IB2013/054184, dated Feb. 24, 2014.

* cited by examiner

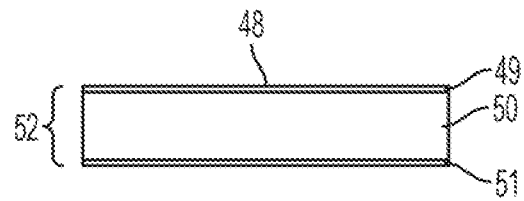
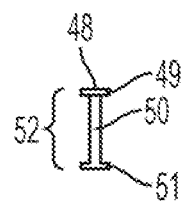
FIG. 12A
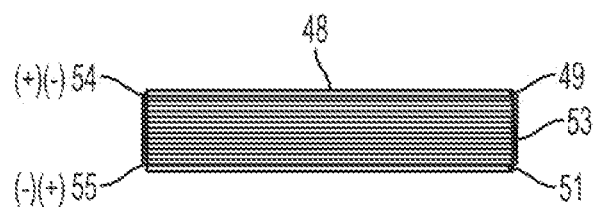
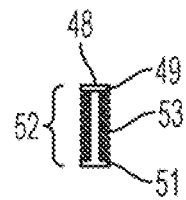
FIG. 12B

HIGH EFFICIENCY AC DC ELECTRIC MOTOR, ELECTRIC POWER GENERATING SYSTEM WITH VARIABLE SPEED, VARIABLE POWER, GEOMETRIC ISOLATION AND HIGH EFFICIENCY CONDUCTING ELEMENTS

FIELD

The disclosed invention relates to a high efficiency electric motor and generator which can operate at variable speeds and using various types of electric power input. More particularly, the present invention is related to configuration of components of an electric machine including construction of poles, shielding, geometric configuration, use of superconductive materials, and specialty materials in coils in the stator and rotor to reduce electromagnetic drag from the magnetic reaction force created by the load current which opposes the rotation of the armature.

CROSS REFERENCE TO RELATED APPLICATIONS

The present application claims priority to International Application No. PCT/US2012/069449 HIGH EFFICIENCY ELECTRIC GENERATOR WITH ELECTRIC MOTOR FORCES filed Dec. 13, 2012, which claims priority from U.S. Provisional Application No. 61/630,600 filed Dec. 15, 2011, the contents of both of which are incorporated herein by reference. The present application further claims priority to: U.S. Provisional Application No. 61/688,668, entitled HIGH EFFICIENCY VARIABLE SPEED VARIABLE POWER INPUT ELECTRIC MOTOR AND APPLICATIONS, filed May 18, 2012; U.S. Provisional Application No. 61/688,669, entitled ELECTRIC POWER GENERATING SYSTEM FOR GENERATION OF ALTERNATING CURRENT (AC) AND/OR DIRECT CURRENT (DC) AND APPLICATIONS, filed May 18, 2012; and U.S. Provisional Application No. 61/852,304, entitled ELECTRIC POWER GENERATING SYSTEM UTILIZING A UNIQUE STATOR, ROTORS, WINDING AND SHIELDING MECHANISMS ALONG WITH SUPERCONDUCTIVE COILS AND GRAPHENE CAPACITORS TO IMPROVE EFFICIENCY, filed Mar. 15, 2013,

BACKGROUND

An electric power generator consists of two main parts: A stator and a rotor. The stator is generally made of laminated iron or other ferro-magnetic material and contains long slots having a certain depth and in which wire coils are wound in such a fashion to allow electric power to be generated when magnetic fields emanating from the rotor move past the coils. The rotor contains a specific arrangement of magnets, with generally wound armature electro-magnets whose strength is governed by the amount of current flowing in the armature windings. When the rotor spins inside the stator, the moving magnetic fields from the rotor induce a current in the stator windings thus generating what is referred to as electrical power.

The energy required to spin the rotor is typically applied by a drive unit of some kind, such as an electrical drive motor, diesel or other fossil fuel motor, steam turbine or the like. At typical efficiencies, only 20% of the energy input by the drive motor is devoted to creating electrical power.

The remaining 80% is dissipated by magnetic drag, or braking forces, that develop between the rotor and the stator. When current is applied to a load from a conventional generator, a magnetic force or braking force is created by the flow of the load current in the generator conductors that opposes the rotation of the generator armature. If the load current in the generator conductors increases, the drag associated with the reaction force increases. More force must be applied to the armature as the load increases to keep the armature from slowing. Increasing drag and increasing load current leads to decreasing conversion efficiency and can eventually lead to destructive consequences for generator equipment. The generators and structures in accordance with embodiments described herein are designed and constructed such that these destructive drag forces are eliminated.

As noted, an ordinary electric motor consumes large amounts of electric power due to electromagnetic drag. The greater the mechanical load, the more power is consumed and the greater is the electromagnetic drag. Electric motors are designed today to consume approximately 746 watts of electric power for each horsepower produced. It is estimated that if the electromagnetic drag forces were removed, the electric motor would be significantly more efficient, such as potentially 400-500% more efficient.

SUMMARY

The electric motor/power cogeneration unit of embodiments eliminates or reduces electromagnetic drag and generates electric power off the opposite ends of the lateral motor pole irons. These lateral pole irons are described in great detail in application "Solid State Rotary Field Electric Power CoGeneration Unit PCT/IB2010/000039."

The more load applied to the motor shaft, the more increased current flows through the motor which increases the amount of drag in a classic electric motor. However, this is not the case with the motor of in embodiments. The current flow and frequency through the lateral pole irons is controlled by a solid state excitation control system. The wire carrying the load current is wound onto appropriate cast-iron or laminated lateral steel pole irons which are placed in direct proximity to the coil slots of the power cogeneration induction coils which are wound into the appropriate slots of the laminated steel generator frame. The cogeneration induction coils are formed of multiple coils per group with multiple groups being used as needed. The wound lateral pole iron coils form direct current (DC) electromagnetic poles which are wound such that they each, when activated, fire as needed north or south in sequence in a clockwise or counterclockwise fashion. The sequencing and rotational direction is controlled by an attached computer programmable logic center and solid state coil direct current excitation system. This system is more efficient and more flexible than an alternating current (AC) system.

The wound lateral pole iron coils fire in sequence into each slot of the superior portion of the power generation induction coils. The central ends of these electromagnetic poles are seated into slots of a non-ferromagnetic conductor ring which is fixed to the laminated steel generator by a support means. These central ends of the electromagnetic poles are flush with the inner surface of the ring. The laminated steel motor/generator frame is encased in by example, a circular housing which is attached to end bells which contain bearings (ball bearings or roller bearings or the like). The roller bearings support a non-ferrous armature which contains permanent magnetic rods or electromagnetic members which are strategically placed into closed cavities, which closely approximate the outer radius of the armature portion. With respect to the permanent magnetic rotor or electromagnetic rotors of the armature, approximately 180° of the member is north pole charged or south pole charged and the other 180° will be of the opposite charge.

The cavities, which contain the magnetic bars or electromagnetic rotor members are held by a containment means and are supported by roller bearings and shielded by a laminated stainless steel mu metal cylinder. The cylinder is open to the peripheral surface of the stator by a 45° opening to allow interaction with the opposite magnetic pole of the lateral pole iron. As the stator is activated, the field rotates in a sequential clockwise or counterclockwise fashion, attracting the opposite poles of the armature. The three pole irons represented by example fire in sequence and in parallel with the other eleven pole iron groups. Therefore, the sequence for 50 Hz operation is for the 3 lateral pole irons to fire repetitively for 6.66 milliseconds (ms). The maximum magnetic pole strength is reached in five ms following DC excitation and requires five ms to collapse once DC excitation has ceased. When the poles are activated, the armature pole nearest the activated wound pole irons is attracted. The pole iron reaches magnetic peak intensity in five ms and collapses in five ms releasing the magnetic polar attraction of the pole iron. The collapsing pole pushes current in the opposite direction. This collapsing current is channeled through a solid state switching circuit and is stored in a battery system.

The power from the battery is then used to parallel with the DC power supplies which are used to excite the lateral pole iron coils on following cycles. The armature magnetic rotating poles cannot repel the stator pole irons due to the freewheeling design. The sequence for 60 Hz operation is to fire repetitively for 5.55 ms. However, this is a multiple speed electric motor which is computer controlled and operates from a DC power supply which can be powered by either AC or DC and in the case of AC, can utilize either single phase, two phase, three phase or the like by the use of the correct power supply, or by the use of each leg of a polyphase electric supply along with, and in conjunction with, a power neutral or ground neutral. The sequential firing of the north-south sequence of the stator poles generates power in the power generation induction coils just as a magnetic spinning armature generates power. The sequential firing of the poles also spins the armature thereby generating mechanical power or motor power onto the power shaft. As the load on the shaft increases, the current flow in the stator coils increases, thereby increasing the amount of power generated in the cogeneration coils. This arrangement allows the motor to operate more efficiently since the electromagnetic drag has been mostly eliminated.

The cogeneration component allows removal of power off the induction coils and thereby allows less impedance to current flow to neutral and to ground as is well demonstrated in application "Solid State Rotary Field Electric Power CoGeneration Unit; PCT/IB2010/000039". The cogenerated power from the unit is fed back to the solid state coil DC excitation system where it is used to excite the stator lateral pole iron coils in parallel, along with the power system and batteries in which power is stored from the collapsing pole coils. The rotor magnetic poles may be composed of electromagnetic components as well as by the rotary permanent magnetic components and the rotary permanent magnetic components may be stabilized by electromagnetic pole stabilizing inserts.

Various exemplary embodiments are discussed and described herein involving aspects of an electric machine, such as an electric motor and power cogeneration unit that produces power with high efficiency and low electromagnetic drag forces. Accordingly, an exemplary method for reducing drag in an electric motor—power cogenerator can include forming a series of wound lateral pole irons around the inner periphery of a stator as is fully described in application "Solid State Rotary Field Electric Power CoGeneration Unit. PCT/IB2010/000039". The stator is further provided with slots around the inner periphery that contain induction windings. First, ends of the lateral pole irons extend into the slots and are supported by a lateral pole iron support structure forming a circular opening that is concentric with the inner periphery of the stator. Second, end of the lateral pole iron extend toward the circular opening. Stator inserts containing free-wheeling permanent magnet inserts, or wound electromagnetic inserts, can be distributed along an outer periphery of a rotor inserted into the circular opening of the lateral pole iron support structure. The free-wheeling permanent magnet inserts can be inserted into cavities along the outer periphery of the rotor and can each include a pair of pole sections with a first magnetic polarity and a second magnetic polarity. The pole sections can be made, for example, from neodymium, samarium-cobalt or the like. The windings of the lateral pole irons can be sequentially energized so as to provide a moving field such that a torque is applied to rotate the rotor, and pole sections of the free-wheeling permanent magnet inserts which are free to rotate into alignment with ones of the second ends of the lateral pole irons to increase a flux density in the lateral pole iron, the first ends of the lateral pole irons inducing a current flow into the induction windings.

The stator, the support structure, and the rotor can be divided into N equally spaced sectors, which can be twelve in embodiments described herein, by radii emanating from a common center point on a common central longitudinal axis. The freewheeling permanent magnet inserts can be inserted into positions along the outer periphery of the rotor. Based on the distribution of the sectors and the like, N/2 groups of two of the N equally spaced sectors can be established. First ones of the lateral pole iron windings in first ones of the sectors in the N/2 groups can be wound such that the first lateral pole irons have a first magnetic polarity. Second ones of the lateral pole irons in that sector also have pole iron windings of the first polarity of the sectors in the N/2 groups and can be wound such that the second lateral pole irons have a first magnetic polarity. It will be appreciated that the slots, lateral pole irons and freewheeling permanent magnet inserts are axially aligned along a respective lengthwise axis thereof such that a lengthwise axis of the freewheeling permanent magnet inserts is in normal alignment with a depthwise axis of the slots and lateral pole irons.

The freewheeling permanent magnet inserts magnetically shielding within the rotor such that flux generated thereby is directed into the second ends of the lateral pole irons so as to minimize flux leakage and magnetic drag and to increase the magnetic flux coupling thereinto. The freewheeling permanent magnet inserts can further be inserted into respective openings provided in the rotor that are arranged in lengthwise alignment with the slots and lateral pole irons. The openings correspond to a longitudinal opening of the slots and provide magnetic communication with the corresponding second ends of the lateral pole irons that are disposed, for example, within or near the slots. The sequential energizing of the windings of the lateral pole irons includes bringing first ones of the freewheeling permanent magnet inserts into alignment such as though the self initiated freewheeling action thereof with the first ones of the second ends of the lateral pole irons such that the torque is provided to rotate the rotor, the first ones of the freewheeling permanent magnet inserts maintain the alignment, for example, during at least a portion of the rotation with the first ones of the second ends of the lateral pole irons. As the rotor rotates past the second ends of the lateral pole irons and the alignment is maintained, a maximum flux density associated with the moving field is also maintained so as to induce a maximum current flow in the induction windings and reduce a magnetic drag associated with the rotation.

In accordance with embodiments, the electromagnetic assembly for an electric motor and power cogeneration can be provided and includes, for example, a stator having a plurality of slots on a stator periphery of an inner stator opening thereof. A plurality of lateral pole irons can be coupled to the stator such that first ends of the plurality of lateral pole irons are coupled to respective ones of the plurality of the slots as is described in application "Solid State Rotary Field Electric Power CoGeneration Unit. PCT/IB2010/000039". The slots in the lateral pole irons can be aligned along with a lengthwise and depthwise axis. The plurality of lateral pole irons can be supported by a support structure that is positioned within the inner stator opening on a common central axis. The support structure has a support structure opening in the center thereof. The stator and the support structure can have a substantially circular shape and can therefore be arranged in a concentric fashion. The lateral pole irons have windings and second ends directed toward the support structure opening. A rotor can be positioned within the support structure opening and can have a plurality of cavities on a rotor outer periphery. The rotor can be coupled to a central shaft and can have a plurality of freewheeling permanent magnet inserts inserted into the cavities. Each of the cavities has an opening capable of being positioned adjacent to the second ends of the lateral pole irons. Each of the plurality of freewheeling permanent magnet inserts can have a pair of magnetic pole sections having a first magnetic polarity and a second magnetic polarity. The pole sections can be made from neodymium, samarium-cobalt or the like depending on the application. Each of the freewheeling permanent magnet inserts are capable of rotating about a longitudinal axis. In some embodiments, the pole section can be electromagnets such as wound armature electromagnets.

Windings of the plurality of lateral pole irons are sequentially energized to create a moving field and to apply a torque on the rotor causing a rotation of the shaft. The freewheeling permanent magnet inserts can rotate into alignment with the second ends of energized ones of the lateral pole iron and can free-wheel in order to maintain alignment as the rotor and the field rotates so as to provide maximum flux density in the lateral pole iron and induction windings in a corresponding one of the plurality of slots to induce a current flow therein. The stator, the support structure and the rotor can be divided into N equally spaced sectors by radii emanating from a common center point on a common central longitudinal axis an activation circuit coupled to the windings of the lateral pole iron can apply a pulsed DC current in sequence in an alternating north-south-north sequence or in any other functional sequence consistent with the concepts described herein. The sequencing and rotational direction is controlled by a computer, programmable logic center, and a solid state DC excitation system. This system is more efficient and more flexible than an alternating current (AC) system. As the stator is activated, the field rotates in a sequential clockwise or counterclockwise fashion attracting the opposite poles of the armature. In the example presented there are twelve pole iron groups. One solid state excitation card with three channels per card is employed in exciting the pole irons for each group. All twelve excitation cards function in parallel. The three pole irons represented in each group segment fire in sequence and in parallel with the other eleven pole iron groups. This sequential firing spins the rotor at the desired speed by the lateral pole irons.

Each of the plurality of lateral pole irons can be disposed respectively above each of the plurality of the slots such that the induction coil windings disposed in the plurality of slots are exposed to a concentrated amount of moving magnetic flux generated when the windings of the lateral pole irons are energized and a magnetic circuit is completed by the freewheeling permanent magnet inserts and/or the electromagnetic inserts. The plurality of freewheeling permanent magnet inserts are further capable of rotating in a synchronized relation with the magnetic field such that when the windings of the lateral pole irons are sequentially energized, the freewheeling permanent magnet inserts are rotated into alignment with the second ends of the lateral pole iron so as to provide maximum flux density in the induction windings to induce a current flow therein and to reduce magnetic drag on the rotor.

In an embodiment, each of the plurality of freewheeling permanent magnet inserts is contained within a containment sleeve that shields the rotor from magnetic fields produced by each of the freewheeling permanent magnet inserts. The containment sleeve is made from alternating layers of mu metal austenitic steel and/or carbon steel or other like steel. The containment sleeve can contain one or more bearings to support rotation of the containment sleeve and the contained permanent magnet insert member.

In accordance with an aspect, a method is disclosed for reducing drag in an electric generator that includes a change in geometric design and placement of the rotors in relation to the stator coils along with a system of magnetic shielding which results in very minimal interaction of the rotor magnetic fields with the destructive magnetic fields of the stator when the generator is connected to an electric load. This radical redesign includes distributing first numbers of slot rotor pairs along the outer periphery of a first stator section having induction windings accommodated in slots. Second numbers of the slot rotor pairs can be distributed along the outer periphery of a second stator section having induction windings accommodated in slots. The slots of the first stator section and the second stator section are axially aligned along a lengthwise and depthwise access. The "outer" periphery of the second stator section can also correspond to an "inner circumference" where reference is made to a circular or other suitable shape stator embodiment. The inner periphery of the first stator section and the inner periphery of the second stator section are adjacent to each other. The first members and second members of the slot rotor pairs include slot rotors having at least one pair of wound armature pole sections of a first and second magnetic polarity. The first and second members of the slot rotor pairs can be rotated in a synchronized manner such that a first one of the pole sections of the first member having the first magnetic polarity and a second one of the pole sections of the second member having the second magnetic polarity are aligned with the slots to provide maximum flux density in the induction windings to induce a current flow therein. The first member and the second member of the respective slot rotor pairs are aligned with the aligned slots of the first stator section and the second stator section along respective lengthwise axis of the first and second members and the slots such that the lengthwise axis of the first and second members are in normal alignment with the depthwise axis of aligned slots.

The first and second members can be magnetically shielded such that flux generated by the first and second members is directed only into the slots so as to minimize flux leakage and magnetic drag resulting from interaction of the rotor pairs with the stator magnetic fields. The first members and the second members shielding means can be inserted into respective openings provided in the first and second stator sections. The respective openings can be arranged in lengthwise alignment with the slots, to partially shield the first and second members and can be provided with a longitudinal opening corresponding to a longitudinal opening of the slots in order to provide magnetic communication with the corresponding longitudinal openings of the slots and ultimately to the windings disposed therein.

The opening in the first and second stator sections opening which are approximately 45° to 180° openings. The openings are necessary to accommodate the stator coil winding process. After the first and second member rotor shields are in place, the openings are closed by placement of laminated electrical steel shield covers. This 360° laminated shielded rotor tunnel provides equal attraction for the magnetized rotors for 360° of rotation. In operating conditions, a magnetic bearing effect is provided, thereby eliminating drag between the magnetized rotor poles and the stator iron.

The first and second members of the slot rotor pairs can be rotated about their axis in opposite directions over the slots such that the net torque generated by the polar force interaction between the first and second members is approximately zero and in specific cases can be a high net negative torque. Accordingly as the first one of the pole sections of the first members having the first magnetic polarity is rotated over a slot in a first direction, the second one of the pole sections of the second member can be sequenced such that it presents the second magnetic polarity opposite the first magnetic polarity in order to maximize the flux density in the aligned slots. The second one of the pole sections is being rotatable in a second direction opposite the first direction to form a magnetic circuit between the first and second magnetic polarities. The first angle in certain instances can be timed to yield usable motor effects. The first and second members can be driven in a synchronized manner that includes turning on an excitation current in an armature of the first one of the pole sections of the first member having the first magnetic polarity at an instant in time when the first one of the pole sections is positioned in a correct proximity to a slot in a first direction. An excitation current in an armature of the first one of the pole sections of the first member having the first magnetic polarity at an instant in time when the first one of the pole sections is positioned in correct proximity to a slot in a first direction. An excitation current in an armature of the second one of the pole sections of the second member having the second magnetic polarity can be similarly turned on. Alternating current (AC) can be generated when both the first and second members of the slot rotor pairs are provided with appropriate alternating first and second magnetic polarities. Direct current (DC) may be generated from the same slot rotor pairs when the first slot rotor pair of the pair generates only a first polarity and the second slot rotor pair generates only a second polarity. This allows changing the generator from AC to DC by changing direction of the excitation currents in appropriate poles, which may be accomplished by a programming change in the excitation PLC controller. The first and second members can be shielded such that flux generated when an excitation current is supplied to the armatures of the first and second members is directed substantially towards the slots. The induction winding can be connected for alternating current, direct current and in single-phase or three-phase, high wye or low wye, however a delta connection is not prohibited.

In accordance with another exemplary aspect, an electromagnetic assembly for an electric generator can be provided that includes a dual stator having a first stator section and a second stator section. A first polarity of slots are arranged on an outer periphery of the second stator section. Again, as noted herein above, with respect to a closed geometric arrangement stator the outer periphery of the second stator section can refer to an "inner circumference." Respective inner peripheries of the first and second sections are disposed in adjacent relation and can include a back iron disposed there between to improve magnetic coupling through the slots. Each of the first and the second polarity of slots are aligned along a lengthwise and depthwise axis to form slot pairs, each of the polarity of the slots having induction coil windings disposed therein. The assembly can further include slot rotor pairs associated with the slot pair. Each of the slot rotor pairs has a first slot member disposed in aligned relation with one of the first polarity of slots and a second slot rotor member disposed in aligned relation with one of the second polarity of slots corresponding to the slot pair. Each slot rotor member has at least a pair of magnetic poles with one of the pair of magnetic poles having a first magnetic polarity and another of the pair of magnetic poles having a second magnetic polarity. Each slot rotor member is capable of rotating about a longitudinal axis. The slot rotor pairs are disposed along the slot pairs such that the induction coil winding disposed in the slot pairs are exposed to magnetic flux generated by the slot rotor pairs. Each slot rotor member can be provided with a shield having an opening portion over the slots to direct the flux into the slots but minimize external flux leakage. In addition, a shield section can be provided for shielding magnetic flux from the first and second slot rotor members and end teeth portion of the first stator section and the second stator section. The shielding can be made from mu metal. The first slot rotor member and the second slot rotor member are capable of rotating such that when magnetic flux of one of the magnetic poles of the first polarity associated with the first slot rotor member is directed to a corresponding first slot of the slot pair, magnetic flux of an associated one of the magnetic poles of the second polarity associated with the second slot rotor member is directed to a corresponding second slot of the slot pair such that induction coil winding disposed in the first and second slots are exposed to increased magnetic flux and leakage of the magnetic flux is minimized. In one embodiment, the first polarity of slots can include 48, but not limited to 48, wire slots, and the second polarity of slots can include 48, but not limited to 48, wire slots. Each of the first stator section and the second stator section can have a substantially circular shape where the first stator section and the second stator section are concentric about a longitudinal axis of the dual stator. Alternatively, the first stator section and the second stator section are planer. In another embodiment, the first polarity of slots includes four wire slots, and the second polarity of slots can include four wire slots. Each of the first stator sections and the second stator section can have a substantially square shape with the wire slots located in the corners of the square, where the first stator section and the second stator section are concentric about a longitudinal axis of the dual stator. This last embodiment is preferred in that it affords geometric isolation from the magnetomotive poles in the stator which greatly reduces the drag forces between the stator and magnetized rotors. The first polarity of slots and the second polarity of slots may contain up to 12 wire slots each without significant increase in drag forces.

An excitation circuit can be provided that applies an excitation current to the first slot rotor member and the second slot rotor member so as to generate the magnetic flux when the one of magnetic poles of the first polarity associated with the slot rotor member is rotated into alignment with a corresponding first slot of the slot pair and to generate the magnetic flux when the associated one of the magnetic poles of the second polarity associated with the second slot rotor member is rotated into alignment with a corresponding second slot of the slot pair. The excitation circuit can further remove the excitation current from the first slot rotor member and the second slot rotor member in order to remove the magnetic flux at an instant when the one of the magnetic poles of the first polarity associated with the first slot rotor member is rotated out of alignment with the corresponding first slot of the slot pair, and to remove the magnetic flux at an instant when the associated one of the magnetic pole of the second polarity associated with the second slot rotor member is rotated out of alignment with the corresponding second slot of the slot pair. A diode circuit can be provided for transmitting a current generated when the magnetic flux collapses forming current flow in the opposite direction, from the first and the second slot rotor members to a battery. The excitation circuit can include a commutator circuit (either mechanical or solid state) associated with the first and second slot rotor members, the commutator circuit selectively coupling one of the first and second slot rotor members to the excitation current as the appropriate ones are rotated into alignment.

Various exemplary embodiments are discussed and described herein involving aspects of an electric machine, such as a generator that produces power with high efficiency and very low electromagnetic drag. The relevance of this elimination of drag to its uses and applications along with the use of superconductor coils are presented and discussed.

In accordance with an aspect, a method is disclosed for reducing drag in an electric generator that includes a change in geometric design and placement of the rotors in relation to the stator magnetic poles such that the stator magnetic poles that are created by the flow of load current in the generator are geometrically isolated from the rotor cavities and are shielded by a system of magnetic shielding as well as a unique winding which provides electromagnetic shielding and canceling of the effective stator magnetic poles secondary to electrical load currents in the stator winding. The physical shielding consists of metallic mu metal shielding and electromagnetic shielding around the rotor cavity. Further shielding is provided by the unique winding pattern in the rotor cavity portion of the stator. Further reduction in magnetic interaction between the rotor magnetic poles and the potential stator magnetic poles is accomplished by the further uniqueness of the stator winding patterns which consists of bi-directional current flow in adjacent windings during load current flow which neutralizes destructive effective magnetic polarity of the stator. This shielding and geometric isolation of the rotors from the potential stator magnetic poles, created by the stator induction windings, results in very minimal magnetic flux linkage of the rotor magnetic fields with the destructive magnetic fields of the stator when the generator is connected to a full electric load. This radical design alteration from standard generators includes distributing first members of slot rotor pairs along the outer periphery of a first stator section having induction windings accommodated in slots in the inner periphery of the rotor pair cavities. The slots are multiple axially aligned slots which are skewed by one stator slot tooth width or slot pitch. This skewing of the slots is utilized to reduce the air gap permeance harmonics caused by the slots as the rotors rotate past the wire slots. Second members of the rotor pairs along the outer periphery of a second stator section having induction windings accommodated in slots in the inner periphery of the slot rotor pair cavities. The slots are multiple axially aligned slots which are skewed from the axis by one slot tooth width or one slot pitch to reduce the air gap permeance harmonics which are caused as the rotors rotate the magnetic flux passed the wire slots. The slots of the first stator section and the second stator section are axially aligned with a skew by one stator slot tooth width or one slot pitch, along a lengthwise and depth-wise access. The "outer" periphery of the second stator section can also correspond to an "inner circumference" where reference is made to a circular or other suitable shaped stator embodiment. The "inner periphery" of the first stator section and the "inner periphery" of the second stator section are adjacent to each other. The first members and the second members of the slot rotor pairs include slot rotors having at least one wound armature pole section which is excited by a solid state excitation with a gating mechanism which allows the entire rotor pole section of the wound armature to alternate between a first and second magnetic polarity. The first and second members of the slot rotor pairs can be rotated in a synchronized manner such that a first magnetic polarity and a second magnetic polarity are aligned with the slots to provide maximum flux density in the induction windings to induce a current flow therein. The first member and the second member of the respective slot rotor pairs are aligned with the skewed, aligned slots of the first stator section and the second stator section along respective lengthwise axes of the first and second members and the slots such that the lengthwise axes of the first and second members are in normal alignment with the depth-wise axes of the aligned slots.

The first and second members can be magnetically shielded such that the flux generated by the first and second members is directed into the induction wire slots with minimal interaction among the rotor pairs and/or the stator magnetic field. The first members and the second members shielding is accomplished by two means. First, a mu metal shielding means is installed at strategic locations to separate the rotor magnetic fields among the rotors and from the stator magnetic fields. Second, the unique rotor cavity and stator induction windings provides a net zero magnetic flux interaction or flux linkage between the magnetic fields of the rotors and the stator.

The rotor pair cavity openings in the first and the second stator sections are only sufficient to accommodate the stator coil winding process. After the winding process is complete, the openings are closed by placement of removable laminated stator sections. This 360° laminated tunnel along with skewing of the stator slots provides equal flux linkage between the magnetized rotors and the stator iron for the entire 360° of rotation. In operating conditions a magnetic bearing effect is provided thereby eliminating drag between the magnetized rotor poles and the stator iron due to irregular flux linkage and resultant air gap harmonics.

The first and second members of the slot rotor pairs with first and second polarities can be rotated about their axis in opposite directions over the slots such that the net torque generated by the polar forces (i.e. flux linkage) interaction between the first and second members is approximately zero. The first and second members can be driven in a synchronized manner that includes turning on an excitation current in an armature of the first one of the magnetized poles of the first member having a first magnetic polarity at an instant in time when the first member is driven in a first direction. An excitation current in an armature of the second member having a second magnetic polarity can be similarly turned on. Alternating current (AC) can be generated when both the first and second members of the slot rotor pairs are provided with appropriate alternating first and second magnetic polarities. Direct current (DC) may be generated from the same slot rotor pairs when the first slot rotor of the pairs generates only a first polarity and the second slot rotor pair generates only a second polarity. This allows changing the generator from AC current to DC current by changing direction of the excitation currents in appropriate poles, which may be accomplished by a programming change in the excitation PLC (Programmable Logic Center) controller. The induction windings can be connected for AC current, DC current and in single-phase or 3-phase "high-wye" or "low-wye", however a Delta connection is not prohibited. The frequency of the generated power may be changed by altering the speed of the first and second members of the slot rotor pairs.

In accordance with another exemplary aspect, an electromagnetic assembly for an electric generator can be provided that includes a dual stator having a first stator section and a second stator section. A first polarity of rotor cavities are arranged on an outer periphery of the first stator section. A second polarity of rotor cavities are arranged on the outer periphery of the second stator section. Again, as noted herein above, with respect to a closed geometric stator arrangement, the outer periphery of the second stator section can refer to an "inner" circumference. Respective inner peripheries on the first and second sections are disposed in adjacent relation and can include a back-iron of any desired dimension disposed there between to improve magnetic coupling through the induction wire slots. Each of the first and second polarity rotor cavities are aligned along a lengthwise axis and contain induction wire slots which are skewed the distance of a slot pitch or width of a slot tooth, aligned along a lengthwise and depthwise axis. Each of the slots have induction coil windings disposed therein. The assembly can further include slot rotor pairs within the rotor cavities. Each slot rotor has an alternating magnetic pole, alternating between 360° of first pole and 360° of second pole. Each slot rotor member is capable of rotating about a longitudinal axis. The slot rotor pairs are disposed along the slot pairs such that the induction coil windings disposed in the rotor cavities of the stator are exposed to magnetic flux generated by the slot rotor pairs. Each slot rotor member can be provided with a magnetic shield placed in appropriate slots separating the rotor cavities from the stator magnetic poles. The shielding can be made from mu metal.

In one embodiment, the first polarity of slots are contained in four rotor cavities, the second polarity of slots are contained in four rotor cavities. Each of the first stator section and the second stator sections can have a substantially square shape, but not confined to square shape, with the rotor cavities located in the corners of the square, where the first stator section and the second stator section are concentric about a longitudinal axis of the dual stators. This last embodiment is preferred (but not restrictive) in that it affords geometric isolation from the magnetomotive poles in the stator, thereby greatly reducing the drag forces between the stator and the magnetized rotors. The first polarity of slots and the second polarity of slots may contain up to 48 wire slots, but not limited to 48, each without increasing the drag forces.

The slots are wired such that the 360° of slots are wound in a counter-clockwise direction and are lapped by 360° of slots wound in a clock-wise direction. Therefore, the induced north pole cancels the induced south pole, thereby electromagnetically isolating the rotor magnetic fields from the induced potential stator magnetic fields.

An excitation circuit can be provided in one embodiment that applies an excitation current to the first slot rotor member and the second slot rotor member so as to generate the magnetic flux when one of the magnetic poles of the first polarity associated with the slot rotor member is rotated into alignment with a corresponding first slot of the slot pair and to generate the magnetic flux when the associated one of the magnetic poles of the second polarity associated with the second slot rotor member is rotated into alignment with a corresponding second slot or series of slots of the slot rotor cavity pair. The excitation circuit can further remove the excitation current from the first slot rotor member and the second slot rotor member in order to move the magnetic flux in an instant when the one of the magnetic poles of the first polarity associated with the first slot rotor member is rotated out of alignment with the corresponding first slot of the multiple slot pairs, and to remove the magnetic flux at an instant when the associated one of the magnetic poles of the second polarity associated with the second slot rotor member is rotated out of alignment with the corresponding second slot of the slot pair. A diode circuit can be provided for transmitting a current generated when the magnetic flux collapses forming current flow in the opposite direction from the first and the second slot rotor members to a battery. The excitation circuit can include a commutator circuit (either mechanical or solid state) associated with the first and slot rotor members, the commutator circuit selectively coupling one of the first and second slot rotor members to the excitation current as the appropriate ones are rotated into alignment. In other embodiments the magnetic pole or poles of the first slot rotor member and the second slot rotor member may be supplied with a constant excitation current or may be activated in such a fashion that the entire 360° circumference of the rotor may alternate between first magnetic polarity and second magnetic polarity.

In a preferred embodiment, the first and second rotors are unipolar (i.e. north-pole, alternating with south-pole) for the entire 360° circumference of the first and second rotors of the rotor pair. The unipolar circuit excited by a solid state switching system which allows all of the rotor windings to be switched in alternating directions i.e. switch the entire rotor from north pole to south pole and south pole to north pole. This unique design allows the program PLC or commutator circuit which controls the excitation circuit which can apply an excitation current to the first slot rotor member and the second slot rotor members so as to generate the magnetic flux in the one of the magnetic poles of the first polarity associated with the slot rotor member 50 times per second (50 Hz) or 60 times per second (60 Hz) regardless of the position of the rotor in rotational space and to generate the magnetic flux when the associated one of the magnetic poles of the second polarity associated with the second slot rotor member is applied with an excitation current thereby generating a magnetic flux of opposite polarity such that magnetic coupling occurs through each slot and the intervening back-iron and stator coils. This unique embodiment allows the generator rotors to be operated at any speed with the frequency being controlled by the excitation circuit rather than being controlled by the speed of the rotors. This design allows flexibility in power output by increasing and decreasing the speed of the rotor without alternating the frequency. For example, a generator operated at 3,000 rpm can double the power output by increasing the operating speed to 6,000 rpm or more, also decreasing the power by bringing the power as low as desired by progressively decreasing the speed of the rotor but maintaining the frequency by timed excitation of the rotor coils. If the conductor material with very low resistance to electron flow is employed (a room temperature superconductor) such as a graphene coded magnet wire, is used to wind both the stator and the rotors significant increase in power output can be realized for the same power input. Alternatively, a generator one-fifth or one-tenth the size would generate the same power output while using the superconductor coils.

Various configurations are presented in the prior art, but none approach the issues of reducing magnetic drag as in the present disclosure. For example, in U.S. Patent Application Publication No. 2011/0221298 to Calley et al., an electrical device is disclosed with a tape wound core laminate rotor. Calley fails to teach shielding a magnetized element from the adjoining stator surface, and fails to teach exposing only small segments of the side iron and the wire slots to the magnetic fields generated by rotor elements. Calley further fails to teach geometric isolation of the rotor from the stator induction magnetic poles which are created when the induction coils are closed to a load. Calley further fails to teach wire slots containing two coils, one coil wound north pole and one wound south pole. As the coils are closed to a load during power generation, the north pole cancels the south pole and south pole cancels the north pole, thereby removing the electromagnetic drag forces from the stator. Calley further fails to teach that these cancelling poles, when wound around a 360-degree circumference within the stator-rotor cavity, produce a neutral electromagnetic shielding effect around the rotors. Still further, Calley fails to teach the desirability on alternating pulsed unipole, which provides a consistent flux linkage in the stator iron for a full 360-degrees of rotation.

Other systems are presented in the prior art. For example, in U.S. Pat. No. 7,608,967 to Durham et al., a single field rotor motor is disclosed. Durham however, fails to teach improving the efficiency of a variable speed electric motor and removing electromagnetic drag by sequentially firing a series of DC electromagnetic members in sequential sectors in parallel; and fails to teach that the members interact with freewheeling permanent magnetic rotor inserts or electromagnetic rotor inserts along the outer periphery of the rotor. Durham fails to teach a north pole-south pole activation, synchronized with activation of a lateral pole iron controlled by an excitation or activation system or circuit. Durham further fails to teach sequential, repetitive energizing of the windings of lateral pole irons in each sector of a stator, with each sector firing in parallel so as to provide a moving magnetic field to generate torque applied to rotate the rotor and permanent or electromagnetic pole sections of the rotor magnetic inserts which rotate into alignment with ones of the second ends of the lateral pole irons to increase flux linkage with lateral pole irons, with first ends of the lateral pole irons inducing a current flow in the stator induction windings as in the disclosed invention.

Other prior art systems exist to accomplish various objectives but none address the problem of reducing magnetic drag.

Therefore, it is an object to present a method and apparatus for reducing the electromagnetic drag in an electric motor to thereby improve efficiency and simultaneously cogenerate electric power which is available for any appropriate use including powering the stator pole excitation system.

It is an additional object to present a method and apparatus by which electromagnetic poles are constructed and activated in the proper sequence by a computer controlled solid state DC excitation system.

It is a further object to present exemplary freewheeling armature magnetic poles to reduce drag by freely moving into and maintaining an aligned position with the electromagnetic poles of a stator system to reduce drag and increase magnetic flux coupling.

It is an additional object to present exemplary induction coils activated by wound lateral pole iron and to thereby generate power as the motor/generator produces mechanical energy on an exemplary motor shaft.

It is a further object to demonstrate the use of AC, DC and/or any phased power to power the pole excitation DC power supplies such that the motor cogeneration system may be adaptable to any available power supply.

It is an additional object to reveal a method of frequency excitation which allows ease of variable speed operation. The sequence of excitation of the lateral pole irons for 50 Hz operation is to excite each pole sequentially for 6.66 ms and 5.55 ms for 60 Hz operation. However, this is a multiple speed motor which has a computer controlled excitation system and has a wide range of operating speeds which are possible with very little drag, high efficiency and cogeneration of electric power which may be used to parallel feed the stator pole excitation system.

It is an additional object to demonstrate the use of an embodiment in which a high efficiency electric motor is used to drive a standard efficiency electric generator to produce a net increase in electric power output. It is a further object to demonstrate the use of a high efficiency electric motor and a high efficiency electric generator to produce a greater net increase in electric power output.

It is an object therefore to provide distributed slot rotor pairs that rotate in a close proximity to aligned wire slots disposed around the circumference of a dual stator of an electric power generator.

It is a further object to demonstrate a means to complete an intensified magnetic circuit and place maximum flux into the wire slots using slot rotor pairs.

It is an additional object to demonstrate the use of unipolar/alternating polarity rotor pairs such that the frequency and type of current (AC or DC) may be controlled by a computer controlled rotor excitation system.

It is an additional object to reveal the use of individual 3-phase electric motors to drive each rotor with all rotors being controlled by a common variable speed drive.

It is a further object to reveal the structure of laminated electrical steel shield covers to provide a uniform steel environment to encapsulate the rotors to cause a magnetic bearing effect without polarizing drag occurring in said laminated steel covers.

It is a further object to release energy which would be consumed by electromagnetic drag forces, as electric power by specific geometric location and shielding of distributed slot rotor pairs in a high efficiency generator.

It is an additional object to demonstrate the use of the high efficiency generator as part of a stand-alone electric power plant.

It is a further object to reveal the use of the high efficiency generator to power an electric power grid.

It is an additional object to reveal the use of the high efficiency generator to power an automobile/power generation plant.

It is a further object to reveal the use of the automobile/power generation plant to power homes, businesses and the power grid while the automobile units are not being utilized as motive devices.

It is an additional object to reveal the use and method of the high efficiency generator to power trains.

It is a further object to reveal the use and method of powering boats and other water craft with the high efficiency generator.

It is an additional object to reveal the use and method of powering buses and trucks with the high efficiency generator.

It is a further object to reveal the use and method of powering airplanes and other flying machines with the high efficiency generator.

It is an additional object to reveal a testing protocol for testing the efficiency of the high efficiency generator and comparing it to the efficiency of a standard electric power generator.

It is an object therefore to provide distributed slot rotor pairs but not confined to pairs that rotate in a close proximity to aligned and skewed wire slots disposed around the circumference of a dual stator of an electric power generator. It is a further object to provide equally spaced wire slots for 360° in the rotor cavities with narrow openings into larger slots which contain wound magnet wires. This arrangement aids in the control of permeance harmonics.

It is an additional object to provide a skew in the slot alignment equal to at least the width of the tooth between the slots sufficient to control permeance harmonics in the air space between the magnetized rotors and the stator iron of the rotor cavities.

It is a further object to demonstrate a means to complete an intensified magnetic circuit and place maximum flux into wire slots, the side iron, the stator tooth and back iron using slot rotor pairs.

It is an additional object to demonstrate the use of unipolar, alternating polarity rotor pairs such that the frequency and type of current (AC or DC) may be controlled by a computer control rotor excitation system.

It is a further object to reveal a double shoe rotor which can function as a dipole or unipole rotor.

It is an additional object to reveal a mid-rotor shielding mechanism which allows each of two shoe poles outer surface polarities to form flux linkage with the inner opposite pole adjacent to the shaft.

It is a further object to reveal a double shoe rotor which can function as a clean, full strength unipole rotor with only two leads. These two leads float (+−) (−+) i.e. alternate between positive and negative leads by a switching mechanism in the excitation boards.

It is an additional object to reveal the mechanism and design of the stator such that energy input is released as usable electric power which would otherwise be dissipated or consumed by electromagnetic drag forces.

It is a further object to reveal the method by which the rotor magnetic forces are separated from the stator induction magnetic forces by specific geometric location and shielding of the distributed slot rotor pairs as well as by the unique winding pattern of the stator which effectively shields and cancels significant magnetic poles in the stator.

It is an additional object to reveal a testing protocol for testing the efficiency of the high efficiency generator and comparing it to the efficiency of a standard electric generator.

It is a further object to reveal a 3-phase electric generator which can operate as 3-phase or single-phase by electromagnetically changing the stator output hookup and the rotor magnetic polarity from a first pole to a first and second pole, all via computer programming.

It is an additional object to reveal a 3-phase electric generator which can operate as 3-phase, single-phase, AC or DC and at 50 Hz, 60 Hz, or any other desired frequency by changing the system through a computer program with a slaved PLC and solid state switching through electromagnetic switching gear.

It is a further object to reveal a physical geometric separation of the different rotor cavities (stators) without deviating from the teachings.

It is an additional object to reveal a 3-phase generator which operates without computer assistance nor a solid state excitation system without deviating from the teachings.

It is a further object to reveal the use of a very low electrical resistance conductor wire to wind both the stator and the rotors with significant increase in power output to an electrical load.

It is an additional object to reveal the use of individual 3-phase electric motors to drive each rotor with all rotors being controlled by a common variable speed drive.

It is a further object to reveal the methods for the release of energy which would be consumed or dissipated by electromagnetic drag forces, this methodology being specific geometric location and shielding of distributed slot rotor pairs in a high efficiency generator.

It is an additional object to reveal the use of superconductor material, with very low resistance to electron flow, to wind both the stator and the rotors of the unit and thereby increase the power output by a significant amount.

It is a further object to utilize high conductivity or superconductive material, such as grapheme, to aid in the function of the unit as a stand-alone power plant.

It is an additional object to demonstrate the use of the high efficiency generator as part of a stand-alone electric power plant.

It is a further object to reveal the use of the high efficiency generator to power an electric power grid.

It is an additional object to reveal the use of the high efficiency generator to power an automobile/mobile power generation plant.

It is a further object to reveal the use of the automobile/power generation plant to power homes, businesses, and the power grid while the automobile units are not being utilized as motive devices.

It is an additional object to reveal the use and method of the high efficiency y generator to power trains.

It is a further object to reveal the use and method of powering boats and other watercraft with the high efficiency generator.

It is an additional object to reveal the use and method of powering buses and trucks with the high efficiency generator.

It is a further object to reveal the use and method of powering airplanes and other flying machines with the high efficiency generator.

It is an additional object to use graphene and/or other original unique substances as superconductors, high capacity capacitors and super-efficient ferromagnetic materials to enhance electromagnetic induction with smaller physical size and lighter weight generating devices.

BRIEF DESCRIPTION OF THE DRAWINGS

In order that embodiments may be fully and more clearly understood, by way of non-limitative examples, the following description is taken in conjunction with the accompanying drawings in which like reference numerals designate similar or corresponding elements, regions and portions and in which:

FIG. 12A is a diagram illustrating a lateral and end view of an exemplary unwound iron pole piece of an electromagnetic rotor pole magnet stabilization inserts in accordance with one or more embodiments;

FIG. 12B is a diagram illustrating a lateral and end view of an exemplary copper magnet wire wound iron pole piece of an electromagnet rotor pole magnet stabilization insert in accordance with one or more embodiments;

DETAILED DESCRIPTION

Figure 1A:
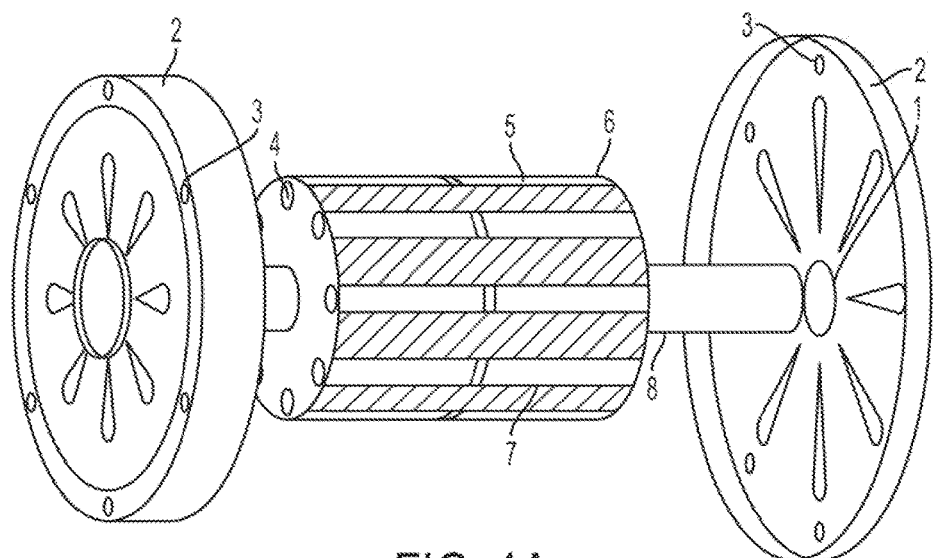
FIG. 1A is a diagram illustrating a lateral view of an exemplary rotor containment unit and end bells in accordance with one or more embodiments.

In accordance with various exemplary embodiments discussed and described herein and by way of brief summary, an exemplary high efficiency motor unit eliminates or greatly reduces electromagnetic drag as it also generates electric power from the opposite end of the motor lateral pole irons. The conductors carrying the current load, in connection with various and exemplary embodiments, can be wound onto cast-iron or laminated steel pole pieces, hereinafter referred to as lateral pole irons, which are then placed in direct proximity to the coil slots of the power cogeneration induction coils, which are wound into slots of the laminated steel stator of the motor/generator frame. The cogeneration induction coils can be formed of multiple coils per group with multiple groups being used as needed.

The wound coils on the lateral pole irons form electromagnetic poles wound such that three or more north pole wound lateral pole irons fire in sequence in a clockwise or counterclockwise fashion into each slot of a portion of the power generation induction coils. Each lateral pole iron is wound with a separate conductor such that the individual pole irons may be fired separately in sequence from a solid state lateral pole iron excitation system. The coils of the lateral pole irons associated with adjacent portions can be wound in opposite directions to establish alternating magnetic field polarities of the associated poles. The south pole wound lateral pole irons can also fire in sequence in a clockwise fashion. It should be noted that each of the lateral pole irons can be arranged such that one end portion thereof is seeded into a respective one of the slots and the other end portion toward the center of the machine are seeded into slots of a non-ferrous ring which can be fixed to the laminated steel generator by a support means as in "Solid State Rotary Field Electric Power CoGeneration Unit PCT/IB2010/000039". The center oriented ends of the lateral pole irons are flush with the inner surface of the ring.

In another general aspect, the laminated steel generator frame is encased within a circular housing to which end bells containing roller bearings, a ball bearing or the like can be attached. The roller bearings can support a non-ferrous mechanism which contains freewheeling permanent magnet inserts placed into, for example, closed lubricant-filled cavities arranged around the outer radius of the non-ferrous mechanism attached to the shaft. The freewheeling permanent magnet inserts may be sequentially and synchronously aligned with the firing of the polarizing circuits of the lateral pole irons. This alignment mechanism of the freewheeling magnets allows more effective magnetic coupling between the freewheeling permanent magnetic inserts and the sequentially magnetized lateral pole irons. The alignment mechanism may consist of wound electromagnetic inserts placed radially from each freewheeling magnetic insert such that the insert fires synchronously with the lateral pole iron thereby aligning the freewheeling permanent magnet insert to hold in the proper orientation.

In an exemplary aspect, a first 180° of the freewheeling permanent magnet insert is constituted of a north pole charged permanent magnet, and the other 180° is constituted of a south pole charged permanent magnet. Cavities, such as lubricant-filled cavities, can contain the freewheeling permanent magnet inserts, which are held by a containment means and supported by roller bearings or the like. The inserts can further be shielded by a cylinder constituted of a shield having alternating laminations of carbon steel, stainless steel and mu metal. The shielded cylinder has a 45° opening to the peripheral surface of the stator so as to allow interaction and magnetic coupling with the opposite magnetic pole of the lateral pole iron. The shielded cylinder may also have a 45° opening 180° opposite the peripheral surface of the non-ferrous rotor to allow interaction and magnetic coupling between the electromagnetic stabilizing insert and the freewheeling permanent magnet insert.

As the stator is electrically activated, such as through passing and excitation current through the windings of the individual lateral pole iron, the magnetic field generated thereby rotates sequentially in each segment of the pole iron of three or more north pole wound, then south pole wound and sequential repeating through twelve or more groups, having an overall field polarity that in the case of the freewheeling permanent magnet inserts attracts the opposite poles. In the case of the freewheeling magnet inserts with stabilization coil inserts, the stabilization coil fires at the same instant as the corresponding lateral pole iron, but with opposite polarity. Therefore, if the lateral pole iron generates north pole, the freewheeling magnet south pole is attracted to the lateral pole iron and it is stabilized by south pole generated by the stabilization coil insert. In the instance of an exemplary electromagnet rotor pole insert, the computer excitation system may sequence the electromagnetic rotor pole insert with opposite polarity to the corresponding lateral pole iron coil polarity for the sequential rotation past three or more lateral pole iron coils in a segment.

The computer excitation system switches the polarity of the electromagnetic rotor pole insert as the rotor rotates from the last lateral pole iron of the group to the first lateral pole iron of the next group. This rotation of the rotor from one lateral pole iron sector to the next lateral pole iron sector requires 10-12 ms and the time required to change polarity is 10 ms (5 ms for one pole to collapse and 5 ms to reach peak polarity with the second pole following DC excitation.) This sequence repeats around the 360° rotation thereby spinning the rotor, creating torque and revolutions per minute therefore horsepower is created.

$$HP=(Torque(ft*lbs)\times rpm)/5252$$

For instance, a 3000 rpm motor of this example requires that the lateral pole irons each be fired in sequence every 6.6 ms and in the case of a 3600 rpm motor of this example requires that the lateral pole irons each be fired in sequence every 5.55 ms. Therefore, in this example, a segment of three lateral pole irons is activated [pole iron #1 (6.6 ms) #2 (6.6 ms) #3 (6.6 ms) #1 (6.6 ms) #2 (6.6 ms) #3 (6.6 ms) #1 (6.6 ms) etc.] Each segment is excited by an excitation board containing three channels. The channels fire sequentially by way of example every 6.6 ms or every 5.5 ms or other sequencing speeds to vary the speed of rotation of the motor.

Since the magnetic poles of the stator and rotor are sequenced, minimal to no drag forces are encountered. The rotating poles of the freewheeling permanent magnet inserts and electromagnetic inserts are spaced such that when a pole of one insert is aligned over, for example, the center of a first north pole wound lateral pole iron in a coil group, a pole of a next insert is dead center over a first south pole wound lateral pole iron of the group. The sequential firing of the north pole-south pole sequence of the lateral pole irons of the stator generates power in the power generation induction coils just as a magnetic spinning armature generates power. The sequential firing of the lateral pole irons also spins the armature thereby generating mechanical power on the motor shaft. The cogeneration component removes power from the induction coils and thereby allows less impedance in current flow to neutral and/or to earth ground as observed in patent "Solid State Rotary Field Electric Power CoGeneration Unit. PCT/IB2010/000039". The cogenerated power may be used to provide a parallel power source to the excitation boards for the lateral pole irons, the electromagnetic rotor pole inserts and the electromagnetic stabilization inserts for the freewheeling magnets.

Figure 1B:
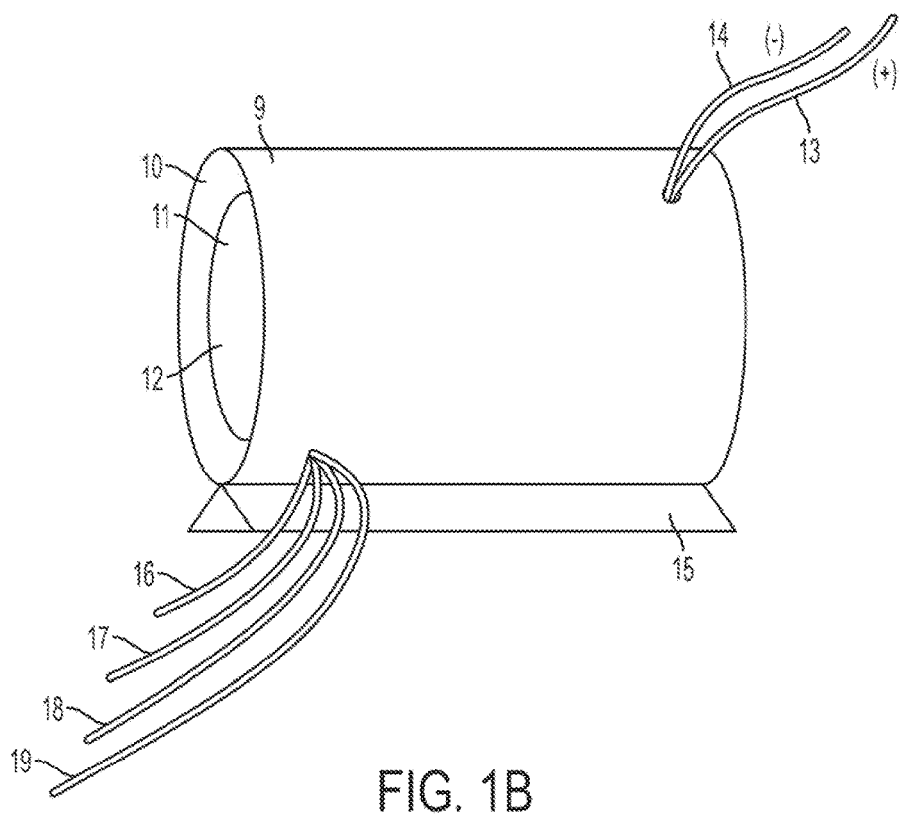
FIG. 1B is a diagram illustrating a lateral view of an exemplary stator and leads in accordance with one or more embodiments.

The above overview is exemplary in nature to provide a brief overview. A better understanding is provided herein below in the description that accompanies the figures. With reference to FIG. 1A thereof, basic components of an exemplary high efficiency motor are shown. A stator 15 can accommodate a rotor 6 having in this example cavities that hold stator inserts 4 and that have openings 7 that allow magnetic coupling with flux which permeates the opening 7. The stator inserts 4 accommodate freewheeling permanent magnet inserts 5. The rotor mechanism can be coupled to a shaft 8, which can be the power drive shaft of one exemplary high efficiency motor. Specifically, rotor 6 inside a stator 15 see FIG. 1B. Stator 15 can contain slots, coils, and wound lateral pole irons as will be described in greater detail hereinafter. A shaft 8 can be placed through an opening 1 in end bells 2 that can accommodate, for example, a bearing or similar support mechanism. A common central axis 8j (FIG. 2A) can extend through the shaft 8 and can be a common point of reference for the rotor 6, the stator 15, and a support structure for lateral pole irons that will be described in greater detail hereinafter. The unit can be bolted together through holes 3 in each bell. Input power to the unit can be attached by connecting leads from the solid state DC excitation board through excitation input leads 16, 17, and 18 (each lead contains at least 4 excitation circuit leads) and through a neutral ground lead 19. The output power leads 13 and 14 from power generating coils can be attached to the power board for supplying the rotor electromagnetic poles and/or the pole stabilization electromagnetic inserts and/or any appropriate distribution circuit.

Figure 2A:
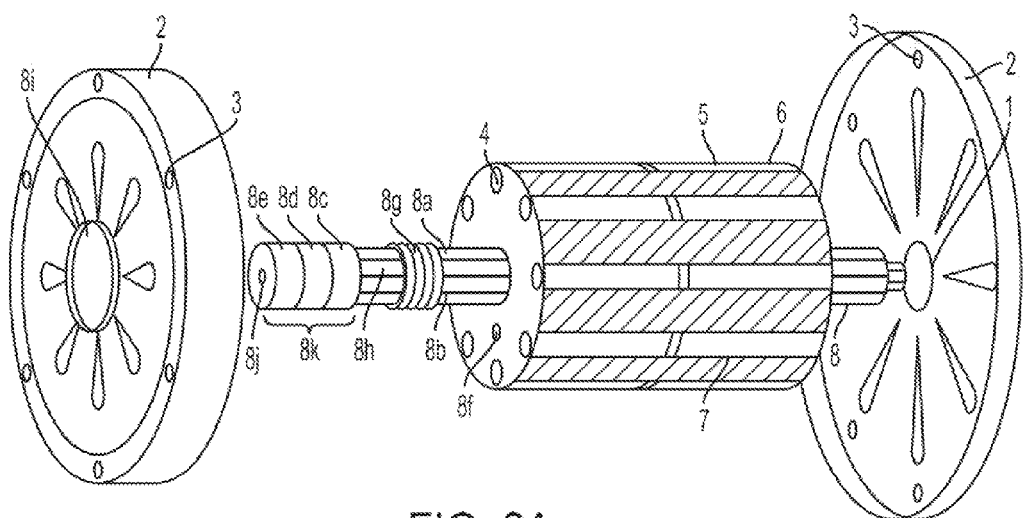
FIG. 2A is a diagram illustrating a lateral view of an exemplary rotor containment unit revealing slip rings, bearing rest and rotor magnet stabilizing coils and end bells in accordance with one or more embodiments.
Figure 2B:
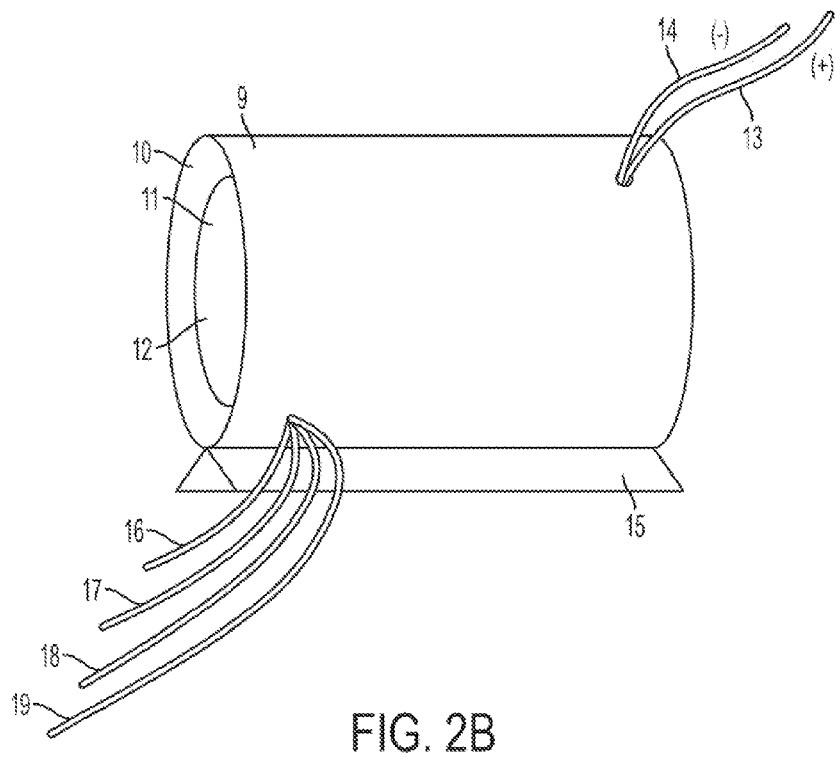
FIG. 2B is a diagram illustrating a lateral view of an exemplary stator and leads in accordance with one or more embodiments.

An alternate embodiment by way of an example is shown in FIG. 2A. This embodiment reveals a greatly improved method for maximizing flux linkage between the rotor magnetic poles and the wound lateral pole irons as will be further described later. In this embodiment a stator 15 can accommodate a rotor 6 having cavities that hold rotor inserts 4 and that have openings 7 that allow flux linkage with the wound lateral pole irons. The rotor inserts 4 accommodate freewheeling permanent magnets 5. The magnetic stabilization inserts 8f are placed between the freewheeling magnet inserts and the shaft for purposes of stabilizing the freewheeling magnets at the appropriate time and to improve torque by better alignment of the freewheeling magnet poles with the wound lateral pole irons for better flux linkage. The rotor mechanisms can be coupled to a shaft 8 which can be the power drive shaft of the high efficiency motor. A bearing rest 8g may be provided which fits into bearing 8i in end bell 2. The rotor shaft 8 may be fitted with a slip ring assembly 8k. Ring 8c may be connected to lead 8h which is connected to an eddy current rod which makes electrical contact as it goes through all laminates of the rotor in two locations 180° opposing one another. Slip ring 8d is connected to lead wire 8a which is one side of a floating, or alternating, (+) (−) lead which is shifted or alternated by a gating mechanism within the solid state excitation boards. Slip ring 8e is connected to lead wire 8b, which is the matching lead of 8a, therefore, is the opposite lead of the coil lead and is also a floating, alternating (+) (−) lead which is shifted by a gating mechanism within the solid state excitation boards. Specifically, rotor 6 can be placed inside a stator 15 shown in FIG. 2B. Stator 15 can contain slots, coils, and wound lateral pole irons as will be described in greater detail hereinafter.

Figure 3A:
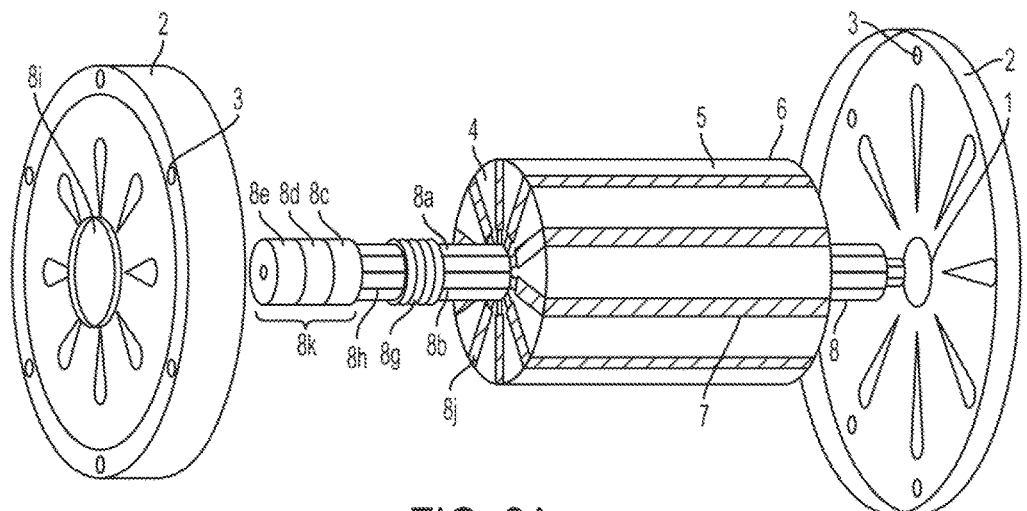
FIG. 3A is a diagram illustrating a lateral view of an exemplary rotor containment unit revealing slip rings, bearing rests, electromagnetic pole inserts and end bells in accordance with one or more embodiments.
Figure 3B:
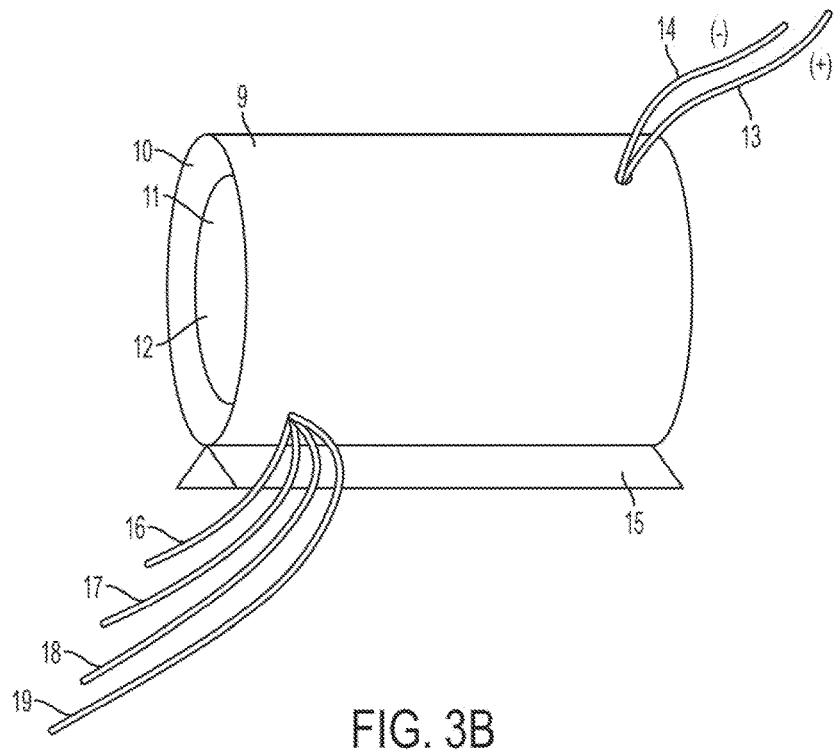
FIG. 3B is a diagram illustrating a lateral view of an exemplary stator and leads in accordance with one or more embodiments.

An additional alternate embodiment by way of example is seen in FIG. 3A. This embodiment reveals a greatly improved method of establishing sequential flux linkage between rotor electromagnetic pole inserts 8j and the wound lateral pole irons of the stator as will be further described later. In this embodiment a stator 15 can accommodate a rotor 6 having cavities that hold stator inserts 4 which house rotor electromagnetic pole inserts 8j. Stator inserts 4 have openings 7 that allow flux linkage in sequential fashion between rotor electromagnetic pole inserts 8j and the lateral pole irons. The rotor inserts accommodate rotor electromagnetic pole inserts 8*j*. The rotor mechanism can be coupled to a shaft 8 which can be the power drive shaft of this embodiment of the high efficiency motor. A bearing rest 8*g* may be provided which fits into bearing Bi in end bell 2. The rotor shaft 8 may be fitted with a slip ring assembly 8*k*. Ring 8*c* may be connected to lead 8*h* which is connected to an eddy current rod which makes electrical contact as it goes through all laminations of the rotor in two locations 180° opposing one another. The slip ring 8*d* is connected to lead wire 8*a* which lead wire is one side of a floating, or alternating (+)(−) lead arrangement which is alternated by a gating mechanism within the solid state excitation boards. Slip ring Se is connected to lead wire 8*b* which is the matching lead of 8*a*, therefore, is the opposite lead of the coil lead is also a floating, or alternating, (+)(−) lead which is shifted by a gating mechanism within the solid state excitation board. Specifically rotor 6 can be placed inside a stator 15, shown in FIG. 3B. Stator 15 can contain slots, coils, and wound lateral pole irons as will be described in greater detail later in this application.

Figure 4A:
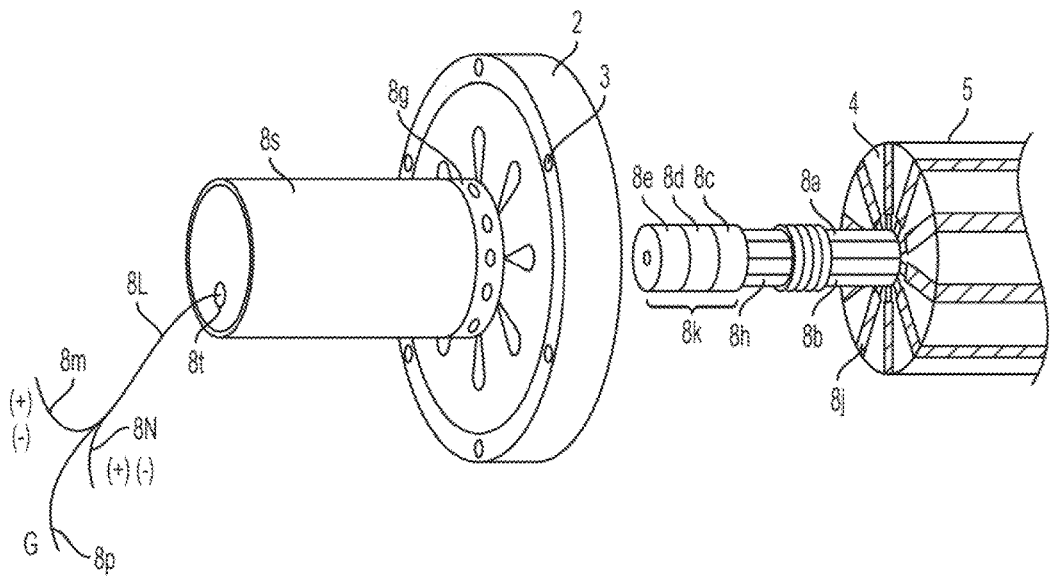
FIG. 4A is a diagram illustrating a lateral view of an exemplary rotor containment unit containing and end bell with slip ring brush support means, slip ring, bearing rest and electromagnetic pole inserts in accordance with one or more embodiments.
Figure 4B:
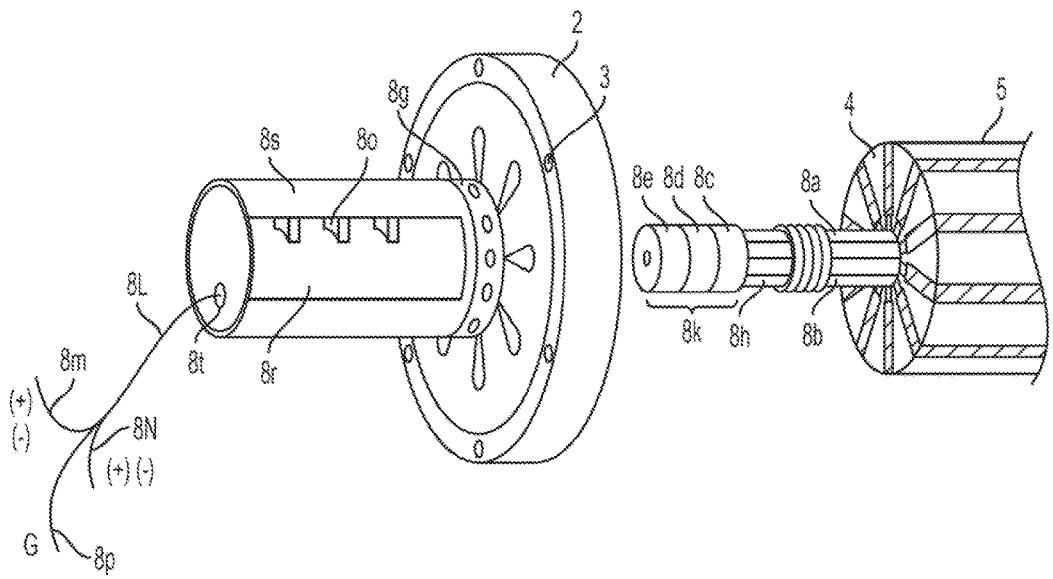
FIG. 4B is a diagram illustrating a lateral view of an exemplary rotor containment unit revealing an end bell with a cutaway of a view of a slip ring brush support means, slip ring, bearing rest and electromagnetic pole inserts in accordance with one or more embodiments.

By way of further explanation of an exemplary component of one or more embodiments, FIG. 4A reveals a slip ring brush holder containment means 8*s* which is bolted to end bell 2 by bolt mechanism 8*q*. Power cable 8*l* exits 8*s* through port 8*t* from slip ring brush holder containment means 8*s*. Leads 8*m* (+) (−), 8*n* (+)(−) and rotor eddy current ground 8*p* are attached to slip ring brushes 8*o* in FIG. 4B. Slip ring brushes 8*o*, in operating mode, are configured so as to make contact with slip ring 8*k*. Lead 8*p* discharges eddy currents from the stator to earth ground. Leads 8*m* and 8*n* alternate between (+) (−) and (−) (+). This switching mode is accomplished by a switching gating mechanism in the computer/PLC (Programmable Logic Center) controlled excitation boards.

The switching to accommodate alternating polarity requirements of the rotor electromagnetic pole inserts and rotor magnetic stabilization inserts of exemplary embodiments by way of reference to several exemplary embodiments rotor 6 (FIG. 1A, FIG. 2A and FIG. 3A) is constructed of non-ferromagnetic material.

Figure 5:
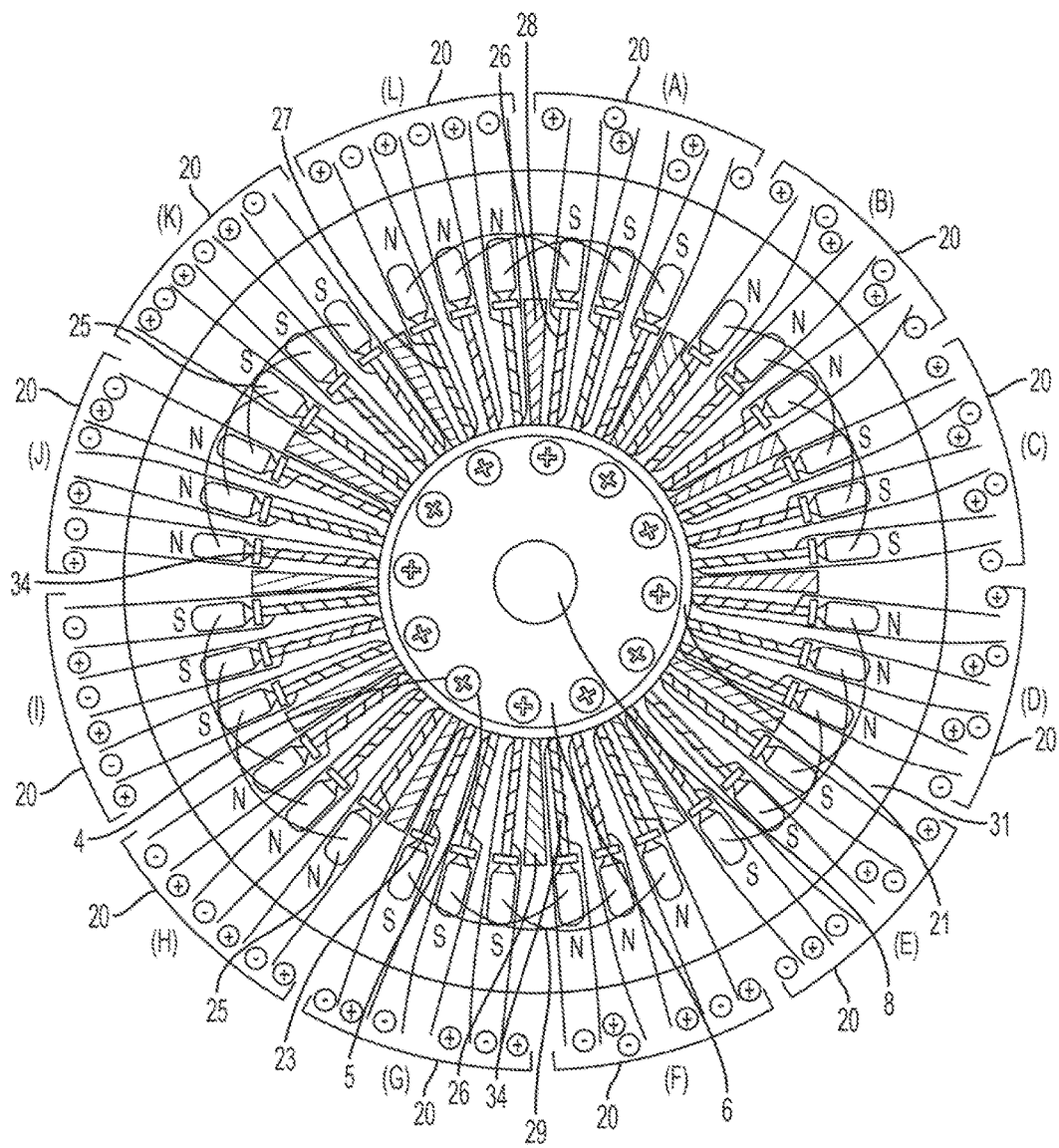
FIG. 5 is a diagram illustrating a cross-sectional end view of an exemplary stator and stator insert portion including a rotor and exemplary freewheeling permanent magnetic inserts and lateral pole irons along with windings and leads to support a solid state DC stator pole excitation sequencing system in one or more embodiments.

A more detailed understanding of the structure of the stator assembly can be gained with reference to FIG. 5. Therein, a cross-sectional end view of laminated stator iron 31, laminated pole irons 34, and rotor 6 is shown. Containment sleeves 4 can accommodate freewheeling permanent magnetic inserts 5 therein. Laminated stator iron 31 can contain open wire slots 25 which are insulated and can contain the power induction coils 29 as will be described in greater detail hereinafter. The stator 31 and associated lateral pole iron support structure, for illustration and description purposes, can be divided into sectors such as sector A-L and allocated with a number of slots 25 which are three slots per sector in the present example FIG. 5. Each sector can contain a series of slots associated with a number of lateral pole irons having lateral pole iron windings wound of a particular magnetic polarity. As the lateral pole irons are excited, through DC current activation of the lateral pole iron windings in a sequential fashion, a moving magnetic field is developed.

Dividing each set of two sectors is a support segment 26. A support segment 26 that can be attached to and can support lateral pole iron containment ring 21, which in turn, can support the inner ends of the lateral pole iron 34 are coupled to, contained in, inserted into, adjacent to, magnetically coupled to, or the like, respective ones of the open wire slots 25. While the other end of the lateral pole irons 34 are illustrated as being inserted into, it will be appreciated that other configurations are possible that position the ends of the lateral pole irons over the slots to allow flux generated within the lateral pole irons to be coupled with the side iron and back iron of slot 25 and into the windings 29. Rotor 6 is positioned on shaft 8 and contains rotor inserts 4, which as noted, are configured to contain freewheeling magnet inserts 5, within a magnetically shielded containment means that includes a roller bearing support housed in containment sleeve that consists of laminations of mu metal and carbon steel or the like with an opening in at least one location and in this instance on the periphery.

Figure 6:
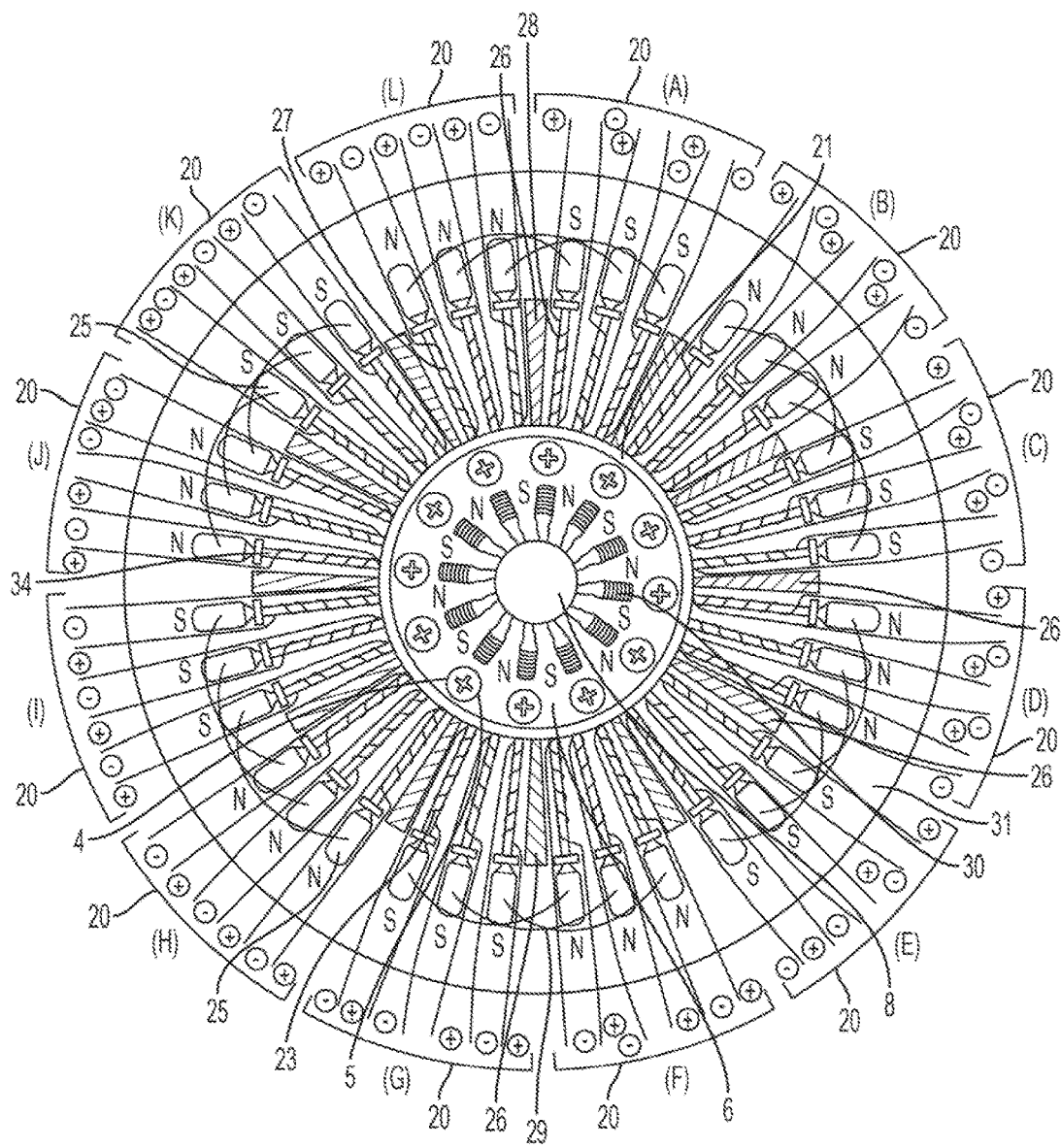
FIG. 6 is a diagram illustrating a cross-sectional end view of an exemplary stator and stator insert portion including a rotor and exemplary freewheeling permanent magnetic inserts along with permanent magnetic stabilizing coils and lateral pole irons along with winding and leads to support a solid state DC stator pole excitation sequencing system in one or more embodiments.

A more detailed understanding of an alternate embodiment and its assembly can be gained with reference to FIG. 6. Therein, in a cross-sectional end view, laminated stator iron 31, laminated lateral pole irons 34 and rotor 6 are shown. Containment sleeves 4 can accommodate freewheeling permanent magnet inserts 5 there within. Laminated stator iron 31 can contain open wire slots 25 which are insulated and can contain power induction coils 29 as will be described in greater detail hereinafter. The stator 31 and associated lateral pole iron support structures for illustration and description purposes, can be divided into sectors such as sectors A-L and allocated with a number of slots 25 which are three slots per sector in the present example FIG. 6. Each sector can contain a series of slots that are associated with a number of lateral pole irons having lateral pole iron windings wound in a particular magnetic polarity. As the lateral pole irons are excited via DC current activation of the lateral pole irons windings in a sequential fashion, a moving magnetic field is developed.

Dividing each of two sectors is a support segment 26 that can be attached to and can support lateral pole iron containment ring 21, which in turn, can support the inner ends of the lateral pole irons 34 which are coupled to, contained in, inserted into, adjacent to, magnetically coupled to, or the like, respective ones of the open wire slots 25. While the other end of the lateral pole irons 34 are illustrated as being inserted into, it will be appreciated that other configurations are possible that position the ends of the lateral pole irons over the slots to allow flux generated within the lateral pole irons to be coupled with the side iron and back iron of slots 25 and thus into the windings 29, thereby, generating voltage and/or current flow in windings 29. Rotor 6 is positioned on shaft 8 and contains rotor inserts 4, which as noted, are configured to contain freewheeling magnet inserts 5 within a magnetically shielded containment means that includes a roller bearing support housed in containment sleeve that consists of laminations of mu metal and carbon steel or the like with an opening in the periphery to allow magnetic coupling between the freewheeling magnetic pole and the excited lateral pole iron. The laminated containment sleeve has a second opening 180° diagonally across from the first opening, the second opening being on the shaft side of the laminated containment sleeve to allow flux coupling between the freewheeling magnetic poles and the freewheeling permanent magnet stabilizing coils 30, in which, by way of example, when the lateral pole iron is activated north pole the stabilizing coil in direct alignment and proximity to the adjacent freewheeling magnet is activated south pole at the same instant. Therefore, the relationship is as follows: Lateral pole iron (north pole), freewheeling magnet (south pole) facing the lateral pole iron and freewheeling magnet (north pole) facing the stabilizing coil 30, as the stabilizing coil is activated (south pole).

Figure 7:
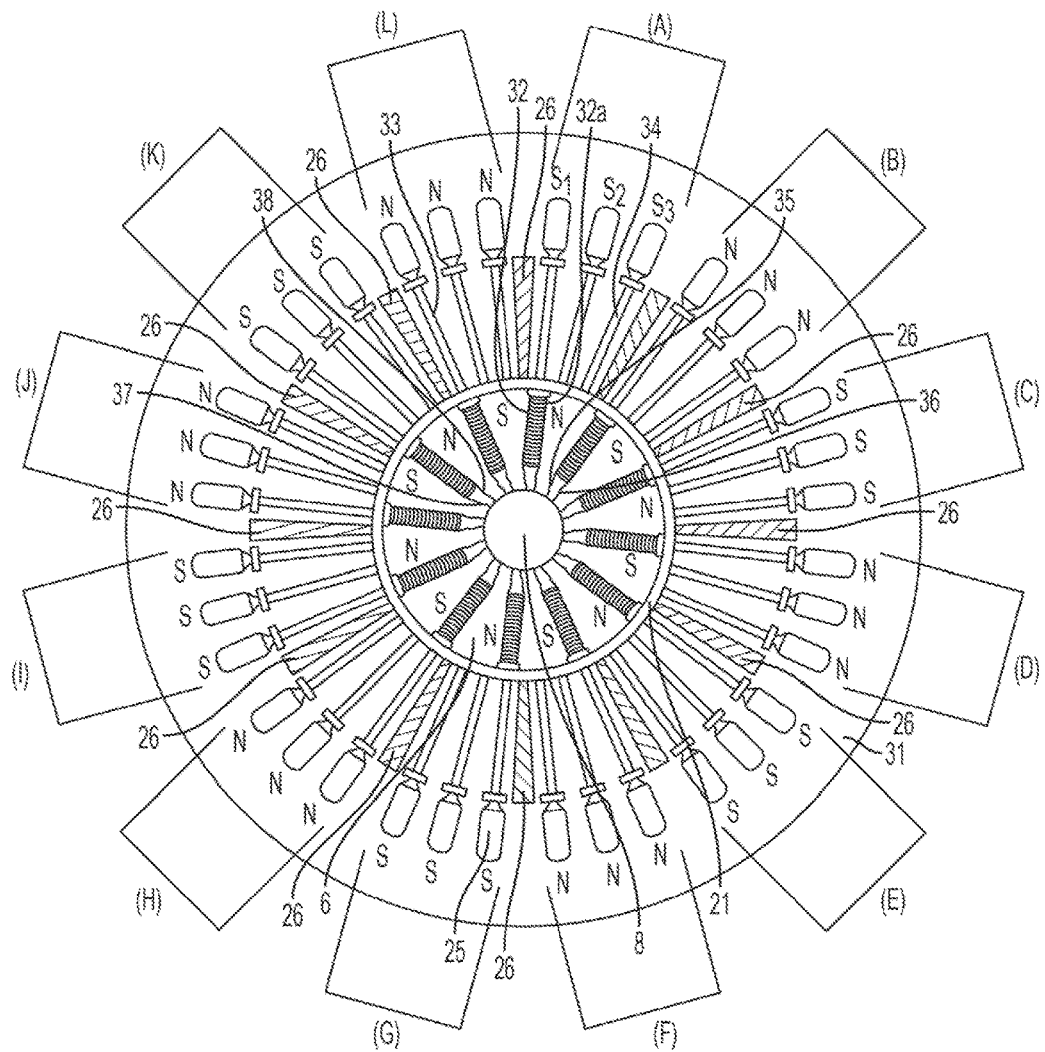
FIG. 7 is a diagram illustrating a cross-sectional end view of an exemplary stator and stator insert portion including a rotor and exemplary electromagnetic rotor pole inserts with power leads along with lateral pole iron without windings in one or more embodiments.
Figure 8:
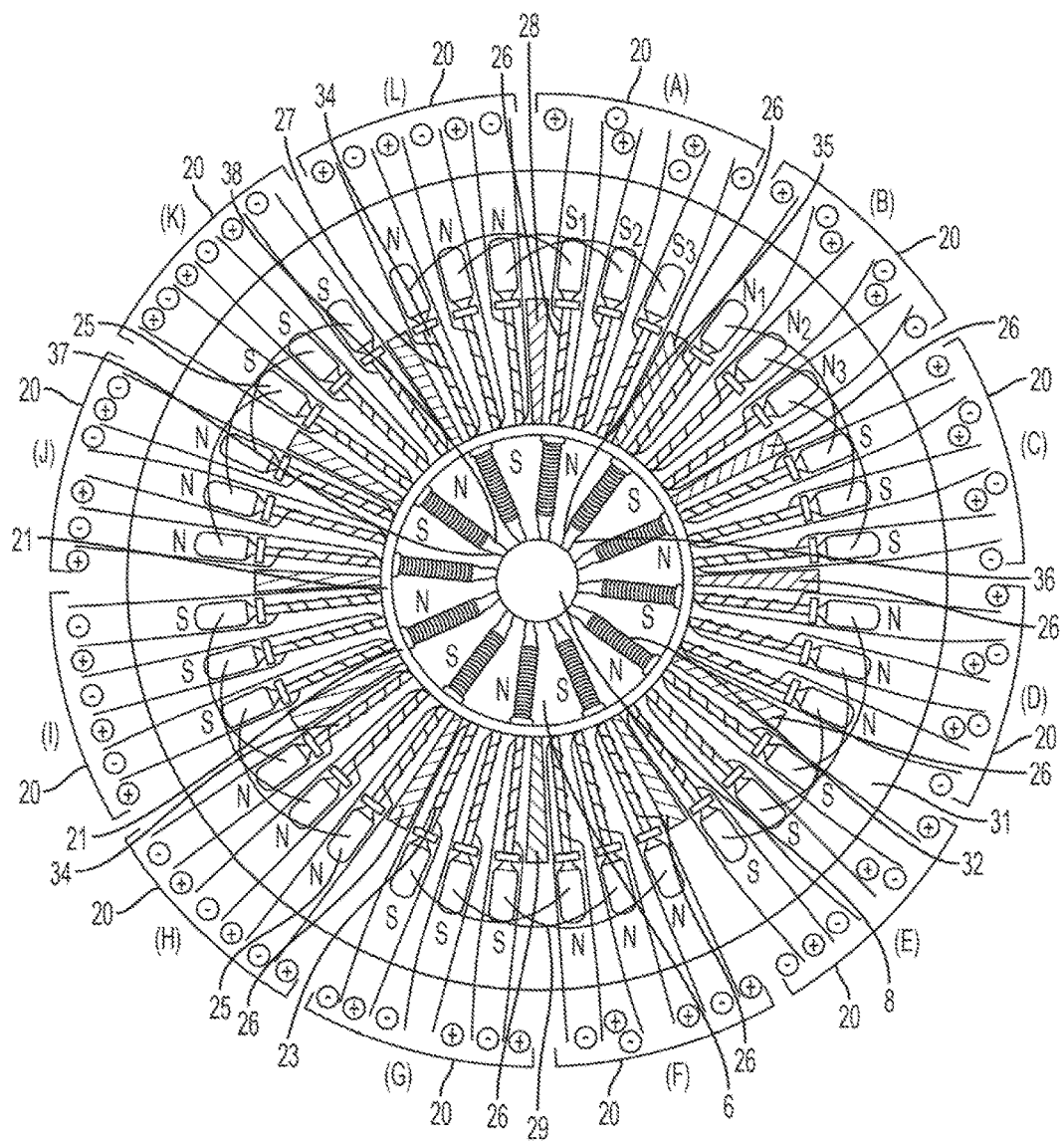
FIG. 8 is a diagram illustrating a cross-sectional end view of an exemplary stator and stator insert portion including a rotor and exemplary electromagnetic rotor pole inserts with power leads along with lateral pole irons with windings and leads to support solid state DC stator pole excitation sequencing system in one or more embodiments.

A more detailed understanding of an alternate embodiment and its assembly can be gained with reference to FIG. 7. Therein, in a cross-sectional end view, laminated stator iron 31, lateral pole irons 34 and rotor 6 are shown. Containment slot 32a can accommodate electromagnetic rotor pole inserts 32. North pole-south pole alternating leads are shown by way of example by 35-36, 37-38. The programmable excitation circuit switches north pole to south pole to north pole to south pole etc. every other segment as is seen in FIG. 6., segments A-L. The polarity of the electromagnetic pole insert changes polarity as it passes from one segment to the next segment passing over support segment 26. The electromagnetic pole insert maintains the same polarity for a complete segment and in this example three lateral pole irons, but is not limited to three. At a rotational speed of 3600 rpm's the travel time from, for example, segment or sector A to segment or sector B (FIG. 6, FIG. 7, and FIG. 8) is approximately 10 ms. The time required for the excited poles, and the electromagnetic pole inserts, to magnetically collapse and reach peak magnetic flux again is approximately 10 ms. Therefore, the pole will collapse as it leaves one segment, for example, segment A and reach maximum magnetic flux of the opposite polarity as it reaches segment B. In this example of FIG. 7, laminated stator iron 31 can contain open wire slots 25 which are insulated and can contain power induction coils 29 FIG. 8. The stator 31 and associated lateral pole iron support structure, for illustration and description purposes, can be divided into sectors such as sector A-Land allocated with a number of slots 25, which are three slots per sector in the present example in FIG. 7. Each sector can contain a series of slots that are associated with a number of lateral pole irons having lateral pole iron windings, wound in a particular magnetic polarity (FIG. 7 and FIG. 8).

As the lateral pole irons are excited through direct current activation of the lateral pole iron windings in a sequential fashion, a moving magnetic field is developed. Dividing each set of two sectors is a support segment 26 that can be attached to and can support lateral pole iron containment ring 21, which in turn, can support the inner ends of the lateral pole irons 34 which are coupled to, contained in, inserted into, adjacent to, magnetically coupled to, or the like, respective ones of the open wire slots 25. While the other ends of the lateral pole iron 34 are illustrated as being inserted into, it will be appreciated that other configurations are possible that position the ends of the lateral pole irons over the slots to allow flux generated within the lateral pole irons to be coupled with the side iron and back iron of slots 25 and thus into the windings 29 (FIGS. 5, 6, 8 and 9) thereby generating voltage and/or current flow in said windings 29.

Rotor 6 is positioned on shaft 8 and contains electromagnetic rotor pole insert 32. The electromagnetic pole inserts 32 are locked in place by a slotted locking mechanism housed in containment slot 32a which can accommodate electromagnetic rotor pole inserts 32. The electromagnetic rotor pole inserts 32 are flush with the peripheral surface of rotor 6, to allow magnetic coupling between the expanded peripheral portion of electromagnetic rotor pole insert 32 and the inner ends of the lateral pole irons. The wound lateral pole irons in each sector fire sequentially for 6.6 ms in the case of rotational speeds of 3,000 rpm and 5.55 ms in the case of rotational speeds of 3,600 rpm and at the appropriate sequence and rate for faster and slower speeds.

The pole irons are either north pole wound or south pole wound for a given sector and alternate as for example sector (A)-south pole, sector (B)-north pole, sector (C)-south pole, sector (D)-north pole, sector (E)-south pole, sector (F)-north pole, sector (G)-south pole, sector (H)-north pole, sector (I)-south pole, sector (J)-north pole, sector (K)-south pole, and sector (L)-north pole. The lateral pole irons fire in sequence and in repetitive fashion in for example for three lateral pole irons per sector, every 6.6 ms or at other appropriate speeds as for an additional example, in sector (A), the sequence is as follows: 51, (6.6 ms) –752 (6.6 ms) –753 (6.6 ms) –751 (6.6 ms) –7 etc. The sequence described in the example for sector (A) above is repeated, simultaneously with sector (A) as well as in sectors (B), sector (C), sector (D), sector (E), sector (F), sector (G), sector (H), sector (I), sector (J), sector (K), and sector (L).

In FIG. 8 an example is illustrated in sector (A) during the sequential south pole firing of 51, 52, and 53, the electromagnetic rotor pole insert is excited north pole by the solid state excitation system such that the sequential rotary movement of the south pole magnetic flux in the lateral pole iron coupled with the north pole flux of the electromagnetic rotor pole insert 32 to induce a rotary motion with the appropriate torque in rotor 6 which is transferred to a rotational mode through rotor shaft 8. As a further example in FIG. 8 in sector (B) during sequential firing of N1, N2 and N3 the electromagnetic rotor pole insert is excited south pole by the solid state excitation system such that the sequential rotary movement of the magnetic flux in the lateral pole iron coupled with the south pole of the electromagnetic rotor pole insert 32 to induce a rotary motion with torque in rotor 6 which is transferred to a rotational load through rotor shaft 8. Electromagnetic rotor pole inserts 32 are powered or excited through lead pairs of as an example lead wires 35 and 36 as well as pairs 37 and 38. These pairs of lead wires are "floating" leads utilized by all 12 electromagnetic rotor pole inserts. The lead wires are alternatively fed current from the excitation board such that they alternate polarity (+) –7 (–) and (–) –7 (+).

A further detailed understanding of an exemplary embodiment and its assembly and function can be gained with reference to FIG. 8. Therein, in a cross-sectional end view laminated stator iron 31, lateral pole irons 34 (FIG. 7 and FIG. 8) and rotor 6 are shown. Containment slot 32a (shown and labeled in FIG. 7) can accommodate electromagnetic rotor pole inserts 32 (FIG. 7). North pole/south pole alternating leads are shown by way of example by 35-36 and 37-38. The programmable excitation circuit switches north pole –7 south pole –7 north pole –7 south pole –7 etc. i.e. the polarity switches as it passes over the next segment in its rotation as it passes segments A-L. The polarity of the electromagnetic pole insert changes as it passes from one segment to the next segment passing over support segment 26. The electromagnetic pole insert maintains the same polarity for a complete segment or sector and then this example three (3) lateral pole irons, but not limited to three (3). At a rotational speed of 3,600 rpm the travel time from, for example, segment or sector A to segment or sector B is approximately 10 ms. The time required for the excited poles, of the electromagnetic pole inserts to collapse when current is discontinued and to reach peak magnetic flux again when current is fed from the opposite direction is approximately 10 ms. Therefore, the pole will collapse as it leaves one sector or segment, for example sector or segment A and reach maximum magnetic flux of the opposite polarity as it reaches sector or segment B. it is obvious to anyone schooled and skilled in the art that timing manipulation of the beginning of excitation of the rotor in the above examples may be manipulated to reach maximum torque and minimum drag.

In this example of FIG. 8 laminated stator iron 31 can contain open wire slots 25 which are insulated and can contain power induction coils 29. The stator 31 and associated lateral pole iron support structure, for illustration and description purposes, can be divided into sectors such as sector A-L and allocated with a number of slots 25 which are three slots per sector in the present example FIG. 8. Each sector can contain a series of slots that are associated with a number of lateral pole irons having lateral pole iron windings wound in a particular magnetic polarity FIG. 8. As the lateral pole irons are excited through direct current activation of the lateral pole iron windings, in sequential fashion, a moving magnetic field is developed.

Dividing each set of two sectors is a support segment 26 that can be attached to and can support lateral pole iron containment ring 21, which in turn, can support the inner ends of the lateral pole irons 34 which are coupled to, contained in, inserted into, adjacent to, magnetically coupled to, or the like, respective ones of the open wire slots 25. While the other end of the lateral pole iron 34 are illustrated as being inserted into, it will be appreciated that other configurations are possible that position the ends of the lateral pole irons over the slots to allow flux generated within the lateral pole irons to be coupled with the side iron and back iron of slots 25 and thus into the windings 29 (FIGS. 5, 6, 8 and 9) thereby generating voltage and/or current flow in said windings 29.

Rotor 6 is positioned on shaft 8 and contains electromagnetic rotor pole inserts 32. The electromagnetic rotor pole inserts 32 are locked in place by a slotted locking mechanism housed within the containment slot 32a (FIG. 7) which can accommodate electromagnetic rotor pole inserts 32. The central end of the electromagnetic rotor pole inserts 32 are flush with the peripheral surface of rotor 6 to allow magnetic coupling between the expanded peripheral portion of electromagnetic rotor pole inserts 32 and the inner ends of the lateral pole irons. The wound lateral pole irons in each sector fires sequentially for 6.66 ms in the instance for example in the case of rotational speed of 3,000 rpm and 5.55 ms in the example of rotational speeds of 3,600 rpm and at the appropriate sequence and speeds for faster or slower rotational speeds. The lateral pole irons are either north pole wound or south pole wound for a given sector and alternate from sector to sector, as for example, sector (A)-south pole, sector (B)-north pole, sector (C)-south pole, sector (D)-north pole, sector (E)-south pole, sector (F)-north pole, sector (G)-south pole, sector (H)-north pole, sector (1)-south pole, sector (J)-north pole, sector (K)-south pole, and sector (L)-north pole. The lateral pole irons fire in sequence and in repetitive fashion in for example for three lateral pole irons per sector, every 6.6 ms or at other appropriate speeds as for an additional example, in sector (A), the sequence is as follows: S1, (6.6 ms) –7S2 (6.6 ms) –7S3 (6.6 ms) –7S1 (6.6 ms) –7 etc.

The sequence described in the example for sector (A) above is repeated, simultaneously with sector (A) as well as in sectors (B), sector (C), sector (D), sector (E), sector (F), sector (G), sector (H), sector (I), sector (J), sector (K), and sector (L). In FIG. 8 as an example in sector (A) during the sequential south pole firing of S1, 52, and 53, the electromagnetic rotor pole insert is excited north pole by the solid state excitation system which is triggered by the signal from an end coder on the rotor shaft such that the sequential rotary movement of the magnetic flux in the lateral pole iron sector (A) couples with the north pole of the electromagnetic•rotor pole insert 32 to induce a rotary motion with the appropriate resultant torque in rotor 6 which is transferred to a rotational load through rotor shaft 8. As a further example in FIG. 8 in sector (B) during sequential firing of N1, Ni, N3 the electromagnetic rotor pole insert is excited south pole by the solid state excitation system such that the sequential rotary movement of the magnetic flux in the lateral pole iron couples with the south pole of the electromagnetic rotor pole insert 32 to induce a rotary motion with torque in rotor 6 which is transferred to a rotational load through rotor shaft 8. Electromagnetic rotor pole inserts 32 are powered or excited through lead pairs as example lead wires 35 and 36 as well as pairs 37 and 38. The pairs of leads by example are "floating" leads utilized by all 12 electromagnetic rotor pole inserts. The lead wires are alternatively fed current from the solid state excitation boards such that they alternate polarity, e.g. from (+) to (−) and from (−) to (+).

Figure 9:
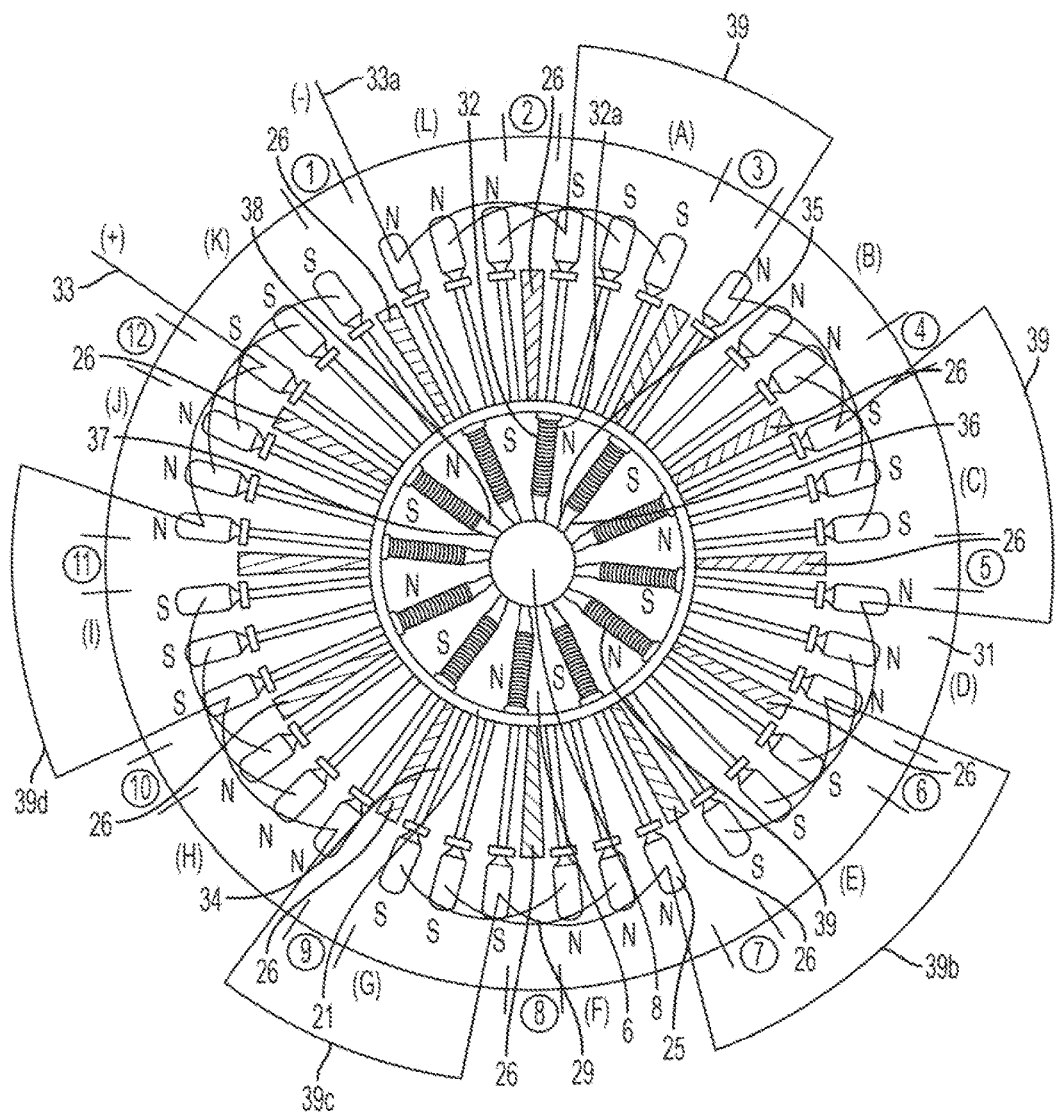
FIG. 9 is a diagram illustrating a cross-sectional end view of an exemplary stator and stator insert portion including a rotor and exemplary electromagnetic rotor pole insert with power leads along with lateral unwound pole irons and stator power generating coils in one or more embodiments.

A further detailed understanding of an exemplary embodiment and its assembly and function can be gained with reference to FIG. 9, in which a cross-sectional end view, laminated stator iron 31, lateral pole irons 34, and rotor 6 are shown. Containment slot 32a in rotor 6 can accommodate electromagnetic rotor pole inserts 32. The north pole/south pole alternating leads are shown by way of example by 37-38. The programmable excitation circuit switches north pole 7 south pole −? north pole −? south pole etc., i.e. the polarity switches as it passes over the next segment in its rotation as it passes segments A-L. The polarity of the electromagnetic pole insert changes as it passes from one segment to the next segment passing over support segment 26. The timing of the pole reversal is dictated by a rotor encoder which signals the PLC onboard the excitation card. The electromagnetic pole insert maintains the same polarity for a complete segment and in this example three (3) lateral pole irons, but not limited to three (3), at a rotational speed of 3,600 rpm the travel time for example segment (A) to segment (B) is approximately 10 ms. The time required for the excited magnetic pole, of the electromagnetic pole inserts to collapse when current is off and to again reach peak magnetic flux when current is fed from the opposite direction is approximately 10 ms. Therefore the pole will collapse as it leaves one segment for example, segment (A) and reaches maximum magnetic flux of the opposite polarity as it reaches segment (B).

In this example of FIG. 9 laminated stator iron 31 can contain open wire slots 25 which are insulated and can contain power induction coils 29. Dividing each set of two sectors is a support segment 26 that can be attached to and can support lateral pole iron containment ring 21, which in turn can support the inner ends of the lateral pole irons 34, which are coupled to contained in, inserted into, adjacent to, magnetically coupled to, or the like, respective ones of the open wire slots 25. These configurations may position the ends of the lateral pole irons over the slots to allow flux generated within the lateral pole irons to be coupled with the side iron, and back iron of slots 25 and thus into winding 29 thereby generating voltage and/or current flow in said windings 29. The power induction coils 29 are connected in series with jumper wires 39, 39a, 39b, 39c, and 39d connecting the "out lead" of each coil to the "in lead" of the next coil. For example, the "in leads" and "out leads" are designated by consecutive circled numbers 1-12. As shown in FIG. 9, in sector L-A circle 2 is connected via jumper wire 39 to circle 3 lead in sector B-C. This hookup arrangement can be continued in a clockwise fashion until all coils are connected in series with remaining leads 33 (+) and 33a (−). These leads 33 and 33a may be used to parallel power to the solid state excitation system.

Figure 10A:
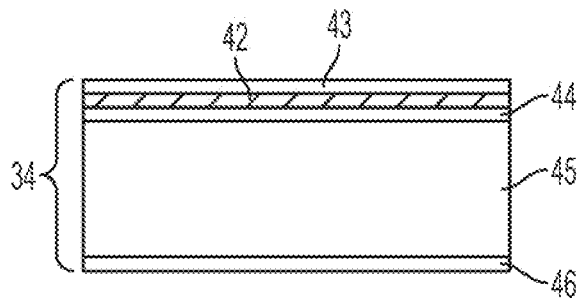
FIG. 10A is a diagram illustrating a lateral view of an exemplary unwound lateral pole iron in accordance with one or more embodiments.
Figure 10B:
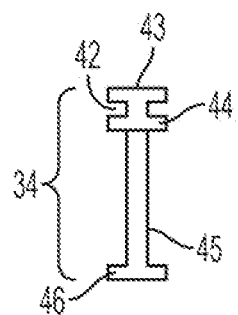
FIG. 10B is a diagram illustrating an end view of an exemplary unwound lateral pole iron in accordance with one or more embodiments.

Further understanding and its assembly and function can be gained with reference to FIGS. 10A and 10B, which is a diagram illustrating a lateral view of an exemplary unwound lateral pole iron 41. Section 45, the pole iron is defined by a boundary of cross member 46 which attaches to the lateral pole iron containment ring. The stator attachment means is represented by 42, 43, and 44. This piece forms a groove mechanism which by example may be fitted onto the tooth area of stator 31 FIG. 9. FIG. 10B is an end view of the unwound lateral pole iron 41.

Figure 11A:
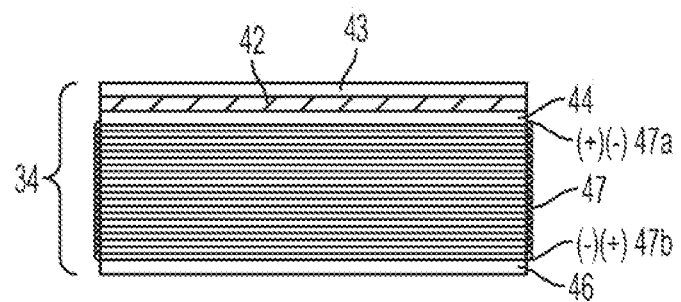
FIG. 11A is a diagram illustrating a lateral view of an exemplary copper magnet wire wound lateral pole iron in accordance with one or more embodiments.
Figure 11B:
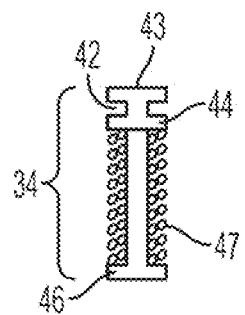
FIG. 11B is a diagram illustrating an end view of an exemplary copper magnet wire wound lateral pole iron in accordance with one or more embodiments.

Further understanding and its assembly and function can be gained with reference to FIGS. 11A and 11B. FIG. 11A shows wound lateral pole iron 41 with winding 47 which may be wound clockwise for a south pole production and counterclockwise for a north pole production. Leads 47a and 47b may be activated as positive or negative leads to produce the desired polarity.

Additional understanding and its assembly and function can be gained with reference to FIG. 12A, which is a diagram illustrating a lateral and end view of an exemplary unwound iron pole piece of an electromagnetic rotor pole magnet stabilization insert 52. Section 50 the pole coil area is defined by a boundary of cross members area 51 and 49. An interlocking slot 48 is revealed which locks iron pole piece 52 in place in rotor 6.

For further understanding and its assembly and function, one can refer to FIG. 12B, which is a diagram illustrating a lateral and end view of an exemplary wound iron pole piece of an electromagnetic rotor pole magnet stabilization insert 52. Winding 53 is made of electrical magnet wire wound onto insulated pole iron 50. The coil boundaries are established by cross members 49 and 51. Interlocking slot 48 is revealed in the end view. Leads 54 and SS are "floating" leads which may be positive or negative for switching from north pole to south pole and from south pole to north pole. This switching function is controlled by a gating mechanism which is contained in the solid state excitation boards.

Figure 13A:
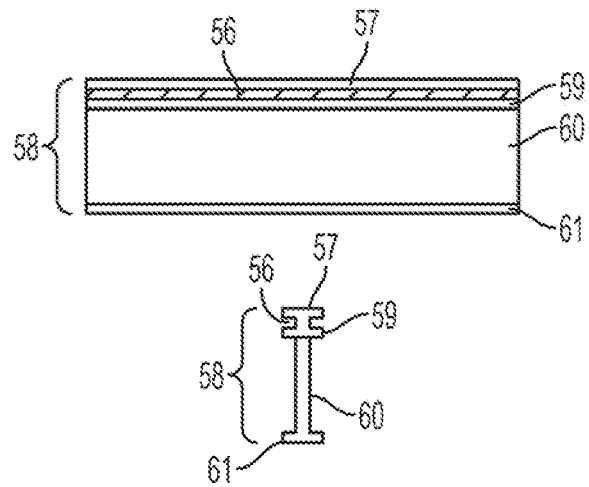
FIG. 13A is a diagram illustrating a lateral and end view of an exemplary wound iron pole piece of an electromagnetic rotor pole insert in accordance with one or more embodiments.
Figure 13B:
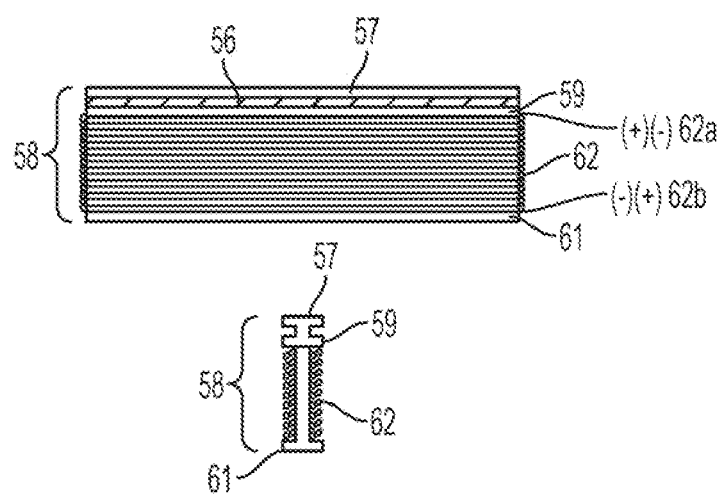
FIG. 13B is a diagram illustrating a lateral and end view of an exemplary copper magnet wire wound iron pole piece of an electromagnetic rotor pole insert in accordance with one or more embodiments.

Additional understanding, its assembly and function can be gained when one refers to FIG. 13A, which is a diagram illustrating a lateral and end view of an exemplary unwound iron pole piece of an electromagnetic rotor pole insert S8. Section 60, the pole coil area is defined by a boundary of cross member 61 and interlocking complex 56, 57, and 59 FIG. 13B reveals. Coil 62 which is wound on insulated iron 6 contains two lead wires 62a and 62b. These leads each may be either positive or negative for switching from north pole to south pole and south pole to north pole. This switching function is controlled by a gating mechanism which is contained in the solid state excitation boards which may be used to excite the electromagnetic rotor pole insert 58.

Figure 14A:
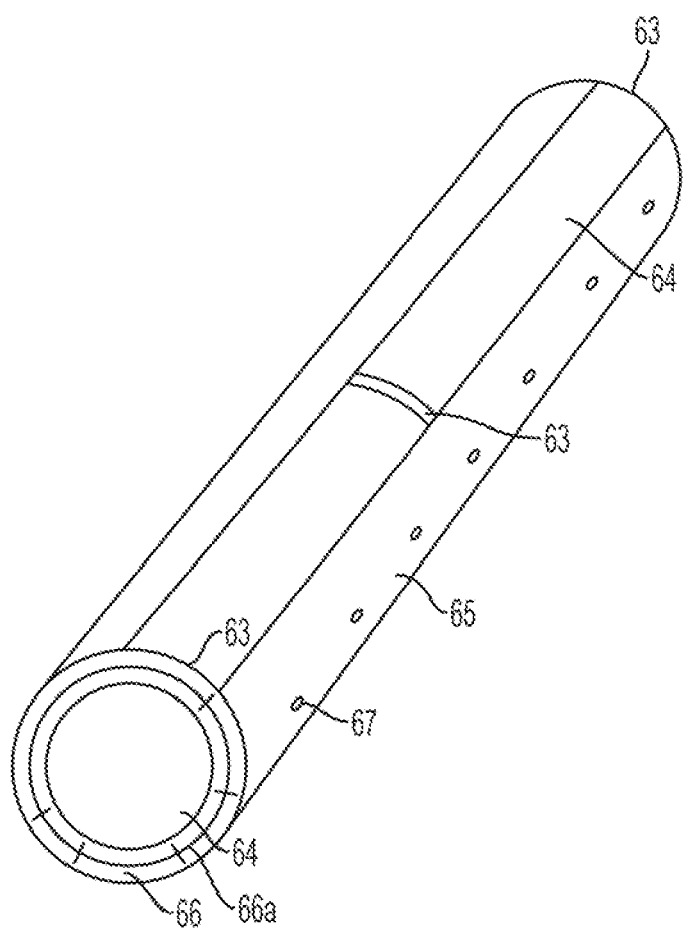
FIG. 14A is a diagram illustrating a lateral oblique view of a carbon steel—mu metal laminated sleeve in a pole cavity of the rotor in accordance with one or more embodiments
Figure 14B:
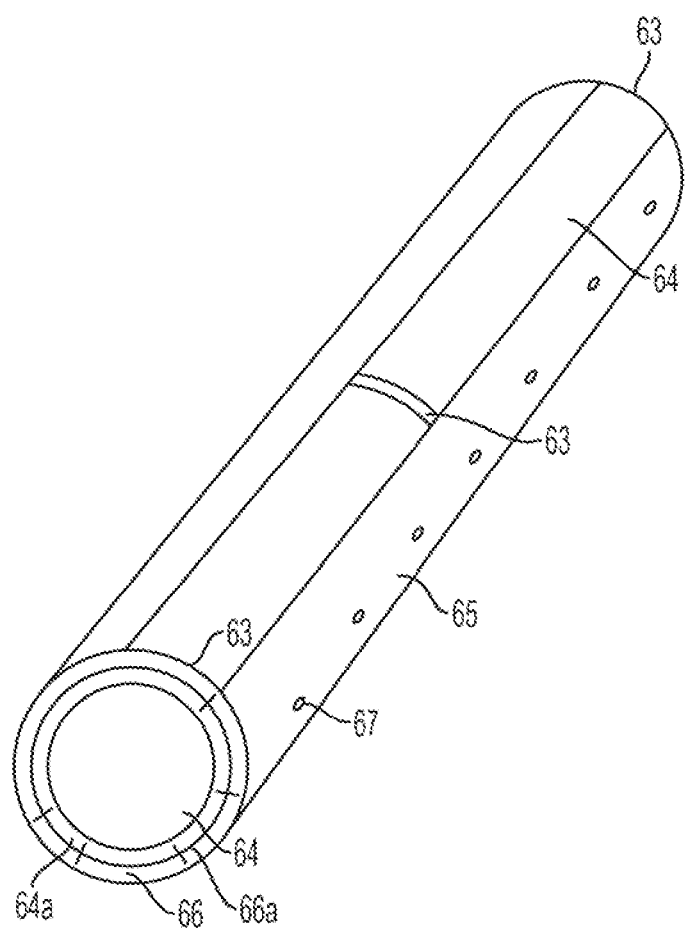
FIG. 14B is a diagram illustrating a lateral oblique view of the carbon steel—mu metal laminated sleeve with opening for flux linkage with a electromagnetic rotor pole magnet stabilizing insert in a pole cavity in accordance with one or more embodiments.

Further understanding and its assembly and function can be gained with reference to FIG. 14A, which is a diagrammatic representation of a lateral oblique view of the carbon steel/mu metal laminated sleeve which is pressed into the pole cavity of the rotor in accordance with one or more embodiments. In an embodiment, the length of the sleeve can correspond to the width of an exemplary rotor, such as 8 inches in the present example. However, the length could be longer or shorter depending upon the particular application. The laminations are constituted of non-magnetic or magnetic carbon steel and nickel-iron alloy such as mu metal. While mu metal provides excellent shielding properties, it is relatively soft compared to steel, which, while providing a degree of shielding is stronger than the mu metal. Therefore the laminations combining steel and mu metal provides excellent strength and magnetic shielding properties. In the event that a magnetic steel is used, the mu metal still provides excellent magnetic shielding properties. The insert represented in FIG. 14B can be pressed into a cavity, machined or laser cut into the rotor 6 laminates or solid material block. The laminated sleeve 65 can be provided with an opening 64 and 64a as shown in FIG. 14B to allow the magnetic flux fields associated with the freewheeling permanent magnet inserts 4 to have unobstructed interaction and magnetic coupling with an end of a lateral pole iron, such as lateral pole iron 34. A bearing support 63 can be provided and can be formed for example, as a groove in the sleeve which gives additional structural support and provides a guide for the bearings of the rotor insert 4.

Figure 15:
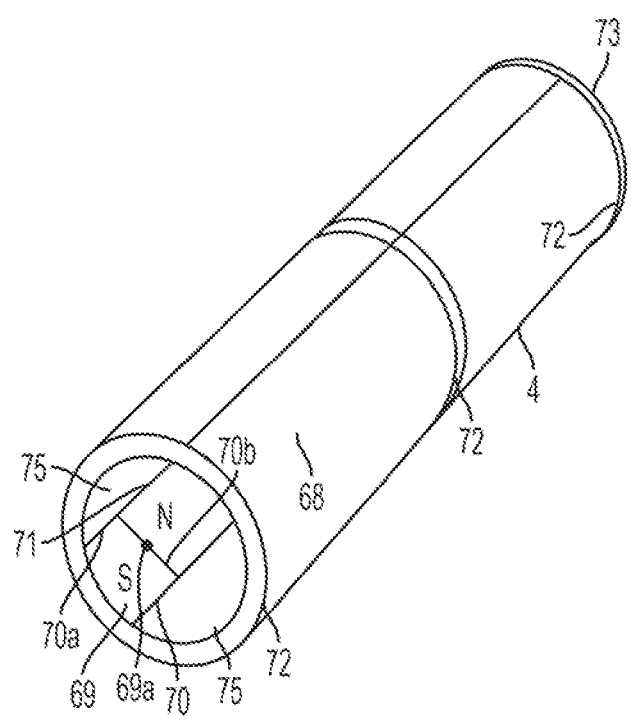
FIG. 15 is a diagram illustrating a lateral superior oblique view of a pole magnet containment structure and permanent pole magnets housed in a laminated steel—mu metal sleeve and supported by bearings in accordance with one or more embodiments.

A lateral oblique of rotor insert 4, which is housed in the above described laminated steel/mu metal sleeve, is shown in FIG. 15. Each of the sleeves and all of the assemblies pertinent thereto can be arranged along and rotate about a longitudinal axis 69b. The magnet containment means 4 is constructed of non ferro-conductive material such as carbon fiber or austenitic steel or the like. Through open slot or opening 68, permanent magnets 69 and 71 can be exposed for example, the lateral pole iron ends as described above and can form flux linkage between the permanent magnets and the magnetized lateral pole irons. Permanent magnets 69 and 71 can be constituted of, for example, neodymium, samarium-cobalt, or similar quality high energy product magnetic bodies. Permanent magnet 71 can be bonded to a thin ferro-conductive sheet 70b with the north pole facing the outer surface of the containment means. Permanent magnet 69 can be bonded to thin ferro-conductive sheet 70b with the south pole facing the outer surface of the containment means. An appropriately sized layer of mu metal can be used to form shield 70 and 70a, which can be bonded to the lateral surface of the permanent magnet 69, sheet 70b and permanent magnet 71. The magnet support 4 can be attached inside the above described laminated sleeve 65 FIG. 14 and can provide rotation via ball bearing or roller bearings such that the magnet support means 4 may be turned freely without significant mechanical drag.

Figure 16:
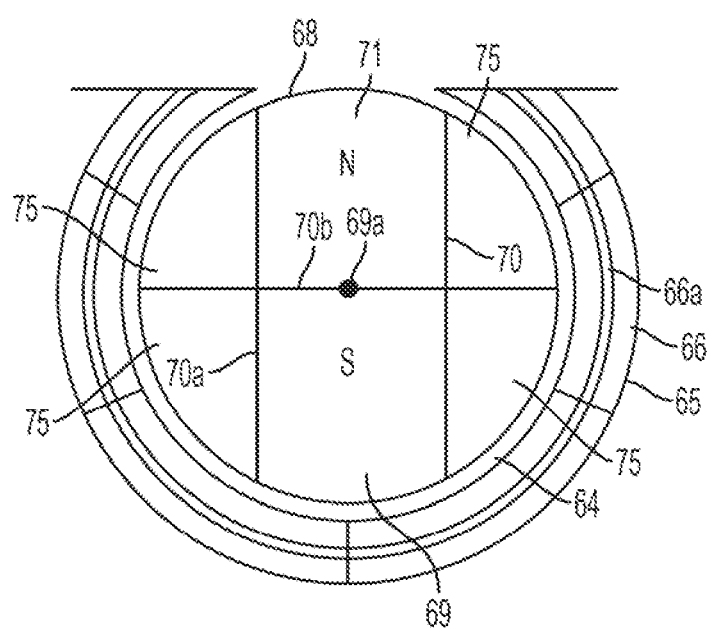
FIG. 16 is a diagram illustrating an end view of a pole magnet and containment structure housed in a carbon steel—mu metal sleeve contained within cavities in the periphery of the rotor in accordance with one or more embodiments.

FIG. 16 is an end view of the rotor insert 4, including freewheeling magnet inserts 69 and 71 contained within the containment means 75, which in turn, can be contained within laminated sleeve 65. The rotor insert 4 can be contained within cavities that are formed in the periphery of the rotor 6 as described herein above. In FIG. 16 mu metal cylinder 66 is bonded to carbon steel cylinder by bonding glue 66a. The laminated structure 65 is stabilized by bonding rivets 67.

Figure 17:
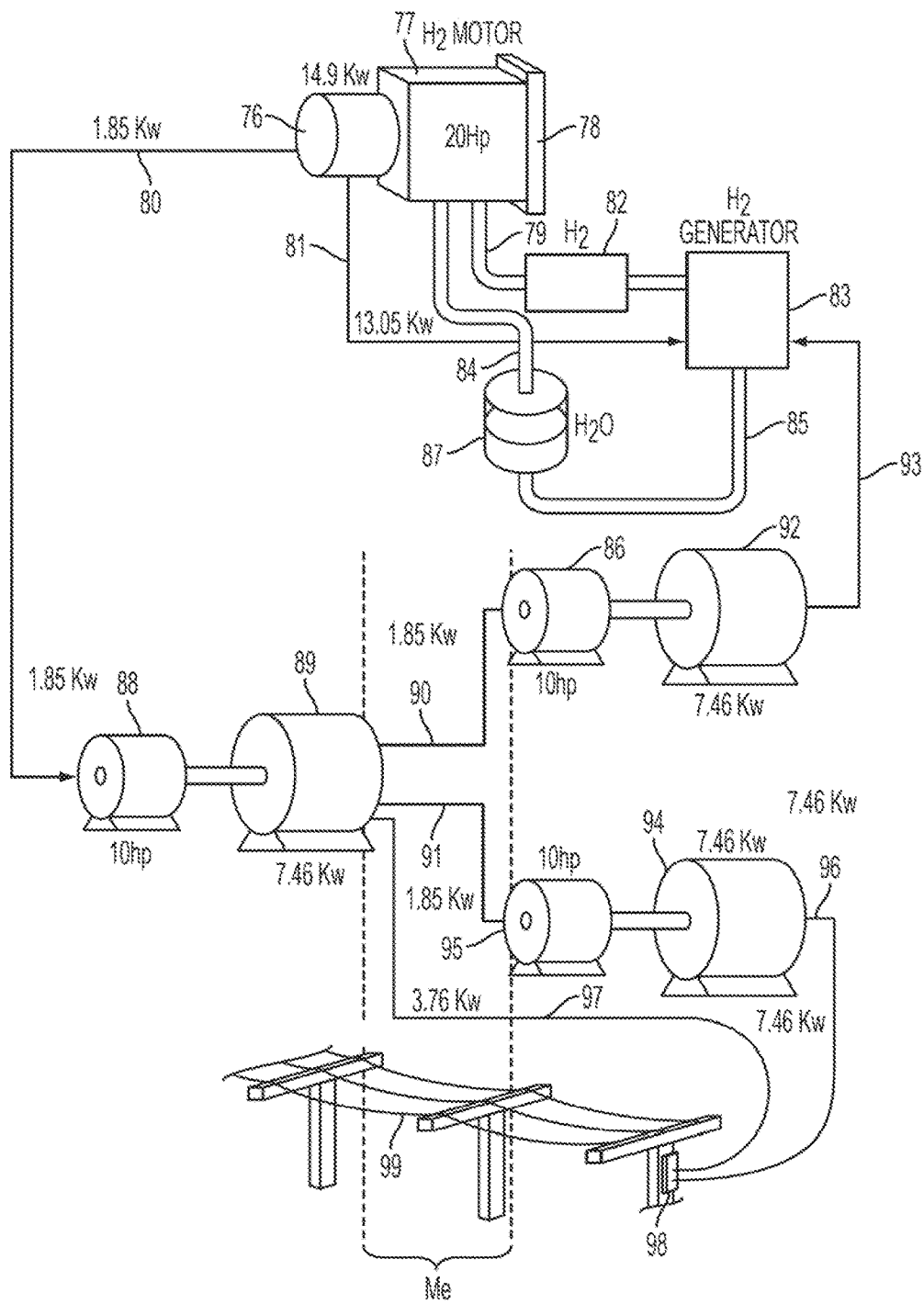
FIG. 17 is a diagram illustrating a high efficiency electric motor driving a standard efficiency electric generator coupled with a hydrogen generator and a hydrogen-driven standard drive engine in accordance with one or more embodiments.

Further understanding and its assembly and function can be gained by reference to FIG. 17, which is a diagram illustrating a high efficiency electric motor, a hydrogen generator, a hydrogen driven standard drive engine and a standard electric power generator. In the example a 20 hp internal combustion engine 77 can be configured to drive a standard efficiency electric generator 76, which in turn, drives a hydrogen generator 83, which thereby provides hydrogen to hydrogen storage tank 82 and feeds the hydrogen engine 77 through conduit 79. Water which is formed from hydrogen combustion drains through conduit 84 into water reservoir 87 and in turn supplies hydrogen generator 83 with water through conduit 85. An electric power generating system is provided by utilizing a series of high efficiency electric motors which are driving standard efficiency electric generators. The 20 hp hydrogen fueled internal combustion engine can be operated through control panel 78.

The standard efficiency generator 76 which is driven by hydrogen fueled internal combustion engine 77 supplies for example 13.05 Kw to hydrogen generator 83 as well as 1.85 Kw through electrical conduit 80 to 10 hp high efficiency electric motor 88 that drives a 7.46 Kw electric generator 89 for supplying 3.76 Kw of electric power to the electric power grid 99 through conduit 97 and transformer 98. The generator 89 further supplies approximately 1.85 Kw of electric power through electrical conduit 90 to 10 hp high efficiency electric motor 86 which drives standard efficiency electric generator 92 which feeds through conduit 93 hydrogen generator 83 with an additional 7.46 Kw of electric power which provides a total of 20.51 Kw of electric power to the hydrogen generator 83. The generator 89 further supplies approximately 1.85 Kw of electric power through conduit 91 to 10 hp high efficiency electric motor 95 which drives generator 94 which in turn supplies 7.46 Kw of electrical power to power grid 99 through electrical conduit 96 and transformer 98.

While the above described embodiment allows for the generation of additional power through powering a standard efficiency generator by high efficiency motors and diversion of a portion of the power output to additional high efficiency drive motors, in alternative embodiments storage devices can be used to store a portion of the surplus generated as a result of the gains in efficiency.

Figure 18:
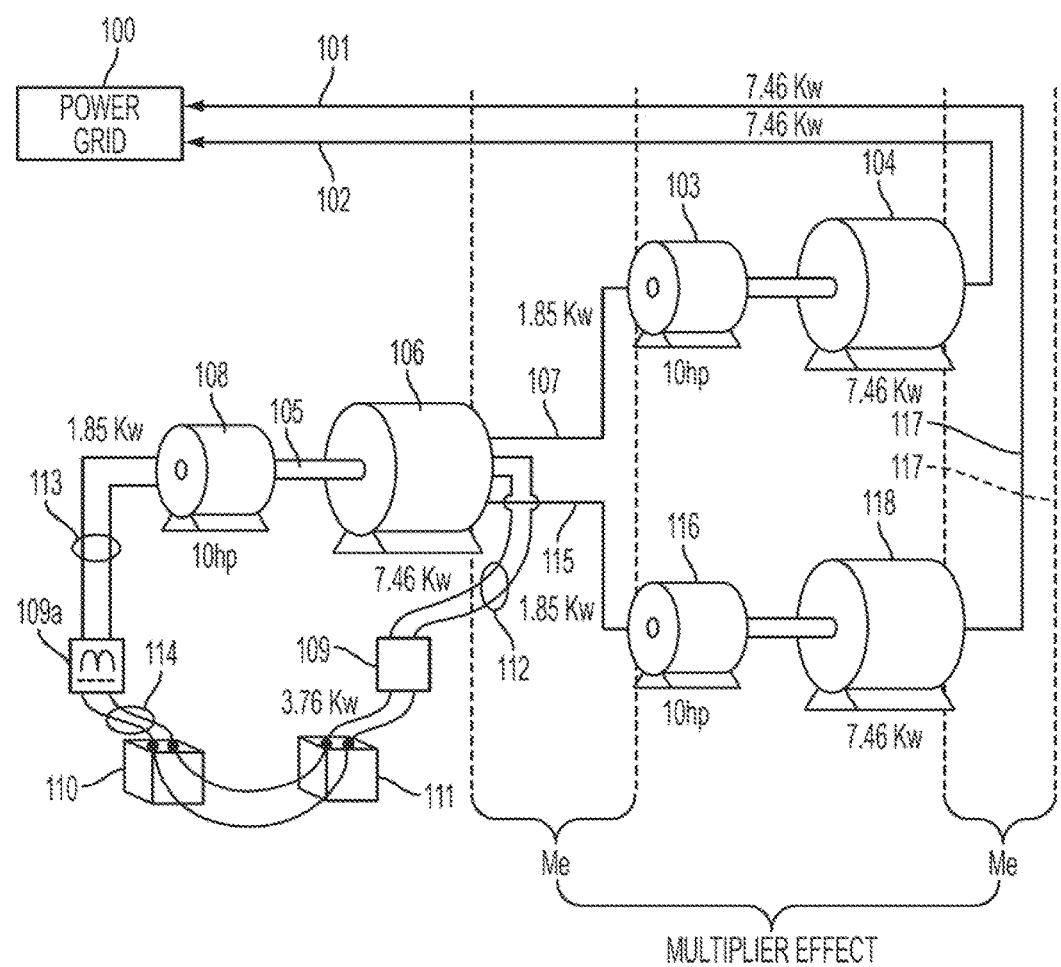
FIG. 18 is a diagram illustrating a high efficiency electric driving motor, a standard efficiency electric generator, and a bank of energy storage devices in accordance with one or more embodiments.

Additional understanding may be gained by reference to FIG. 18, which illustrates an exemplary interaction of a standard efficiency electric generator 106 with a high efficiency electric driving motor such as 108 through a bank of batteries, capacitors, electric energy storage devices or the like such as storage devices 110 and 111. In the present example high efficiency 10 hp electric motor 108 can drive a 7.46 Kw standard efficiency generator 106 through shaft 105. The generator 106 supplies 3.76 Kw through electrical conduit 112 to a full wave bridge rectifier 109. The direct current energy output from the full wave rectifier is then stored in storage devices 110 and 111, while output stored power or a combination of storage power and converted power, depending on demand level, through electrical conduit 114 to variable frequency drive or inverted, which supplies high efficiency motor 108 through conduit 113. In addition, generator 106 puts out about 1.85 Kw of electric power through conduit 107 to high efficiency electric motor 103 which drives standard efficiency generator 104 which puts out about 7.46 Kw to power grid 100 through conduit 102. Additionally generator 106 puts out about 1.85 Kw through conduit 115 to high efficiency electric motor 116 which drives standard efficiency generator 118, which puts out 7.46 Kw to power grid 100 through conduit 101. The net output to the grid occurs as a result of a multiplier effect from high efficiency motors driving standard lower efficiency generators.

Figure 19:
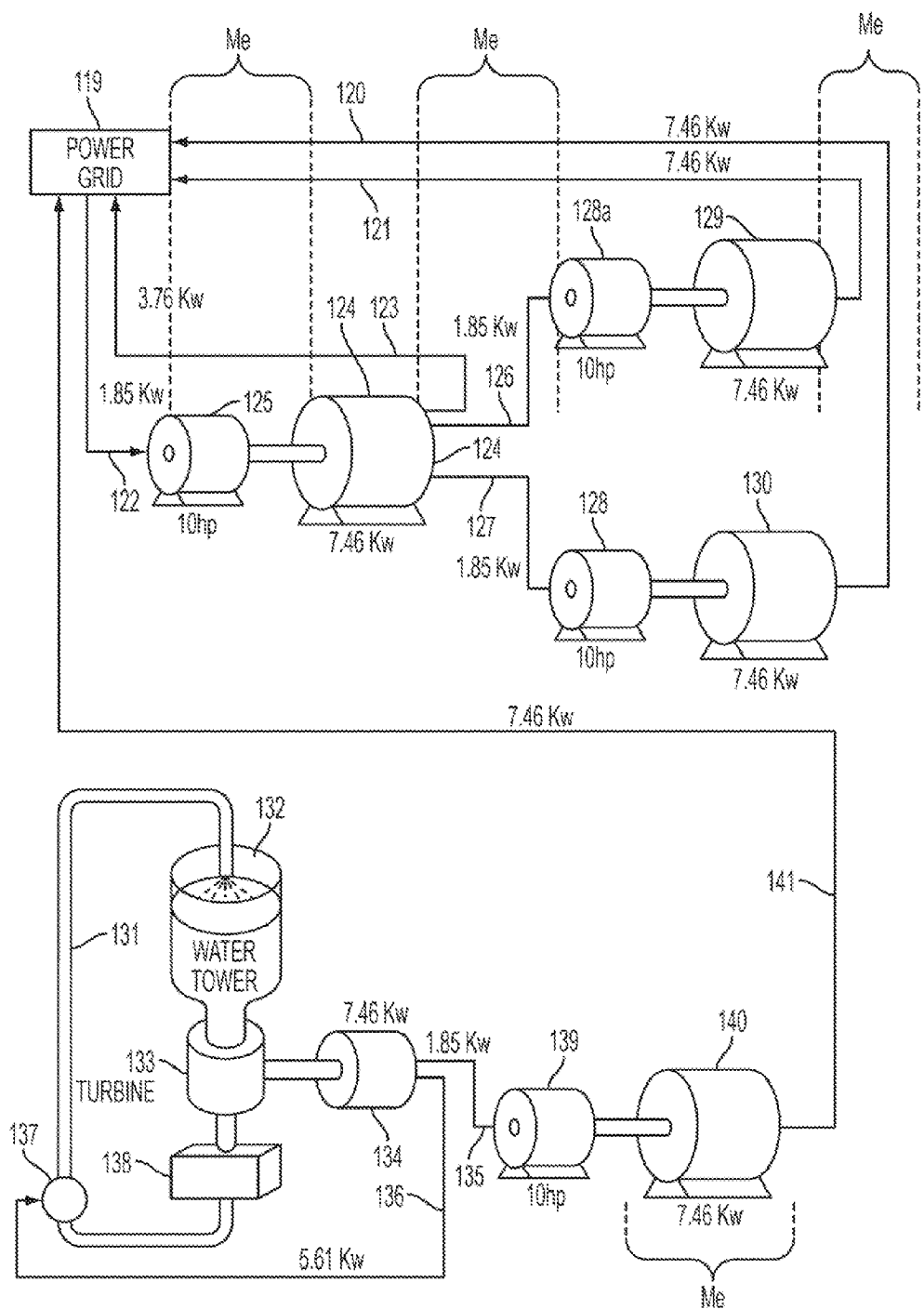
FIG. 19 is a diagram illustrating a high efficiency electric motor driving a standard efficiency electric generator and interacting with a hydro storage system utilizing a water pump, a water storage reservoir, and gravity flow through generator turbine system in accordance with one or more embodiments.

Further understanding may be gained by reference to FIG. 19, which is a diagram illustrating a high efficiency electric driving motor and a standard efficiency electric generator along with a hydro storage system utilizing a motor, pump, water storage reservoir, and gravity flow through a generator turbine system. Water tower storage tank 132 can provide water to turbine 133 that flows, for example, under gravitational pressure. Turbine 133 can drive normal efficiency generator 134 which feeds 5.61 Kw back to high efficiency motor and pump 138 for pumping waste water that has passed through the turbine 133, from receiving reservoir 138 back to water tower reservoir 132 through water conduit 131. The generator 134 can also send remainder of its output power or 1.85 Kw of electric power through electrical conduit 135 to 10 hp high efficiency electric motor 139. Electric motor 139 drives generator 140 which generates 7.46 Kw of electric power to the power grid through electrical conduit 141.

It will be appreciated that by supplying an illustrative 7.46 Kw to the power grid 119 at a cost of 7.46 Kw, the hydro power configuration can perpetuate additional electric systems due to a combined multiplier effect associated with various efficiency gain stages. For example, considering the 7.46 Kw input to power grid 119 from generator 140, electric 10 hp high efficiency motor takes 1.85 Kw of power from the power grid 119 through electrical conduit 122 to power a high efficiency motor 125 which drives a 7.46 Kw standard efficiency generator 124 constituting a gain stage. A resulting output of 3.76 Kw of power is supplied back to the power grid 119 through electrical conduit 123. The generator 124 also supplies 1.85 Kw of electric power to high efficiency electric motor 128*a* and 1.85 Kw of electric power to high efficiency electric motor 128 respectively through electrical conduits 126 and 127. Electric motors 128*a* and 128 are configured to drive 7.46 Kw generator 129 and 7.46 Kw generator 130 constituting additional gains. Power output of generators 129 and 130 is transmitted to the power grid 119 through electrical conduits 120 and 121.

Figure 20:
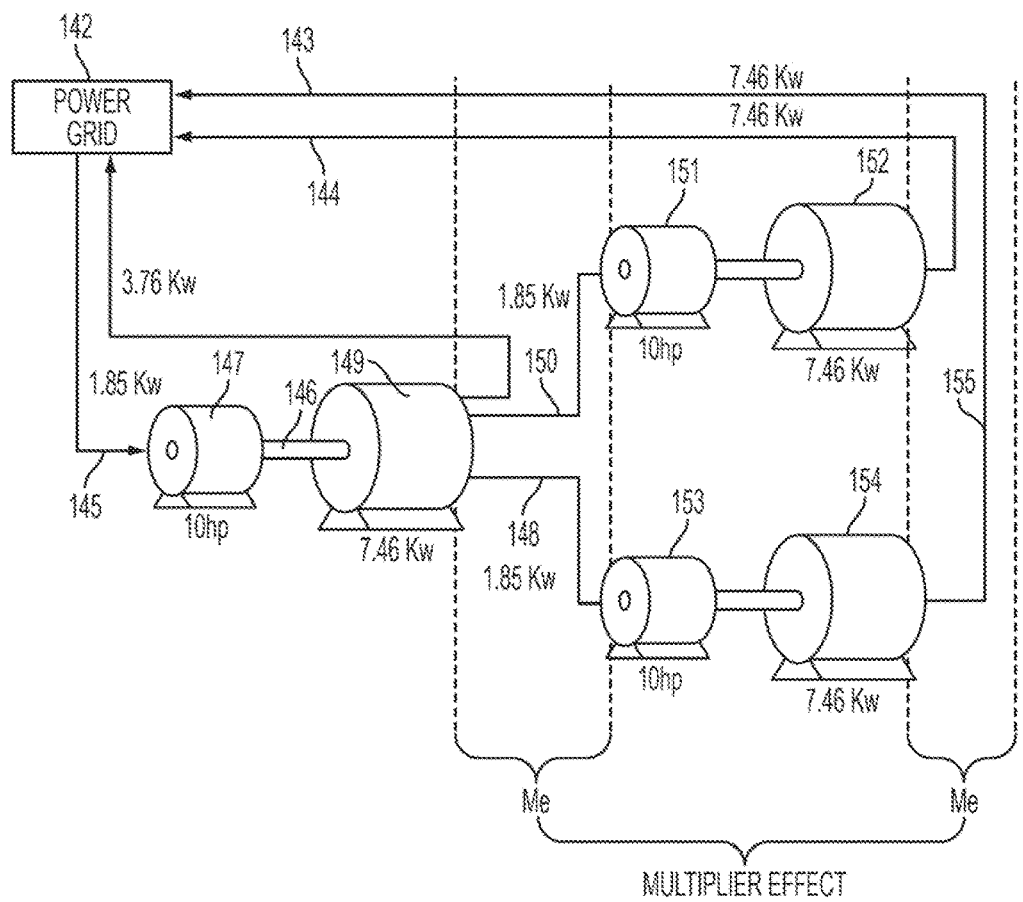
FIG. 20 is a diagram illustrating an exemplary configuration for the magnification of electric power through a high efficiency electric motor driving an electric generator of lower efficiency than the electric drive motor in accordance with one or more embodiments.

An additional understanding may be gained by reference to FIG. 20, which is a diagram illustrating an exemplary configuration for magnification of electric power through a high efficiency electric motor driving a standard efficiency electric generator. Electric power is initially taken from the power grid 142 in an illustrative amount of approximately 1.85 Kw through electrical conduit 145, such as a wire conductor, busbar, or the like, to drive 10 hp high efficiency motor 147. Motor 147 is configured to drive a standard efficiency electric generator such as generator 149 through shaft 146 to produce an illustrative 7.46 Kw of electric power. In the example, approximately 3.76 Kw of output from generator 149 can be fed back to the power grid while approximately 1.85 Kw is fed to each of two 10 hp high efficiency drive motors 151 and 153 respectively, through electrical conduits 150 and 148 from generator 149 constituting a net gain due to a multiplier effect. High efficiency electric motor 151 in turn drives another electric generator to generate 7.46 Kw of energy to feed back to the power grid through conduit 144. Electric motor 153 drives electric generator 154 to generate 7.46 Kw of power to feed back to the power grid through electrical conduit 143. The operation of high efficiency electric motors 151 and 153 to drive standard generators constitute another stage of gain due to a multiplier effect.

Further accordance with various exemplary embodiments discussed and described herein, motor reaction force may be reduced and eliminated in an embodiment whereby a series of rotatable, bipolar, quadrapolar or unipolar electromagnets, electrical armatures, rotors and the like, can be disposed or otherwise inserted on their axis into recesses in a stator which recesses may be completely surrounded by laminated electrical steel. The recesses can be shielded and positioned over each wire slot of the generator such that wire slots in the correct pattern to mimic a central single 4 pole rotor of a conventional generator. Conversely the preferred embodiment provides recesses in a stator in which the rotors may be inserted which are geometrically isolated from the center of the magnetic poles which form in the stator as the stator coils are connected to a load, as an increasing current flows through the stator coils. This geometric isolation reduces the interaction between the rotor and stator magnetic fields and in combination with mu metal shielding greatly reduces or eliminates the motor reaction force or electromagnetic drag. The maximum flux density is obtained in accordance with an embodiment whereby the wire slots on an inner stator circumference and an outer stator circumference are each provided with slot rotors forming an exemplary dual slot rotor. Also dual stator configuration is provided such that the stator side iron and back iron are exposed to both rotors to allow the desired magnetic coupling between the rotors and through the power generation slots to generate the desired magnetic movement across the conductors in the wire slots.

The following detailed description provides an understanding of embodiments as illustrated and described herein below. A high efficiency generator is provided that shields or separates the drag creating magnetic forces, between the rotors and the stator, from one another so that upwards of 80% of the driving energy which conventionally is consumed and/or dissipated by magnetic drag is converted to electric power.

In accordance with embodiments as will be described in greater detail in connection with the illustrations below, the classic rotor armature and stator have been replaced by a laminated electrical steel dual stator having a stator section with an outer circumference and a stator section with an inner circumference. Each stator section has, in one example, 48 wire slots that are magnetically coupled with individual slot rotors of corresponding slot rotor pairs. The corresponding slots from the inner and outer stator sections are aligned with each other and a ferrous back iron is preferably disposed between the stator sections to increase the flux coupling. In a preferred embodiment each stator section has, in a second example, 8 wire slots that are geometrically spaced in the corner of a square or rectangle or the like and are magnetically coupled with individual slot rotors of corresponding slot rotor pairs. The corresponding slots from the inner and outer stator sections are aligned with each other and a ferrous back iron and small segment of side iron is preferably disposed between the stator sections to increase the flux coupling. In another preferred embodiment, each stator section has, in a third example, 24 wire slots that are geometrically spaced in the corner of a square or rectangle of the stator and are magnetically coupled with individual slot rotors of corresponding slot rotor pairs. The corresponding slots from the inner and outer stator sections are aligned with each other and a ferrous back iron and small segment of side iron is preferably disposed between the stator sections to increase the magnetic flux coupling.

The slot rotors can be constituted of, for example, two pole, four pole or preferably one pole (unipolar rotor) with a floating lead controlled by a solid state excitation system. The rotors are wound armature poles with associated slip rings and bearing mechanisms. The slot rotors are positioned in close proximity to the wire slots in order for each rotor of the slot rotor pairs to form a closed magnetic circuit through both slots. It should be noted that one of the slot rotors in the slot rotor pair rotates clockwise and the other rotates counterclockwise in order for the proper magnetic flux to be delivered to the wire slots in the case of the two pole and four pole. However the direction of rotation is not as critical in the case of the unipolar rotor, however rotation of the two rotor pairs in the opposite direction is preferable.

Each slot rotor armature of the slot rotor pair can be energized and the individual rotor assembly can be rotated to provide alternating fields of north and south pole magnetic flux field energy into the open wire slots and side iron in the stator and this flux field will magnetically couple with the side iron and back iron and/or with the opposite slot rotor of the slot rotor pairs. Each of the slot rotors in the slot rotor pair is rotated such that a pole of one slot rotor makes up a complete magnetic flux circuit with the corresponding opposite pole of the other slot rotor of the slot rotor pair thereby directing a maximum amount of magnetic flux into the stator slots containing the induction coils. The magnetic poles are activated with DC current via a brush and solid state or mechanical commutator apparatus or other appropriate mechanism such that the magnetic poles are obtained only as they pass over the wire slots in the case of multi-pole rotors. However, in the case of the unipole rotor the pole is activated north 50 times per second and south 50 times per second (50 Hz) or north 60 times per second and south 60 times per second (60 Hz) or any other appropriate timing for other desired frequencies. In other operational modes, the rotor can be excited all north and/or all south pole to generate DC current. Since the opening of the mu metal laminated shield is precisely positioned over the wire slot and are positioned such that a small portion of side iron is exposed, only a focused but intense window of magnetic flux permeates the side iron, the induction coils and back iron. Therefore the shielding and geometric isolation allows only minimal to no electromagnetic drag upon the slot rotors.

The slots in the outer circumference and inner circumference are aligned. The magnetic poles of each individual member of the pair of slot rotors rotate in a coordinated fashion respectively over the inner and outer aligned slots such that, for example, as a north pole of one of the pair of rotors rotates over one slot of the inner slot, a south pole of the other of the pair of rotors rotates over the outer slot. Thus, the dual rotors can be sequenced such that they present opposite poles to corresponding slots in the inner and outer stators respectively thereby making up a magnetic circuit between the north pole and south pole as they rotate past one another. The resulting magnetic circuit generates a high flux density into the slots on both the inner and outer stators and into the shared side iron, back iron, and cuts across the slot induction coils thereby generating power. In the instance of AC (alternating current) the rotor poles alternate north pole then south pole in each of the corresponding rotor pairs, but maintain the sequencing of the dual rotors such that they present opposite poles to corresponding slots in the inner and outer stators respectively. In the instance of direct current (DC), the rotor pairs remain of one polarity either north or south, but maintaining the sequence of the dual rotors such that they present opposite poles to corresponding slots in the inner and outer stators respectively.

In an exemplary bipolar slot rotor, one of the two pole sections is north pole charged and the opposite section is south pole charged. In one embodiment, the north pole section can be constituted by a 120° section and the south pole can be constituted by an opposite 120° section with a 60° neutral zone between poles on each side thereof. In another embodiment the rotor is unipolar i.e. the entire rotor is north pole for half of the frequency cycle, then the current flow is reversed via the excitation controller and the entire rotor becomes south pole i.e. north pole then south pole for 360°. Pole sections can be shielded with mu metal shielding. Each of the slot rotor arrangements are preferably contained in a longitudinal cylindrical cavity that is located in a close proximity to and extends lengthwise along the opening of the winding slots. The slot rotor mechanism, including a mu metal shield can be contained within a laminated steel cylinder. The steel cylinder is a partial cylinder so as to allow installation of the stator windings and is closed by use of a laminated steel mu metal shield cover. The cylinder has an opening that corresponds and is in communication with the opening of the stator wire slot. An opening along the length of the steel cylinder can be in alignment with a slot or opening along the length of the mu metal shield to allow magnetic coupling between the slot rotor and the winding slot side iron, back iron and the corresponding rotor of the rotor pairs.

It will be appreciated that the slot rotors may be fashioned, for example, as wound electromagnetic armatures that are positioned as pairs of rotors around the circumference of a dual wound stator. Different numbers of slot rotor pairs can be used preferably in even numbers such as 4 or 8 slot rotor pairs, which is by way of example and different numbers of slot rotor pairs can be used. An individual slot rotor armature may be made by fashioning a series of laminated steel pole pieces upon a shaft in a manner similar to that of a conventional generator armature. Completed pole pieces may be wound in a conventional manner with insulated wire to suitable winding specifications for the operating demands of the generator. Power can be applied to the armatures via a control system.

To drive the shafts of the slot rotor mechanism, a central gear mechanism may be employed at one end of the individual slot rotor shafts over the inner and/or outer circumference of the stator. As the slot rotor pairs and their respective armatures are rotated on both sides of the stator in a synchronized manner by the gear mechanism, power can be generated with greatly reduced drag as compared with a single, central rotating armature of a conventional generator.

In another preferred embodiment in the case of a unipolar (single north pole and followed by a single south pole for 360° of the surface) rotor, the shafts of the slot rotor mechanism may be driven by employing a single three phase motor at one end of the individual slot rotor shafts over the inner surface and/or outer circumference of the stator. The slot rotor motors are controlled by a single variable speed drive. As the slot rotor pairs are rotated on both sides of the stator in a synchronized manner, power can be generated with greatly reduced drag as compared with a single, central rotating armature of a conventional generator.

Power generation in accordance with the reduced electromagnetic drag provided by various embodiments discussed and described herein can result in, for example, a four to fivefold increase in electrical energy output with the same mechanical or kinetic energy input. With an exemplary mechanical input of, for instance, one horsepower provided by an electric drive motor driving the exemplary gear mechanism, one horsepower of mechanical energy may potentially generate more than the conventional limits. Therefore, as the conventional one horsepower electric motor, or system of electric drive motors utilizing 746 watts, drives the slot rotors, the generator may potentially generate additional usable energy.

The process of electrical power generation can be thought of as a process by which input of kinetic energy, for example, is used to move a magnetic field. The resulting moving magnetic field moves across the conductor wires in the stator induction wire slots of the electric generator, causes an electrical voltage in the coils of the generator and when the coils are connected to an electrical load causes an electrical current to flow in the coils of the generator. The electrical current flowing in the stator coils creates a magnetic field by virtue of the physical construction of the coils and the laminated steel in which they are wound. The newly created magnetic field in the stator iron increases in strength as electric power increasingly drawn from the generator and is approximately equal and opposite polarity to the original source of the magnetic field. The stator field interacts with the original source of the magnetic field in the rotor which ends up dissipating the kinetic energy input to the system. Therefore, it may appear that kinetic energy is being converted into electrical energy. In fact the kinetic energy is only eliciting electrical energy which, by virtue of design of the conventional generator, is dissipating the kinetic energy by acting in the opposite direction to the original kinetic energy.

The problem associated with such energy dissipation is a fundamental problem of generator design rather than a practical necessity of the generating process. A change in generator design can eliminate the unwanted byproduct of back electromotive force (EMF) and subsequent magnetomotive force without affecting the generating process. The input of kinetic energy is no longer related to electrical output. In accordance with various embodiments, an electrical generator system can be provided in which a conventional magnetically polarized generator rotor is replaced by a series of distributed slot rotors having magnetic poles affixed over and in close proximity to each wire slot. In order to isolate the magnetic flux and direct it to the slots, slot rotors are geometrically placed away from the center of the stator magnetic poles created by the induction current and the said slot rotors can be shielded with, for example, mu metal, which can be an annealed metal of 75% nickel, 15% iron, plus copper and molybdenum.

A stator in accordance with the embodiments discussed and described herein can contain wire slots on the inner circumference as well as the outer circumference. In should be noted however that, by use of the terms "inner" and "outer", illustrative reference is made to a circular shaped stator embodiment. It will be appreciated and should be emphasized that the dual stator need not be circular and can be linear or planar, or can be of a semi-circular or other functional shape and have dual stator sections with the same effect of the embodiment specifically illustrated and described herein. In such an embodiment where the stator is not circular, the terms "inner circumference" and "outer circumference" can be replaced by terms such as "first outer periphery" and "second outer periphery". Further, since an exemplary stator in various embodiments is described herein as dual stator arrangement, the first outer periphery and second outer periphery can include the stator surface containing the slot rotors. The respective inner peripheries of the stator sections can be adjacent to and can face each other either directly or with an intervening member such as a segment of side iron and back iron or the like.

The slots in the outer circumference and inner circumference are aligned. The magnetic poles rotate over both aligned slots such that as a north pole rotates over one slot, the pole over the aligned slot is sequenced such that it presents a south pole rotating in the opposite direction thereby making up a magnetic circuit between the north pole and south pole as they rotate past one another. This magnetic circuit generates a very high flux density into the slots on both the inner and outer radius and into the side iron and shared back iron. Each of the magnetic bodies is constructed of wound inductive magnetic armatures. The size of the magnetic wound inductive armature is not limited but is sized to be compatible with the stator size. The unique design which may be unipolar, dipolar or quadrapolar is powered by a DC current supply which activates pole coils through a brush and slip ring mechanism or an appropriate inductive transfer mechanism such that the magnetic poles are only activated as they are rotated over the unshielded wire slots. The armature mechanism is separated from the back EMF (and related magnetomotive force) by mu metal shield cylinders which surround the electromagnetic armature mechanism. These cylinders are only open to the wire slots of the stator. The shielded electromagnetic poles are rotated by a transmission mechanism or individual slot rotor motors which effectively exposes the wire slots to a high density moving magnetic field over and through the slots of the induction coils of the stator. The magnetic poles of the armature mechanism are only activated as they rotate over the wire slots. With the proper stator winding and pole activation sequence, clean 3-phase, 2-phase and single phase and direct current may be generated. The attributes of a generator in accordance with embodiments, allows generators of practically unlimited size with unlimited application to be constructed.

The immediate and obvious applications include a stand-alone power generation system for point of use electric power needs, stand-alone power generation plant, power magnification at substations, powering motive devices such as automobiles, trains, boats, ships, buses, trucks, planes and any other use for which convenient power is needed.

In accordance with various exemplary embodiments discussed and described herein, and by way of brief summary, an exemplary electric power generation process is disclosed whereby a high efficiency generator can be used to generate electric output with enhanced efficiency.

Exemplary embodiments make use of a new paradigm of efficiency in which kinetic energy input onto the shaft of an electric power generator in accordance with exemplary embodiments yields additional electric energy output from the generator leading to an enhanced generation factor. Output of the generator is fed back to the driver motor or motors through an interface such as a full wave rectifier-battery-inverter (UPS/Uninterruptible Power Supply) or other similar device or interface, additional usable power is generated by example and not limiting.

Paradigm shift is a term first coined by Thomas Kuhn is his book entitled "The Structure of Scientific Revolutions" published in 1962. The term is used to reference a change in basic assumptions within the ruling theory of science. The current assumption concerning electric energy generation by rotating machinery based electric power generators, are based upon historical observations from electromotive machines. The classic observations are based on a particular design of the generator and result in paradigms in which only 20% of the kinetic energy input onto the shaft of the generator is used to generate electric power, when operating at full load. The remaining 80% is dissipated by competing destructive magnetic forces within the generator resulting from sub-optimum generator design. The high efficiency generator described in accordance with embodiments in the present and related patent applications (as noted in cross-reference to related co-pending applications) has been redesigned to reduce the 80% kinetic energy loss from the destructive magnetic forces completely or almost completely. At a full load, a high efficiency generator, for example, as described herein, requires approximately 24% of the energy required to drive a classic generator at full load. Accordingly, it is possible to generate the same amount of energy in accordance with a higher efficiency paradigm using approximately one-fourth the kinetic energy input that would be required with conventional paradigms.

A driver motor operating in accordance with one energy paradigm and a generator to which the driver motor is coupled, operating according to another higher efficiency paradigm in creating a net usable energy output is not operating in violation of laws of physics. Rather, the gains are associated with the fact that power generated by operating a driver motor which in accordance with a lower efficiency paradigm transmits kinetic energy through a physical driver shaft into a generator which operates in accordance with a higher efficiency paradigm, thereby expanding the amount of usable energy.

The above gains do not violate the laws of thermodynamics, rather the phenomenon suggests a need for supplementary laws. For example, it might be stated that when a generator driver motor operating in accordance with a lower energy efficiency paradigm is used to drive an electric power generator through a physical and/or mechanical connection operating in accordance with a higher efficiency paradigm or vice versa, whereby the driver motor operating in accordance with a higher efficiency paradigm than the generator, an expansion in the amount of available usable energy generated by the system is the result, due to the multiplier effect associated with the difference in efficiency between the driver and the generator. Based on the gains, the driver motor may be powered by a portion of the generated excess power through a suitable interface and the remaining output may be used for other desired purposes. The above described phenomenon requires a disparity between the efficiency of the generator and the driver motor resulting from, for example, 1) a normal efficiency driver motor and a high efficiency generator or 2) a high efficiency driver motor and a normal efficiency generator.

The generator system herein described requires an energy storage interface placed between the generator and the driving motor can supply the energy for the drive motor. Suitable systems for energy storage can include batteries, capacitors, hydraulic systems with a gas accumulator, a hydro storage/pump/turbine system, a hydrogen generator with hydrogen powered turbine, or an internal combustion engine and the like. Interaction with an existing power grid can also be used thereby creating a magnifier effect. In addition to the above stand-alone power plant application and interaction with the electric power grid, many other applications become evident.

The power generation system herein described may be installed underneath the hood of an automobile to power the automobile through the use of electric traction motors in the wheel hubs, or on the axle, or other parts of the drive train. The power plant contained in the automobile may be used to power the locomotion of the automobile and/or may be used to plug-in a conductor from the automobile power plant into an input point in a home garage to power the home and the grid. It may also be utilized to plug into other stations in parking lots, parking deck, parking garage, curbside and the like to send power to the grid. The automobile power plant can generate AC single-phase or three-phase current as well as DC current. These changes in functions are programmable from the onboard computers.

The power generation plant herein described may also power trains, boats, ships, buses, trucks, airplanes and any other function which requires power. All of the applications may also have a secondary function to power the electric power grid.

Figure 21A:
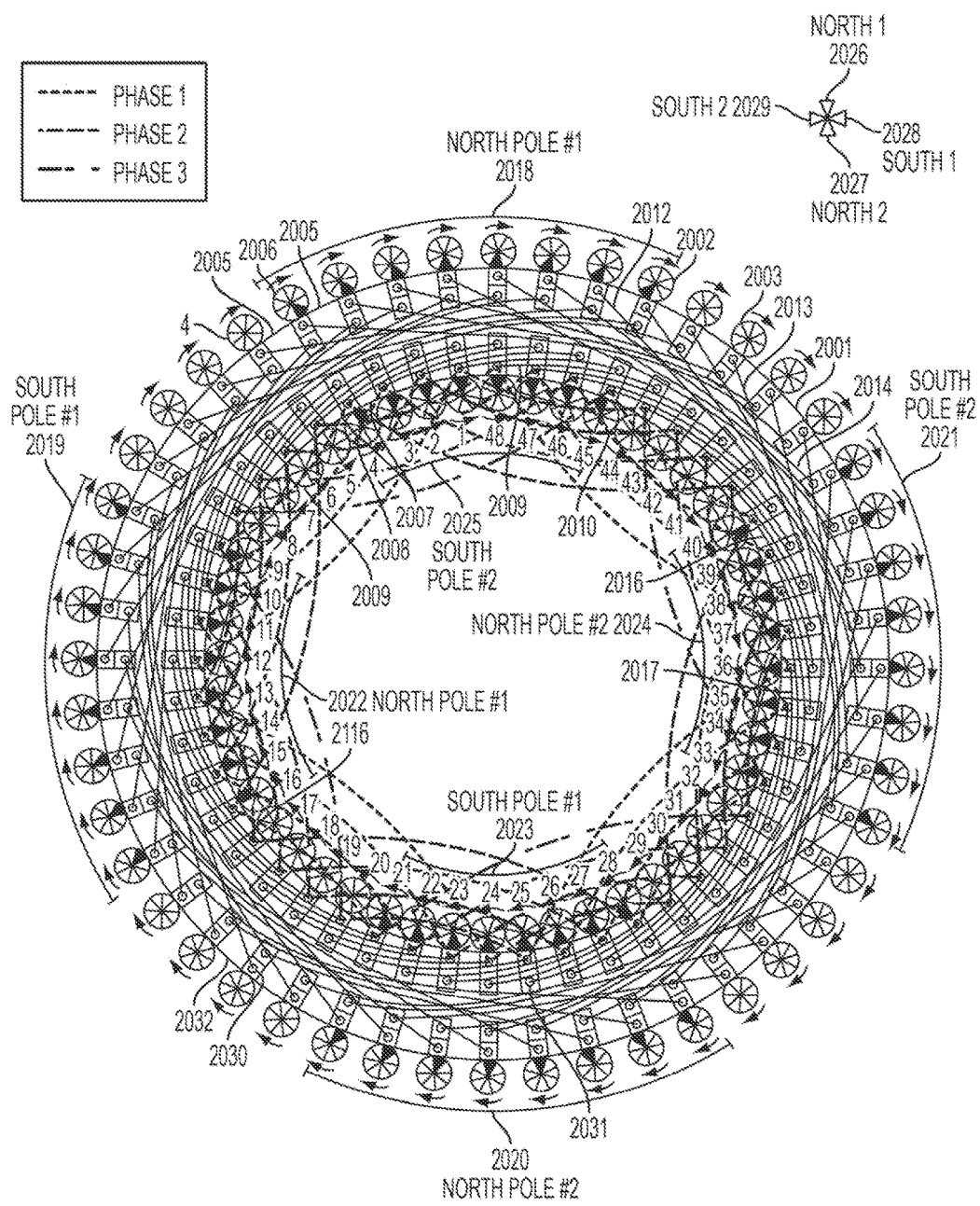
FIG. 21A is a diagram illustrating an exemplary wound dual stator machine having dual electromagnetic slot rotors inserted into shielded recesses in accordance with one or more embodiments.

With reference now to the figures, FIG. 21A shows an end view of an exemplary embodiment involving a dual laminated steel stator 2001 with 96 armature mechanisms, or slot rotors as described herein, which form 48 slot rotor pairs. The slot rotor pairs, such as is exemplified by outer slot rotor 2002 and inner slot rotor 2010 are shown positioned over wire slots 30 of the outer stator race and wire slots 2116 of the inner stator race of stator 2001. In the present embodiment, the outer race slots of laminated steel stator 1 contains a series of 48 slots, which are accompanied by slot rotor pairs. Slot rotor activation and advancement is such that 4 magnetic poles and 4 magnetic voids rotate around the circumference of the dual stator unit.

It will further be appreciated that, with reference to FIG. 21A, the outer race slots contain induction coils associated with a 3-phase generator. In FIG. 21A, the phases are shown as follows: the first phase 12, the second phase 14 and the third phase 13. The various phase coils can be connected using a wye connection such as a "low wye" or a "high wye" connection. The inner race slots can also contain induction coils of a three-phase generator wherein the first phase 2015, the second phase 2017 and the third phase 2016 which can also use a wye connection such as a "low wye" or "high wye". The rotating north-south-north-south pole energy is separated by areas of magnetic void between each pole as is represented in FIG. 21A. In one embodiment, the four pole electromagnetic dual slot rotors 2002 in the outer race and electromagnetic slot rotors 2010 in the inner race are only turned on, energized or excited as they rotate past the wire slots, the depiction represents activation by the outlined magnetic poles. The dual slot rotors 2002 represented in FIG. 21A may be four pole electromagnetic slot rotors, or two pole electromagnetic rotors or unipole electromagnetic rotors. The unipole is pulsed 60 times per second north and 60 times per second south for 60 Hz current and pulsed 50 times per second north and 50 per second south for 50 Hz current generation.

To better understand the exemplary dual stator and slot rotor pair structure and operation, a description is provided that encompasses each magnetic section of the stator and the slot rotors during an instant of rotation. The term covered as used herein below refers to various states whereby a particular slot rotor pole is in full or partial alignment with the underlying wire slot as it rotates by and past the slot. Each slot is shown with a corresponding slot number shown inside the slot in brackets such [1] through [48]. With reference again to FIG. 21A, as can be seen, slot [45] is covered by a north pole which can be energized or otherwise activated as is represented by a solid state of the pole coloring nearest the slot in the case of the quadrapole. In the case of the preferred embodiment, the unipole, the entire rotor would be colored when turned on as in this example. Proceeding counter-clockwise, slot [46] is covered by an activated magnetic pole or as in slot [47], [48], [1], [2], [3], and [4]. An indication that all eight wire slots are receiving magnetic flux from the activated slot rotor is provided by the solid state of the pole coloring or shading. The arc 2018 refers to the span of north pole #1. Continuing counterclockwise on FIG. 21A, the rotors 4 covering slots [S], [6], [7], [8] are not excited and therefore are not emitting any magnetic flux as is indicated by the outline or unshaded/uncolored state of the pole coloring.

Next excitation of south pole #1 begins, the slot rotors that cover slots [9], [10], [11], [12], [13], [14], [15], and [16] are excited as is indicated by the solid state of the pole coloring. The arc 19 refers to the span of south pole #1. Continuing counterclockwise, the slot rotors that cover slots [17], [18], [19] and [20] are not excited and therefore are not emitting any magnetic flux as is indicated by the outlined state of the pole covering. Next, excitation for north pole #2 begins. The rotors that cover slots [21], [22], [23], [24], [25], [26], [27] and [28] are excited as is indicated by the solid state of the pole coloring or shading. The arc 20 refers to the span of north pole #2. Continuing counterclockwise in FIG. 21A, the rotors covering slots [29], [30], [31], and [32] are not excited and therefore not emitting any magnetic flux as is indicated by the outline state of the pole coloring or shading. Next excitation of south pole #2 begins. The rotors which cover slots [33], [34], [35], [36], [37], [38], [39] and [40] are excited as is indicated by the solid state of the pole coloring or shading. The arc 2021 refers to the span of south pole #2. Continuing counterclockwise in FIG. 21A, the rotors covering slots [41], [42], [43] and [44] are not electrically excited and therefore are not emitting any magnetic flux as is indicated by the outlined state of pole coloring.

When the pole rotors 2003 and 2009 begin to rotate in a synchronous fashion, four spans of actively excited slot rotors and corresponding magnetic poles distributed around the outer and inner circumference of the stator each occupy approximately 60° of the total stator circumference. The active spans are interspaced with four magnetically void segments corresponding to the slot rotors that are not actively excited that each occupy approximately 30° of the stator circumference. It should also be noted that in accordance with the embodiments, the dual slot rotors rotate in opposite directions such that the poles rotating over the inner slots 2116 and the outer slots 2030 are synchronized. When the poles are in position, they can be turned on simultaneously such that the north pole flux lines from one are synchronized with the south pole flux lines from the other and magnetic coupling is completed there between. The resulting magnetic flux excites the stator induction coils while experiencing very little resistance due to counter EMF produced as the magnetic arc transverses the circumference of the stator. The rotational torque of the slot rotors approximates that of the separation forces in a mechanical gear system.

It will be appreciated that in order to control the application of the current to the various slot rotor armatures, various means can be used both to synchronize rotation and energize the slot rotor armatures. For example, commutator arrangements can be used to selectively apply current to the slot rotor armatures at the appropriate time as the slot rotors synchronously rotate about their respective axis. Alternatively, the application of current can be controlled by a computer, processor, controller or other suitable logic device as would be appreciated to control the application of current to the slot rotor armatures and to accomplish current control for output voltage and current regulation purposes. Such a controller can make corrections at a rate much higher than the rotational rate of the slot rotors and thus can apply a degree of high resolution control that would be more difficult with the commutator arrangement. Also including in any such rotation and excitation control circuit is a current recovery circuit. As the current in the slot rotors is turned off, the excitation field in the rotor collapses sending a pulse of current in the opposite direction, which is returned to a battery through a diode circuit such that a reduced amount of power is consumed by the excitation of the slot rotors.

In accordance with various exemplary embodiments, and in particular, a 48 slot embodiment, all of the slot rotors in the outer race and inner race of the stator can be connected in a permanent positional relationship through the transmission which is driven by a driver motor or other driving element. The synchronous rotation of the outer race slot rotors and the inner race slot rotors allows the generation of an arc of induction flux across the aligned wire slots of the outer race and in the inner race. The synchronization is such that at any one instant, 8 slot rotor pairs generate an arc of north pole flux in 8 corresponding slots of the outer race and an arc of south pole flux in 8 aligned slots in the inner race. The physical makeup of the slot rotors and the induction coils in the outer race and the inner race are identical. However, it will be noted that rotational relationship of the inner slot rotors to the inner race slots is offset by 90° as, by example, but not confined to 90°, compared to the rotational relationship of the outer slot rotors to the outer race slots.

With further reference to an embodiment, for example, as depicted in FIG. 21A, it is noted that the 3 phase induction of the outer race are wound in the same fashion as the 3 phase induction coils of the inner race slots, however north pole #1 (22) is rotated 90° counterclockwise when compared to the north pole #1 (18) of the outer race. It will be further noted an exemplary mu metal magnet shield 2008 is shown, for illustrative purposes, as being placed over the inner race slot rotor of slot #4 as is the shielding 2006 over the outer race slot rotor of slot #4. In accordance with an embodiment, though not shown, the shielding will be placed over each of the 96 rotors of both the inner race and outer race to minimize flux leakage between the rotors and the stator sections.

Figure 21B:
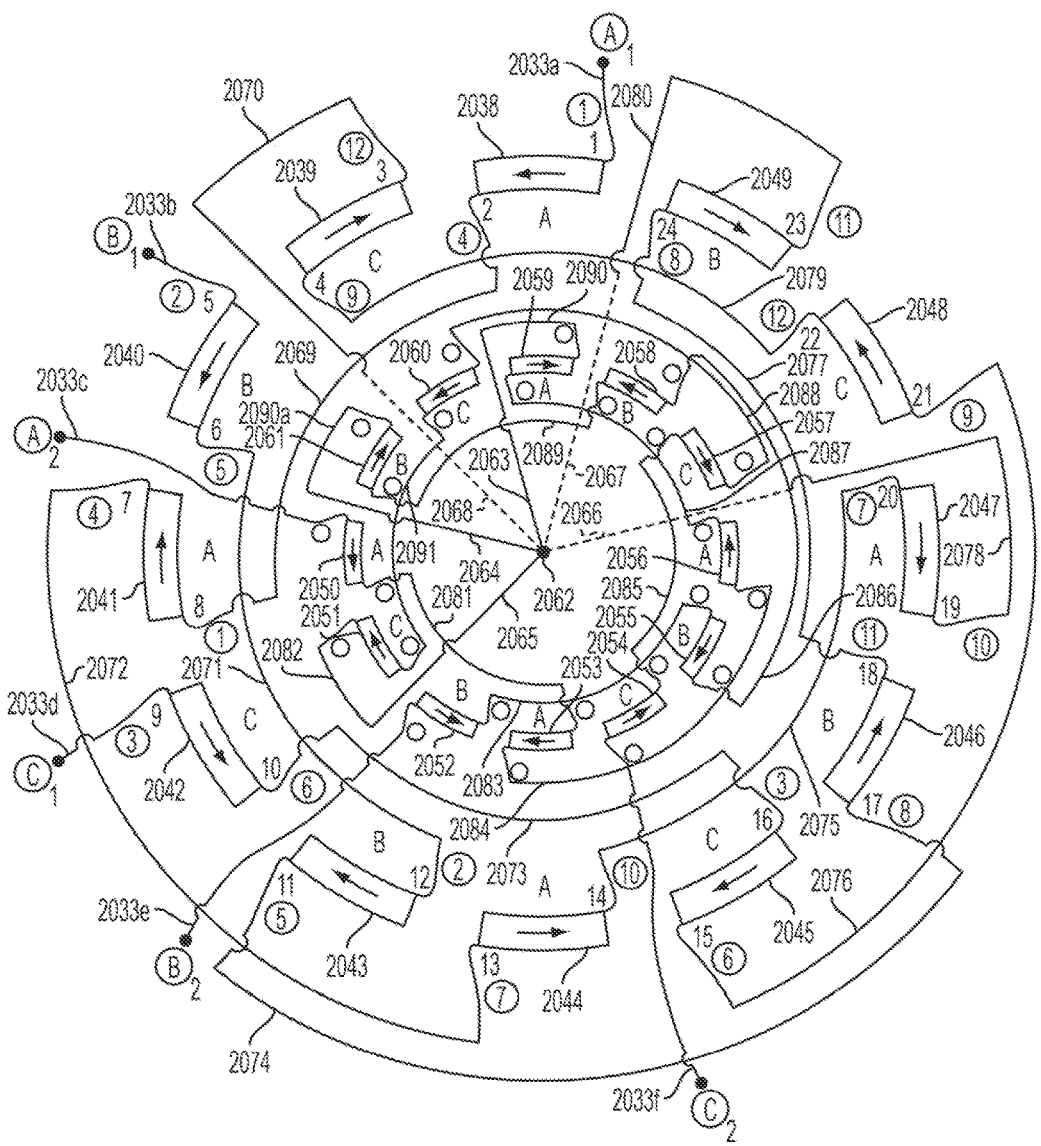
FIG. 21B is a diagram illustrating exemplary three-phase winding connections of a wound dual stator machine in accordance with one or more embodiments.

As previously noted, an exemplary generator can be configured for 3 phase, 2 phase, single phase alternating current (AC) and direct current (DC) power generation. In the present example, a 3 phase AC current implementation is shown. Accordingly, a depiction of the internal wiring connections of the 3 phase 4 pole 12 coil generator is shown in FIG. 21B for both the outer race windings and the inner race windings. As would be readily appreciated by one skilled in the art, the illustrated hookup is referred to as a "high wye" connection. More specifically, in a "high wye" connection, each phase can be configured to include two winding circuits which may be connected in series and produces 480 volts or the like. Alternatively, the two of the winding circuits may be connected in parallel and can be referred to as a "low wye" connection. While a "low wye" configuration produces 240 volts, the current output can be doubled as compared with the "high wye" such that the power output is the same for each hookup. These same hookup arrangements may produce different voltages in other sizes of generator depending upon the winding and flux into the slots, however this example is illustrative and not confining.

Following the phase circuits from the power output leads through the circuits to the neutral "wye" connection for the outer race windings and the inner race windings, and with initial reference to the outer race, phase A leg 2033 includes coil group 2038 wound in a counterclockwise or north pole (N) direction. Input is at circle 1(□) and output is circle 4. The output lead 2069 connects with coil group 2041, wound in a clockwise or south pole (S) direction with an input at circle 1 and output at circle 4. The output lead 2072 connects with coil group 2044, wound in a counterclockwise (N) direction with an input at circle 7 and an output at circle 10. The output 2075 connects with coil group 2047 wound in a clockwise (S) direction with input at circle 7 and output at circle 10. The output lead 2078 connects with lead 2066 at the central "wye" connection 2062 with the other two phases.

Phase B leg 2035 includes coil 2040 wound in a counterclockwise (N) with an input at circle 2 and an output at circle 5. The output lead 2071 connects with coil group 2043 which is wound in a clockwise direction (5) with an input at circle 2 and output on circle 5. The output lead 2074 connects to coil group 2046 wound in a counterclockwise (N) direction with an input at circle 8 and an output at circle 11. The output lead 2077 connects to coil group 2049 which is wound in a clockwise (S) direction with an input at circle 8 and an output at circle 11. The output lead 2080 connects with lead 2067 making up a portion of the "wye" connection at 62.

Phase C leg 2035 connects to coil group 2042 wound in a counterclockwise (N) direction with an input at circle 3 and an output at circle 6. The output lead 2073 connects to coil group 2045 wound in a clockwise (S) direction with an input at circle 3 and an output at circle 6. The output lead 2076 connects to coil group 2048 wound in a counterclockwise (N) direction with an input at circle 9 and an output at circle 12. The output lead 2079 connects to coil group 2039 wound in a clockwise (S) direction with an input at circle 9 and output at circle 12. The output lead 2070 connects to conductor 2068 which forms the third leg of the "wye" connection 2062.

With reference now to the inner race windings, phase A2 leg 2034 connects to coil group 2050 wound counterclockwise (N) direction with an input at circle 1 and an output at circle 4. The output lead 2081 connects to coil group 2053 wound in a clockwise (S) direction with an input at circle 1 and output at circle 4. The output lead 2084 of the two coil groups connects to coil group 2056 wound in the counterclockwise (N) direction with an input at circle 7 and an output at circle 10. The output lead 2087 connects to coil group 2059 wound in a clockwise (S) direction with an input at circle 7 and an output at circle 10. The output lead 2090 connects to conductor 2063 which connects with the "wye" connection 2062 with the other two phases.

Phase B2 leg 2036 connects with coil group 2052 wound in a counterclockwise (N) direction with an input at circle 2 and an output at circle 5. The output lead 2083 connects to coil group 2055 wound in a clockwise (S) direction with an input at circle 2 and an output at circle 5. The output lead 2086 connects to coil group 2058 wound in a counterclockwise (N) direction with an input at circle 8 and an output at circle 11. The output lead 2089 connects to coil group 2061 wound in a clockwise (S) direction with an input at circle 8 and an output at circle 11. The output lead 2090a connects to neutral lead 2064 which connects to the "wye" connection 2062.

Phase C leg 2038 connects with coil group 2054 wound in a counterclockwise (N) direction with an input at circle 3 and an output at circle 6. The output lead 2085 connects to coil group 2057 wound in a clockwise (S) direction with an input at circle 3 and an output at circle 6. The output lead 2088 connects to coil group 2060 wound in a counterclockwise (N) direction with an input at circle 9 and an output at circle 12. The output lead 2091 connects to coil group 2051 wound in a clockwise (S) direction with an input at circle 9 and an output at circle 12. The out lead 2082 connects to conductor 2065 which forms a third leg of the "wye" connection 2062.

With the above described spacing of the inner race windings and the outer race windings and the internal connections, three phase power can be generated with the phase legs separated electrically by 120°, when an exemplary four pole rotating magnetic field with 60° of coverage of the stator with each pole and a 30° segment of no magnetic field between each 60° pole is employed and rotated at the proper speed from the dual slot rotors of the described embodiments.

Figure 21C:
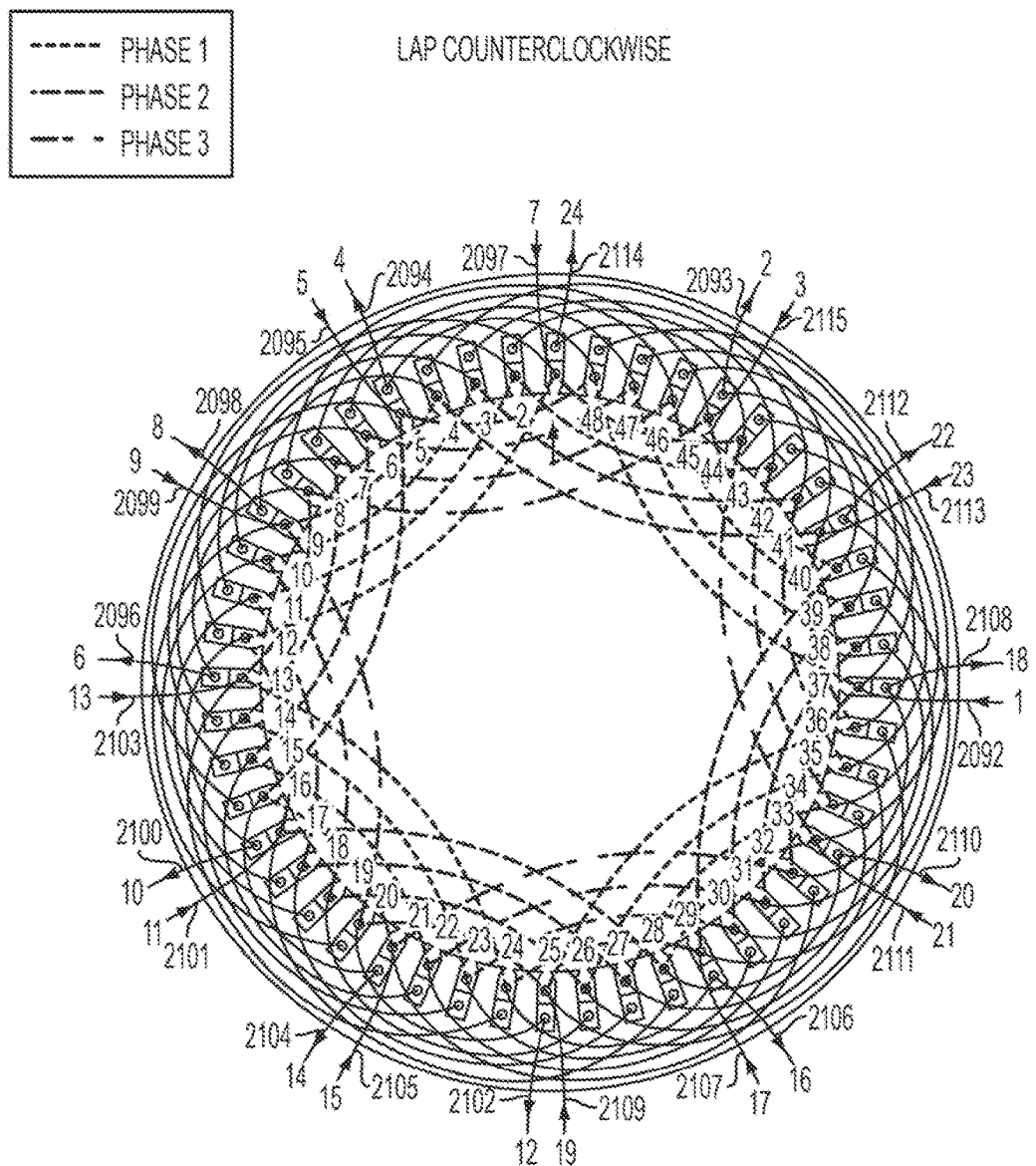
FIG. 21C is a diagram illustrating an exemplary wound stator machine in accordance with in one or more alternative embodiments.

With reference to FIG. 21C, a depiction of the actual coil groups which are represented diagrammatically in FIG. 21B is shown. The input and output wires for each wound coil group in FIG. 21C correspond to the same numbers as represented in FIG. 21B. The correspondence can be described as follows: Phase A coil group #1 input wire #1-2092, output wire #2-2093; Phase C coil group #1 input wire #3-2115, output wire #4-2094; Phase B coil group #1 input wire #5-2095, output wire #6-2096; Phase A coil group #2 input wire #7-2097, output wire #8-2098; Phase C coil group #2 input wire #9-2099, output wire #10-2100; Phase B coil group #2 input wire #11-2101, output wire #12-2102;

Phase A coil group #3 input wire #13-2103, output wire #14-2104; Phase C coil group #3 input wire #15-2105, output wire #16-2106; Phase B coil group #3 input wire #17-2107, output wire #18-2108; Phase A coil group #4 input wire #19-2109, output wire #20-2110; Phase C coil group #4 input wire #21-2111, output wire #22-2112; Phase B coil group #4 input wire #23-2113, output wire #24-2114.

It will be appreciated that the above detailed description provides the ability to easily transpose the internal hookup diagram shown in FIG. 21B to an actual exemplary wire hookup of wound three phase coils of an embodiment. The winding depicted in FIG. 21D, as in FIG. 21B, is a three phase four pole winding with four coil groups per phase and are counterclockwise lap wound.

Figure 21D:
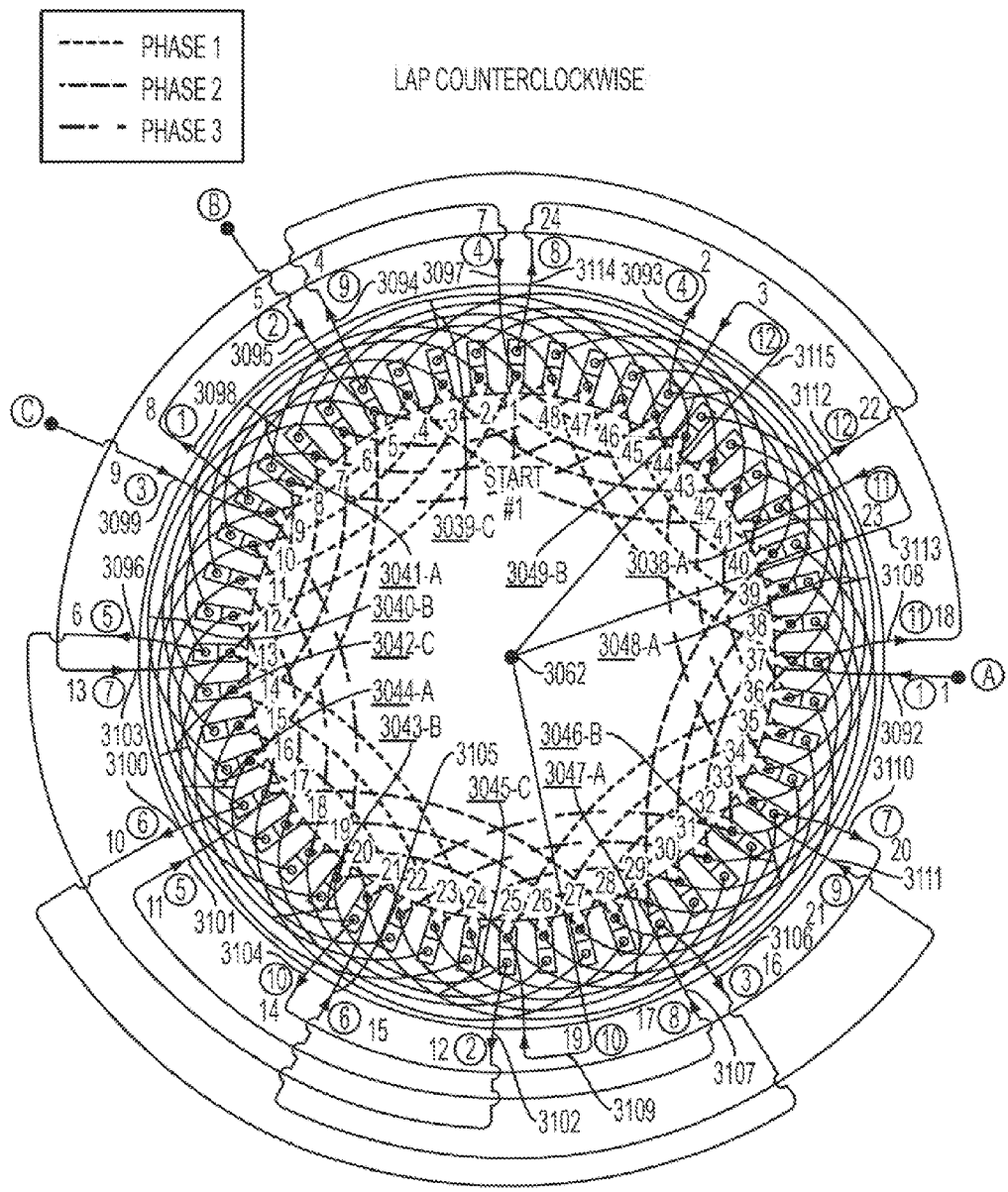
FIG. 21D is a diagram illustrating exemplary three-phase winding connections of a wound stator machine in accordance with in one or more alternative embodiments.

With reference to FIG. 21D, Phase A leg 3092 is connected to coil group 3038-A wound in a counterclockwise (N) direction with an input at circle 1 and an output at circle 4. The output lead 3093 connects to coil group 3041-A which is wound in a clockwise (S) direction with an input at circle 1 and an output at circle 4. The output lead of these two coil groups 3097 connect to coil group 3044-A wound in a counterclockwise (N) direction with an input at circle 7 and an output at circle 10. The output lead 3104 connects to coil group 3047-A wound in a clockwise (S) direction with an input at circle 7 and output at circle 10. The output lead 3109 makes up in the "wye" connection 3062 with the other two phases.

Phase B leg 3095 connects with coil group 3040-B wound in a counterclockwise (N) direction with an input at circle 2 and an output at circle 5. The output lead 3096 connects to coil group 3043-B wound in a clockwise (S) direction with an input at circle 2 and an output at circle 5. The output lead 3101 connects to coil group 3046-B wound in a counterclockwise (N) direction with an input at circle 8 and an output at circle 11. The output lead 3108 connects to coil group 3049-B wound in a clockwise (S) direction with an input at circle 8 and an output at circle 11. The output lead 3113 connects to a portion of the "wye" connection 3062.

Phase C leg 3099 connects to coil group 3042-C wound a in a counterclockwise (N) direction with an input at circle 3 and an output at circle 6. The output lead 3100 connects to coil group 3045-C wound in a clockwise (S) direction with an input at circle 3 and an output at circle 6. The output lead 3105 connects to coil group 3048-C wound in a counterclockwise (N) direction with an input at circle 9 and an output at circle 12. The output lead 3112 connects to coil group 3039-C wound in a clockwise (S) direction with an input at circle 9 and an output at circle 12. The output lead 3115 connects to "wye" connection 3062.

Figure 21E:
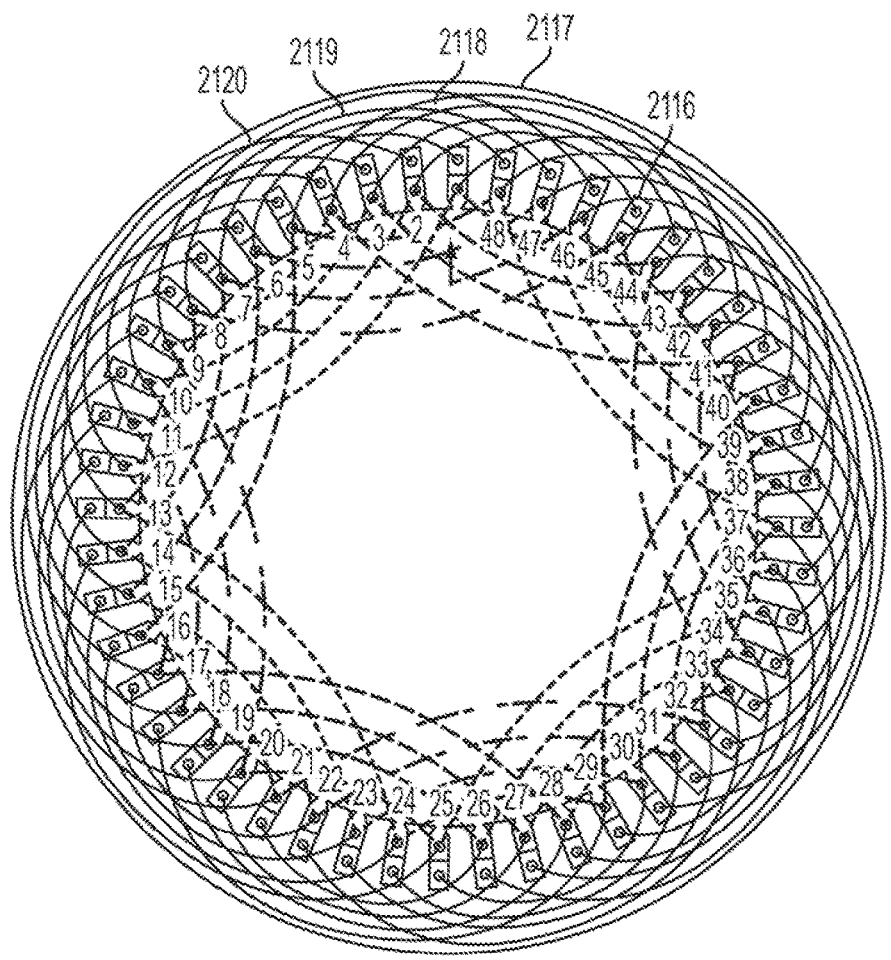
FIG. 21E is a diagram illustrating an exemplary three-phase internal race winding of a wound stator machine in accordance with in one or more alternative embodiments.

FIG. 21E illustrates an internal race winding of the stator 2117 with a three phase four pole clockwise lap winding with four coils per phase. The slots 2116 contain slot insulation as well as insulation between the phase coils. Phase A coils 2120 are depicted in blue, Phase C coils 2119 are depicted in brown, and Phase B coils 2118 are depicted in red.

Although the forgoing depiction discussed four pole slot rotors, the preferred embodiment is a unipole rotor. The unipolar rotor is wound such that the entire 360° rotor surface is either north pole or south pole depending upon the direction of the current flow through the windings. The unipolar rotor has only two leads and the direction of current flow is controlled by a gating mechanism within the solid state excitation cards.

Figure 22:
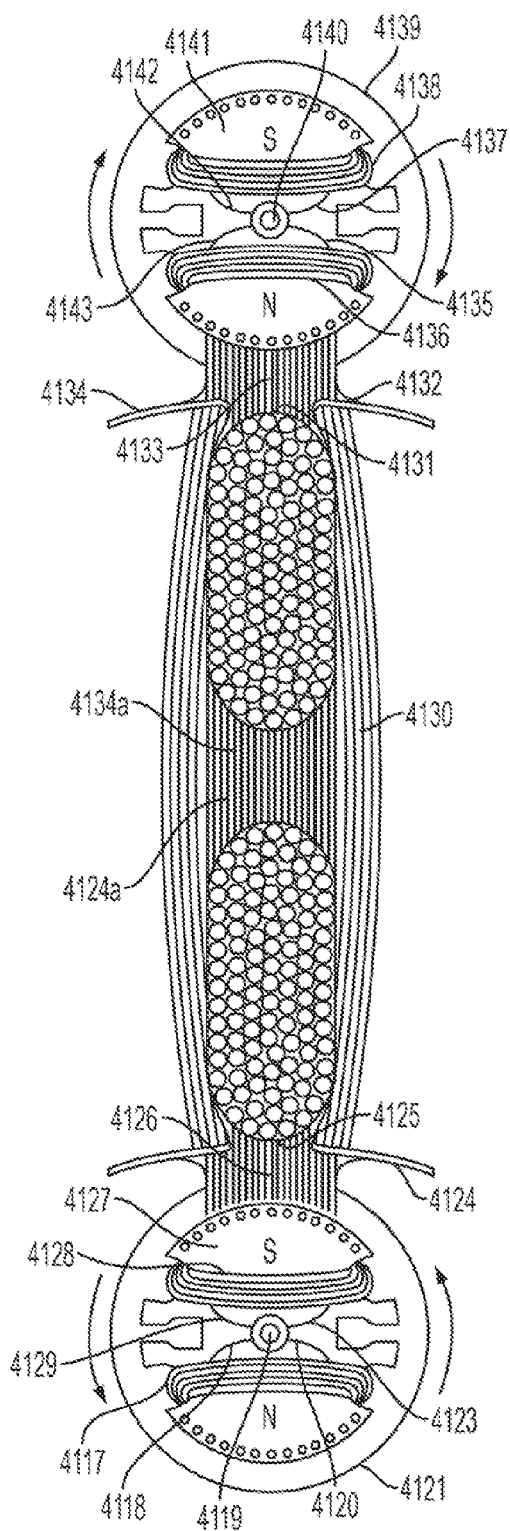
FIG. 22 is a diagram illustrating a dual pole embodiment of an exemplary dipole electromagnetic slot rotor including pole windings, mu metal shielding, wire slot, side iron and back iron flux linkage between the north and the south pole.

FIG. 22 is a depiction of a cross-section of a dipole slot rotor pair and stator segment. Laminated steel stator segment representing outer circumference segment 4134 and inner circumference segment 4124 of the dual stator slots. The outer circumference slot 4131 and the inner circumference slot 4125 contain conductors which make up the induction coils of the outer circumference induction windings and the inner circumference induction windings. The back iron consists of common laminate steel 4134a and 4124a which are common to both the outer circumference slot 4131 and the inner circumference slot 4125. Outer circumference slot rotor 4141 rotates on shaft 4140 which is driven by a gear and transmission mechanism or individual slot rotor variable speed motor. Slot pole rotor 4141 south pole is generated by copper wire coil 4138 as DC current is fed into coil through a slip ring to conductor 4142 and current returns through conductors 4137 to slip ring and power supply which is controlled by sequencing solid state excitation boards.

Slot pole rotor 4141 north pole is generated by copper wire coil 4136 as a DC current is fed into the coil through a slip ring to conductor 4143 and current returns through conductor 4135 to slip ring and power supply which is controlled by a sequencing solid state excitation board. Inner circumference slot rotor 4127 rotates on shaft 4119 which is driven by a gear and transmission mechanism or an individual slot rotor variable speed motor. Slot pole rotor 4122 south pole is generated by copper wire coil 4128 as a DC current is fed into the coil through a slip ring to conductor 4129 and the current returns through conductor 4123 to slip ring and power supply which is controlled by sequencing the solid state excitation boards. Slot pole rotor 4122 north pole is generated by copper wire coil 4117 or a DC current is fed into the coil through a slip ring to conductors 4118 and the current returns through conductor 4120 to slip ring and power supply which is controlled by sequencing via the solid state excitation boards. As the sequencing system rotates the dual rotors, north pole in one rotor and south pole in the opposite rotor facing the dual stator slots, magnetic coupling occurs between the two poles (North +−+ South) through the air, the side iron 4132 and 4124 as well as the back iron 4134a and 4124a. This magnetic flux 4133, 4130 and 4126 pushes electrons in the appropriate direction and generates significant voltage. The side iron and back iron greatly enhances the magnetic coupling and thereby enhances power production. The rotor magnetic poles are shielded and separated from the stator inductive poles by mu metal shield 4139 on the outer circumference and shield 4121 on the inner circumference.

Figure 23:
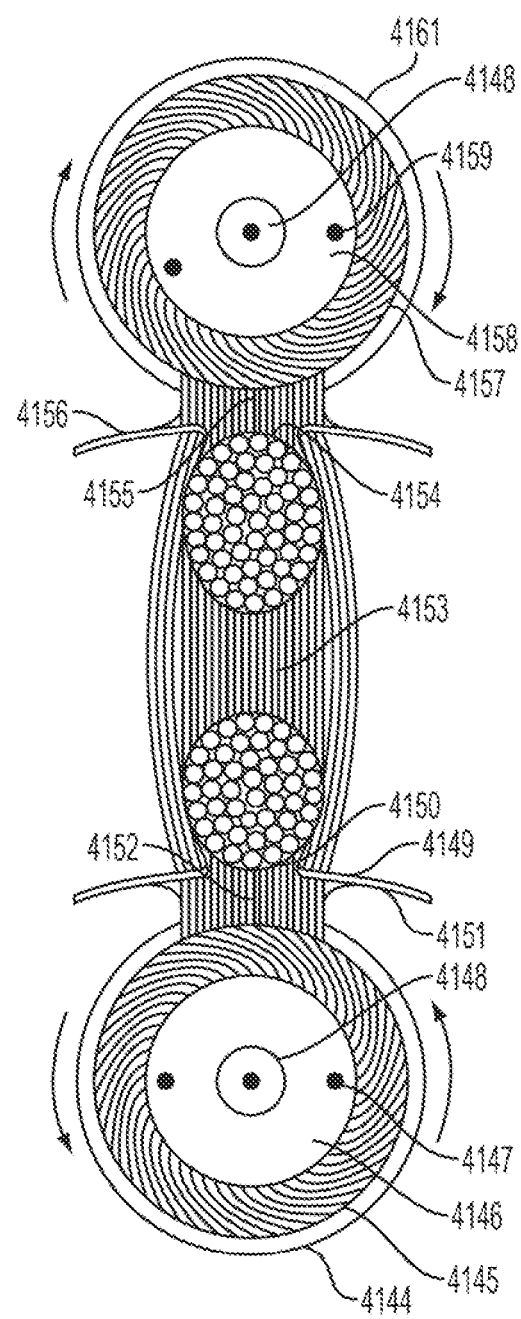
FIG. 23 is a diagram illustrating a dual pole embodiment of an exemplary unipole alternating lead electromagnetic slot rotor including pole windings, mu metal shielding, wire slot containing conductors, side iron and back iron and flux linkage between the north and south pole.

FIG. 23 is a diagram illustrating a dual pole embodiment of an exemplary unipolar alternating lead (alternates North pole +−+ South pole) electromagnetic slot rotor including pole windings, mu metal shielding around the rotors and further illustrating a wire slot containing conductors along with side iron and back iron to enhance the flux linkage between the north and south pole rotors such that the moving magnetic flux permeates the conductors contained within the wire slots. The outer circumference rotor 4158 of the slot rotor pair rotates on shaft 4148 in close proximity to wire slot 4155 which is contained in laminated steel stator outer circumference 4156. Rotor 4158 is shielded from the stator inductive poles by geometric location and mu metal shield 4161. The inner circumference rotor 4146 of the slot rotor pair rotates on shaft 4148 in close proximity to wire slot 4152 which is contained in laminated steel stator inner circumference 4151. Unipolar rotors 4158 and 4146 are lap wound with a single coil with a span which allows the greatest flux density. The unipolar rotors as described herein are lap wound with a single coil and 2 leads (an alternating (+) positive and (−) negative lead). The solid state excitation system reverses the direction of current flow in the leads every other excitation cycle, such that the rotor which exhibits north pole for 360° then south pole 360°. Therefore the frequency is controlled by the excitation system and generated power frequency is independent of the speed of the rotor. As will be seen in FIG. 24 the mu metal shields 4161 and 4144 are preferably surrounded by laminated electric steel such that a magnetic bearing effect aids in stabilizing the rotors at high speed. This laminated steel tunnel is homogenous for 360° of rotation, and without magnetic poling therefore no drag occurs secondary to attraction of the rotor poles spinning within the laminated steel tunnel. When the inner circumference stator rotor is activated south pole, the outer circumference slot rotor is activated north pole. The magnetic flux generated between the north pole and south pole allows magnetic coupling through the air gap along with the side iron and shared back iron. Magnetic flux 4155 couples with magnetic flux 4152 through back iron 4153 and permeates the conductors in wire slot 4154 and 4150. Thereby, creating voltage which becomes electric power when the coils are connected to an electric load and current begins to flow.

Figure 24:
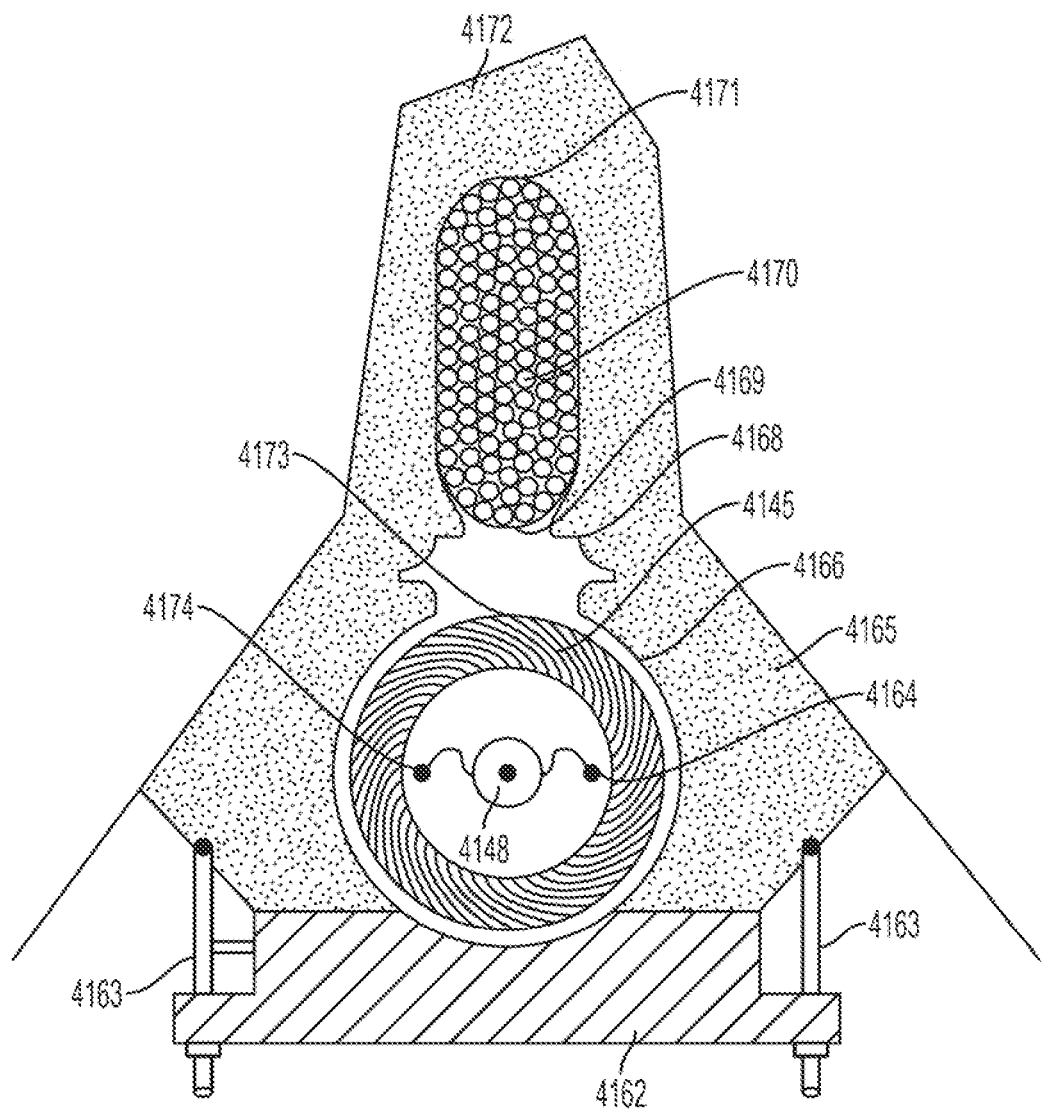
FIG. 24 is a diagram illustrating a single pole embodiment of an exemplary alternating lead electromagnetic slot rotor including pole windings, mu metal shielding, and laminated steel around the rotors with a laminated steel mu metal shield cover.

FIG. 24 is a diagram illustrating the formation of the closed laminated steel tunnel formed on the outer stator circumference. This is a depiction of a single outer stator circumference rotor single pole embodiment of an exemplary alternating lead (north +−+ south) electromagnetic slot rotor including pole windings, mu metal shielding and laminated steel around the rotors with a laminated steel mu metal shield cover which forms uniform laminated steel around the unipole rotor giving a magnetic bearing effect. Laminated steel stator segment 4172 contains wire slot 4171 which contains induction coil wire 4170 which are put into the slot through slot opening 4169. Rotor 4173 is a unipolar rotor with a continuous lap wound coil 4145 with only two leads in which the current flow direction is controlled by a switching mechanism in the excitation cards. The rotor contains eddy current discharge rods 4174 and 4164. The rotor is rotated on shaft 4148 and is rotated by a gearing mechanism or a single driver, variable speed motor. The rotor is surrounded by mu metal shield 4166 and is retained by laminated electrical steel mu metal shield cover 4162 which is attached to the stator by retention rod 4163.

Figure 25:
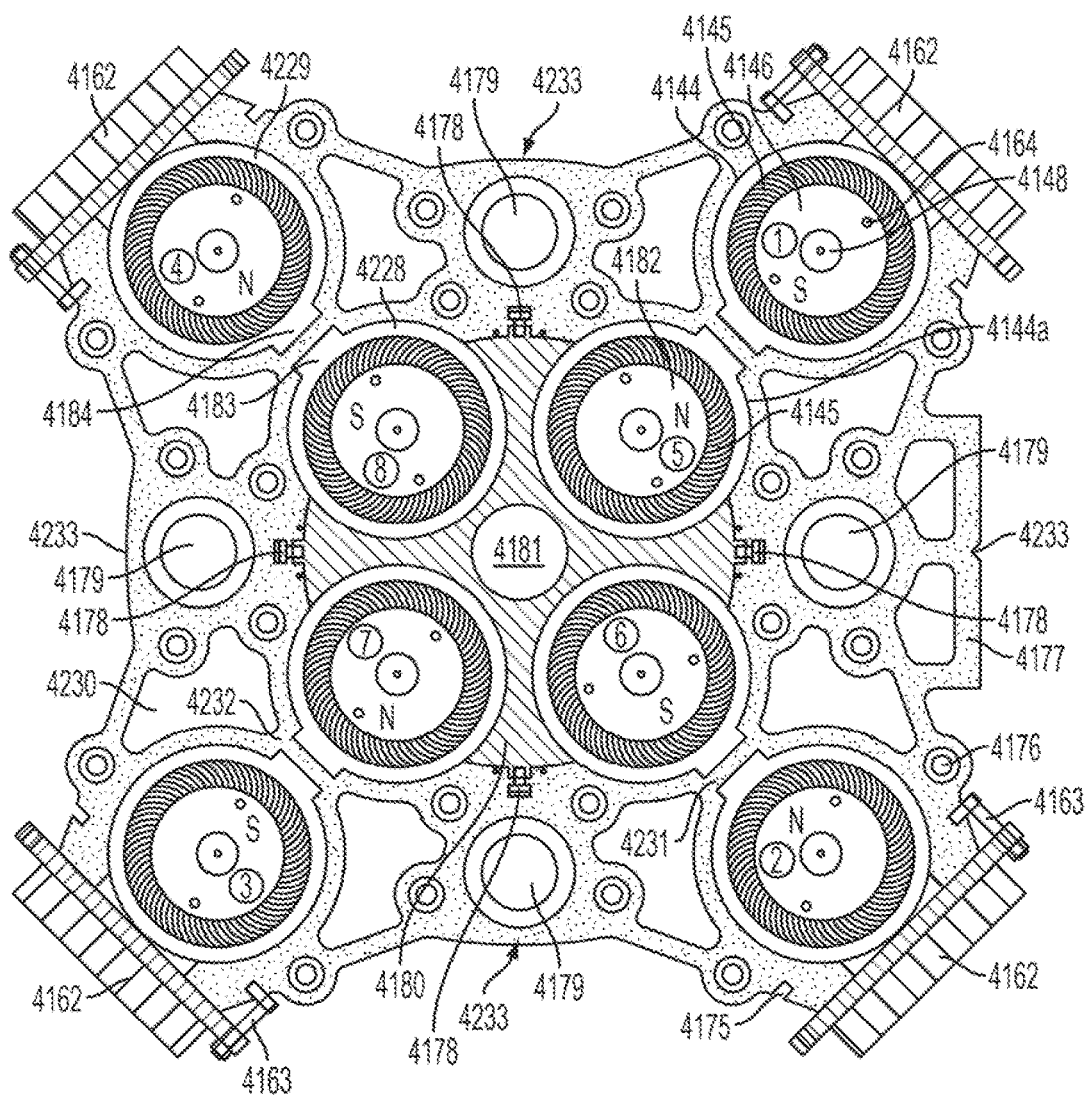
FIG. 25 is a diagram illustrating an exemplary cross section of a slot, stator, rotors, mu metal shields and mu metal shield covers of one or more embodiments.

FIG. 25 is a diagram illustrating a depiction of a cross section of an 8 slot stator, rotor, inner mu metal shield covers, outer mu metal shield covers of a preferred embodiment. Laminated stator cross section 4177 contains outer circumference rotor cavities 4229 and inner circumference stator cavity 4228. The outer circumference rotor cavities contain induction wire slots 4184. The inner circumference rotor cavities contain induction wire slots 4183. The rotor cavities are lined with mu metal shields with openings in the shield over the wire slots. The outer circumference rotor cavities contain mu metal shields 4144, the inner circumference rotor cavities contain mu metal shields 4144a. Laminated stator 4177 contains support post holes 4179, air ventilation holes 4233 and torsion bolt holes 4176 and mu metal shield covers. Outer circumference mu metal shield covers 4162 are made of laminated steel, laminated in the same orientation as the stator. The texture of shield covers 4162 in the FIG. 25 appear different to the stator, however this difference is only to contrast the shield covers to the stator. The mu metal shield covers are held in place by retention bolts 4163 which attach to the stator iron in slot 4175. The inner circumference mu metal shield covers 4180 are in one piece of laminated steel, which is laminated in the same orientation as the stator laminates. The said inner circumference mu metal shield contains a ventilation hole 4181 and attaches to stator laminate 4177 via attachment means 4178. The laminated stator 4177 presents in the area of each induction wire slot a region of functional side iron 4232 which is not covered by the mu metal shields by intentional design. Shared back iron 4231 is present between the outer circumference rotor slot 4229 and the inner circumference rotor slot 4228. In one example of the functioning of the stator rotor mechanism in FIG. 25 which represents one of the two north-south cycles of the unipolar rotor. Rotor (1) and Rotor (S) forms magnetic flux linkage across the side iron, wire slots and shared back iron. Similar flux linkages occur between Rotor (2) and Rotor (6), Rotor (3) and Rotor (7) and Rotor (4) and Rotor (8). When these rotors are rotated by a transmission or individual slot rotor motors with the proper magnetic flux density, speed and north-south excitation, power is generated in the induction coils in slots 4184 and 4183.

There are 4 outer stator circumference slots and 4 inner stator circumference slots. The induction coils are lap wound and connected in series for the outer circumference coils and for the inner circumference induction coils. The power output is single phase AC in this particular arrangement. If 3 stators are employed in which the rotors in the separate stators are fired 120° out of phase with one another and the neutral leads from each stator are connected together, 3 phase power will be produced. If the rotors are continuously rotated with the same polarity DC (direct current) will be produced. The rotors 4182 rotate on shaft 4148 in a bearing containment means and are rotated by a transmission and drive motor or eight individual rotor drive motors driven by a common variable speed drive. The structure as depicted in FIG. 25 completely eliminates any electro-magnetic drag either by destructive flux linkage between any stator components including the induced stator poles, which occur when the induction coils are connected to an electric load. The kinetic energy required to drive the system is the same in the unloaded state, loaded state or at variable loads. The only energy required is that required to turn the mechanical mechanism.

Figure 26:
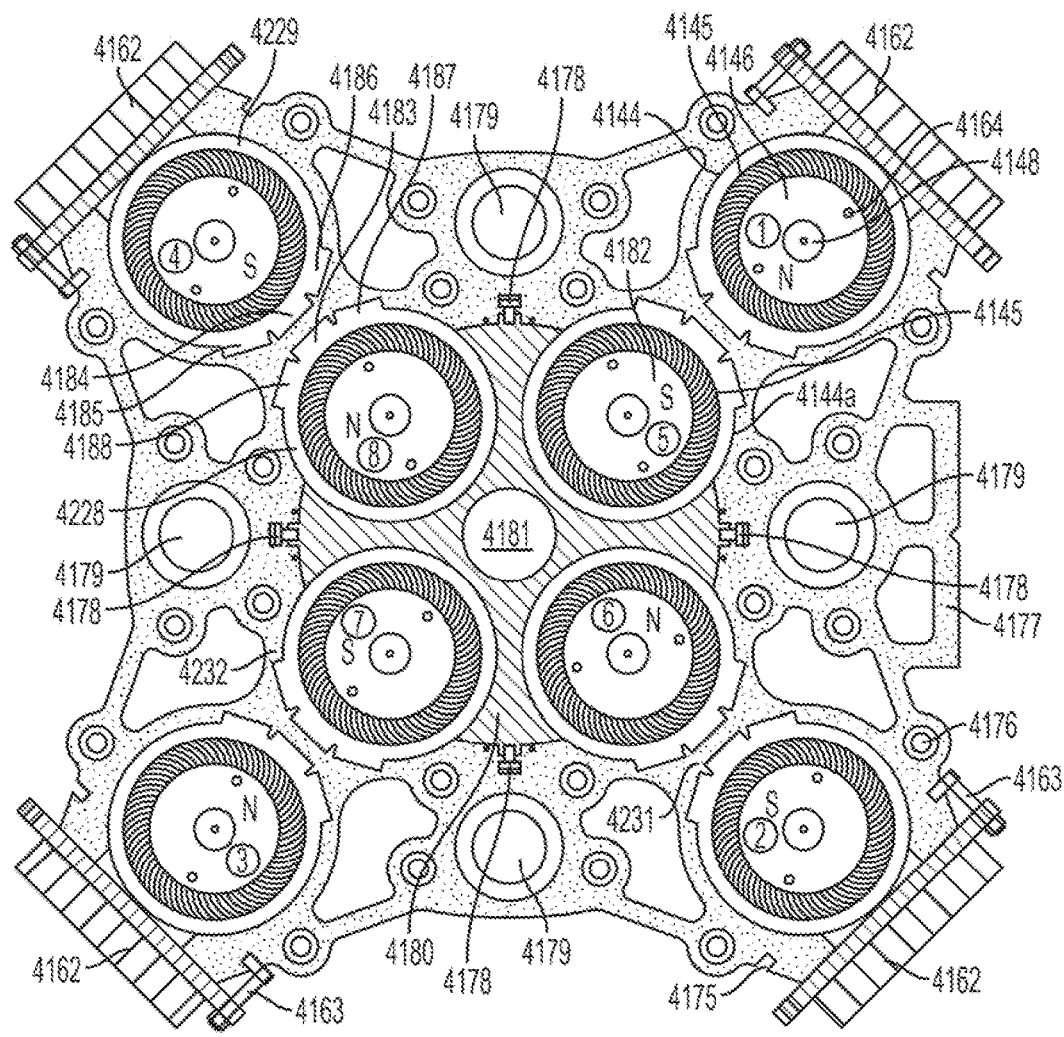
FIG. 26 is a diagram illustrating a depiction of a cross-section of a 24 slot stator, rotors, mu metal shields and mu metal shield covers of one or more embodiments.

FIG. 26 is a diagram illustrating a depiction of a cross section of a 24 slot stator, rotor, inner mu metal shield covers, and outer mu metal shield covers of a preferred embodiment. Laminated stator cross section 4177 contains outer circumference rotor cavities 4229 and inner circumference rotor cavities 4228. The outer circumference rotor cavities contain induction wire slots 4184, 4185 and 4186. The inner circumference rotor cavities contain induction wire slots 4183, 4187 and 4188.

The rotor cavities are lined with mu metal shields with openings in the shield over the wire slots. The outer circumference rotor cavities contain mu metal shields 4144, the inner circumference rotor cavities contain mu metal shields 4144a. Laminated stator 4177 contains support post holes 4179, air ventilation holes 4230, torsion bolt holes 4176 and mu metal shield covers. Outer circumference mu metal shield covers 4162 are made of laminated steel, laminated in the same orientation as the stator. The texture of shield covers 4162 in FIG. 26 appears different to the stator, however this difference is only to contrast the shield covers by way of differentiation to the stator. The mu metal shield covers are held in place by retention bolts 4163 which attaches to the stator iron in slot 4175.

The inner circumference mu metal shield covers 4180 are in one piece of laminated steel, which is laminated in the same orientation as the stator laminates. The said inner circumference mu metal shield cover contains a ventilation hole 4181 and attaches to stator laminates 4177 via attachment means 4178. The laminated stator 4177 presents in the area of each induction wire slot a region of functional side iron 4232 which is not covered by the mu metal shields by design. Shared back iron 4231 is present between the outer circumference rotor slots 4229 and in the inner circumference rotor slots 4228.

In one example of the functioning of the stator rotor mechanism in FIG. 26 is noted that the activation of the rotors are electrically 180° out of phase when compared to FIG. 25. This example in FIG. 26 represents the opposite south-north cycles of the unipolar rotor. Rotor (1) and Rotor (5) forms a magnetic flux linkage across the side iron, wire slots and shared back iron. Similar flux linkages occurs between Rotor (2) and Rotor (6), Rotor (3) and Rotor (7) and Rotor (4) and Rotor (8). When these rotors are rotated by a transmission or individual slot rotor motors with the proper magnetic flux density, speed along with north-south excitation, electric power is generated in the induction coils in slots 4184, 4185, 4186, 4183, 4187 and 4188. There are 12 outer circumference stator slots and 12 inner circumference stator slots. The induction coils are lap wound and connected in series for the outer circumference induction coils and for the inner circumference induction coils. The power output is single phase AC in this particular arrangement. If 3 stators are employed in which the rotors in the separate stators are fired 120° out of phase with one another and the neutral leads from each stator are connected together, 3 phase AC power will be produced. If the rotors are continuously rotated with the same polarity, DC (direct current) will be produced. The rotors 4182 rotate on shaft 4148 in a bearing containment means and are rotated by a transmission and drive motor or eight individual rotor drive motors all driven by a common variable speed drive. The structure as depicted in FIG. 26 completely eliminates any electromagnetic drag either by destructive flux linkages between any stator components including the induced stator poles which occur when the induction coils are connected to an electric load. The kinetic energy required to drive the system is the same in the unloaded state, loaded state or at variable loads. The only energy required is that required to turn the mechanical mechanism.

Figure 27:
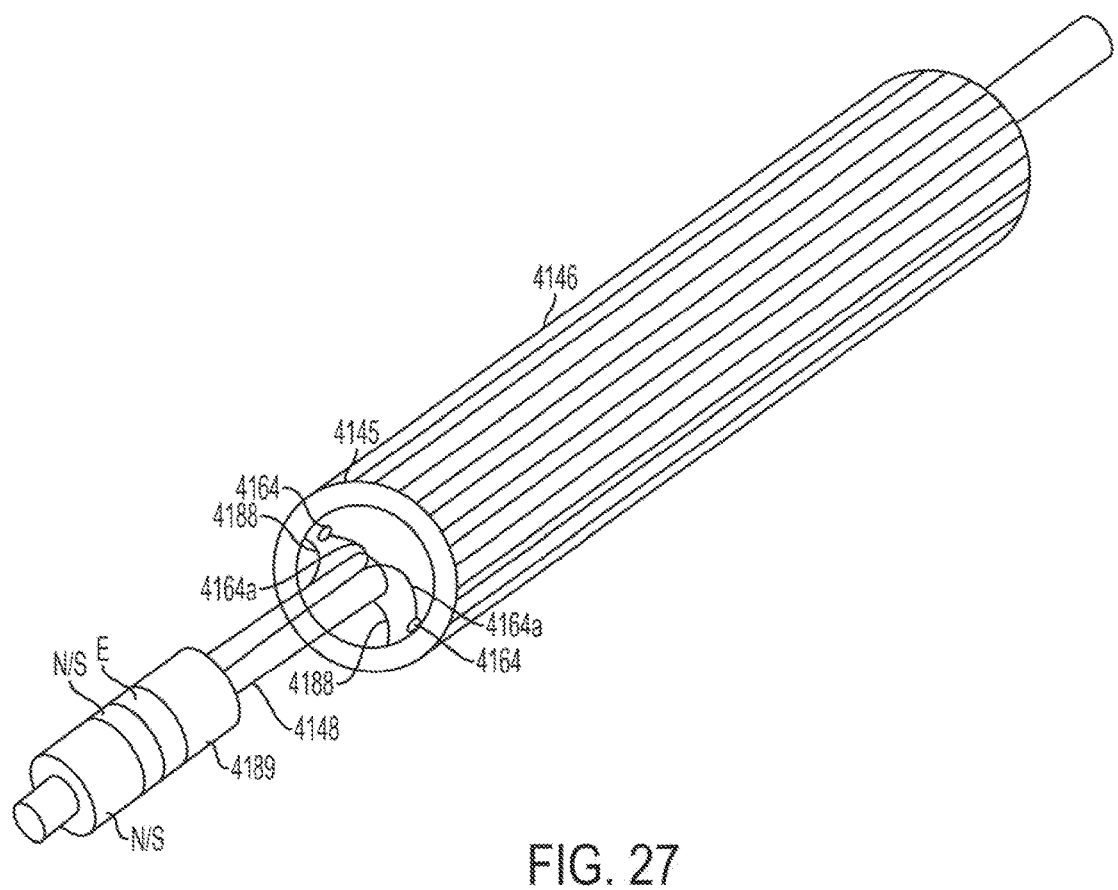
FIG. 27 is a diagram illustrating a unipolar rotor and slip ring of one or more embodiments.

FIG. 27 is a diagram illustrating a unipolar rotor and slip ring of a preferred embodiment. Rotor body 4146 is made of laser cut disc of 0.34 mm annealed electrical steel which is stacked on a jig, pressed and dipped in motor insulation varnish. The shaft 4148 is then pressed into the laminates. Slip ring 4189 is placed on shaft 4148. Eddy current rods 4164 are pressed through the entire length of the laminates and permanently attached at each end of the rods. The rods are electrically connected to the slip ring through conductors 4164*a*. The rotor is then insulated and wound with insulated copper magnet wire in a lap wound fashion with the greatest possible coil span. The two leads 4188 are connected to the N/S slip rings.

Figure 28:
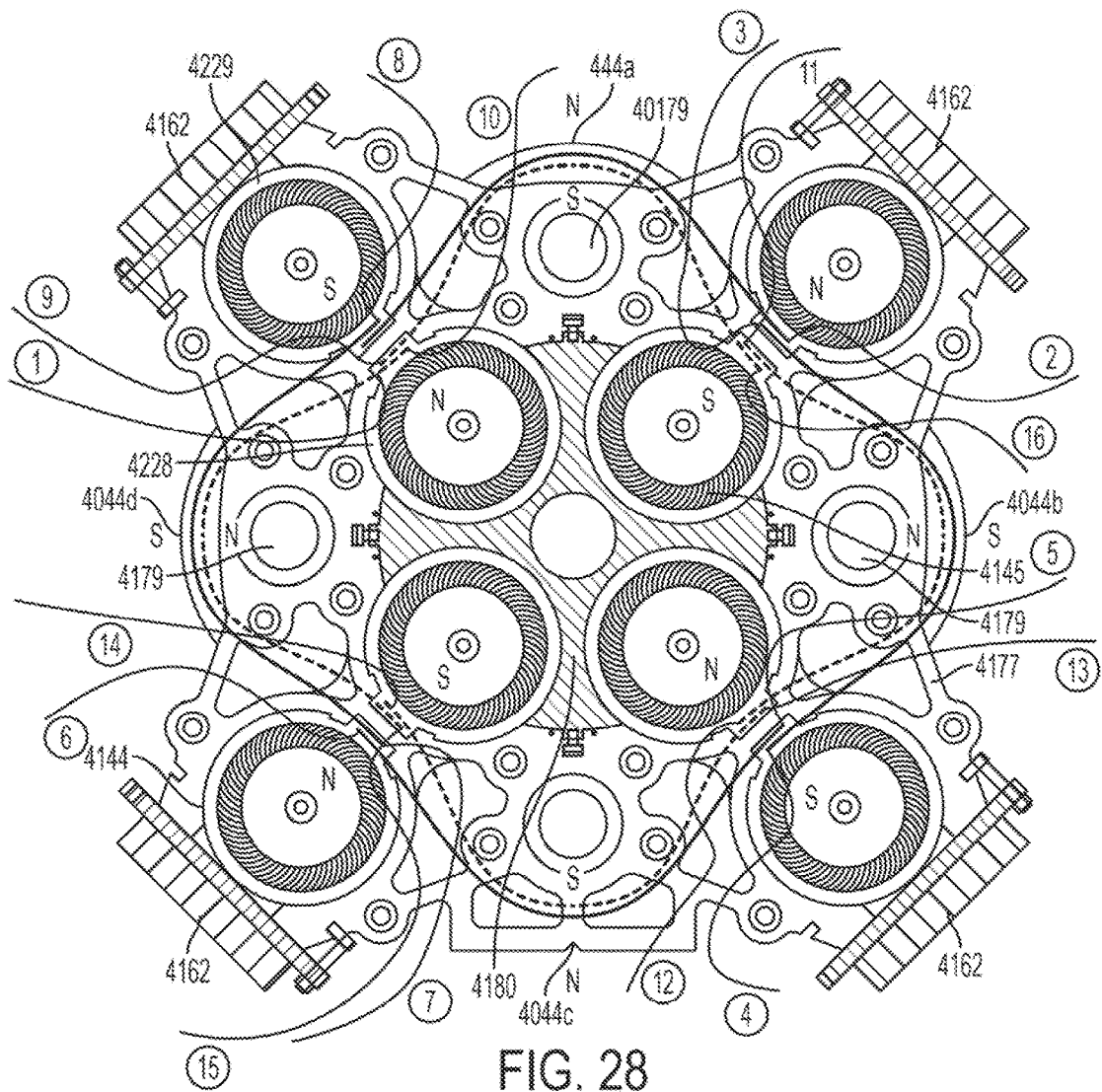
FIG. 28 is a diagram illustrating a cross section of an exemplary stator, a stator iron, rotor windings, unipolar rotors, mu metal shields, and laminated steel mu metal shield covers of one or more embodiments.

FIG. 28 is a depiction of a cross section of a stator of one of the preferred embodiments revealing the stator iron, stator windings, unipole rotors, mu metal shields and mu metal shield covers. This cross section of stator 4177 reveals major geometric and shielding issues which allow the generator to operate with little to no drag forces i.e. low positive torque. It is good to place torque of this machine into the proper perspective. It will be noted that at constant speed, the generator shaft torque is the only variable in relation to horsepower (HP) required to turn the generator shaft at constant speed such that the proper speed and in the case of a 2 pole or 4 pole proper frequency is maintained. However in the case of the unipole, the frequency is determined by the excitation boards and not altered by speed.

$$HP = Torque(FT\ lbs) \times Speed(rpm)/5252$$

A computer model of an exemplary generator in embodiments, reveals that this generator requires essentially the same torque to turn the shaft in the electrically loaded and unloaded state and/at various loads. The mechanical forces are related to mechanical resistance (i.e. torque) required to turn the mechanical mechanism and to compensate for the attraction of the magnetic rotors to the iron in the rotor cavities of the stator 4228 and 4229. However, in the case of this preferred embodiment, the unipolar rotor and the laminated electrical steel mu metal shields completely remove these attraction forces. The unipolar rotors and homogenous stator laminated steel rotor cavities 4228 and 4229 in combination function as a drag-free magnetic bearing of sorts. The other dominant forces which bring about very low electromagnetic drag secondary to stator electric load forces are the geometric positioning of the rotors some distance removed from stator magnetic poles 44*a*, 44*b*, 44*c* and 44*d*. Due to this geometric isolation of the rotor magnet from the stator magnetic field along with mu metal shielding 4144 around all rotors, the rotor magnetic forces are isolated from the stator magnetic forces. The stator coils associated with inner-outer lead pairs circle 1-2, circle 3-4, circle 5-6, circle 7-8, circle 9-10, circle 11-12, circle 13-14, circle 15-16 are lap wound and connected in series or in parallel. It is apparent from the figure that there is an inner stator winding and an outer stator winding. As will be noted the inner circumference stator windings are opposite in polarity to the outer circumference stator windings. The opposite polarity between inner circumference of the stator and outer circumference of the stator allows for flux linkage in the area of the support post 4179, which focuses magnet flux away from the rotor cavities 4229 and 4228. This design characteristic also decreases any flux linkage that may occur between the rotor magnetic poles and the stator induced magnetic poles.

Figure 29:
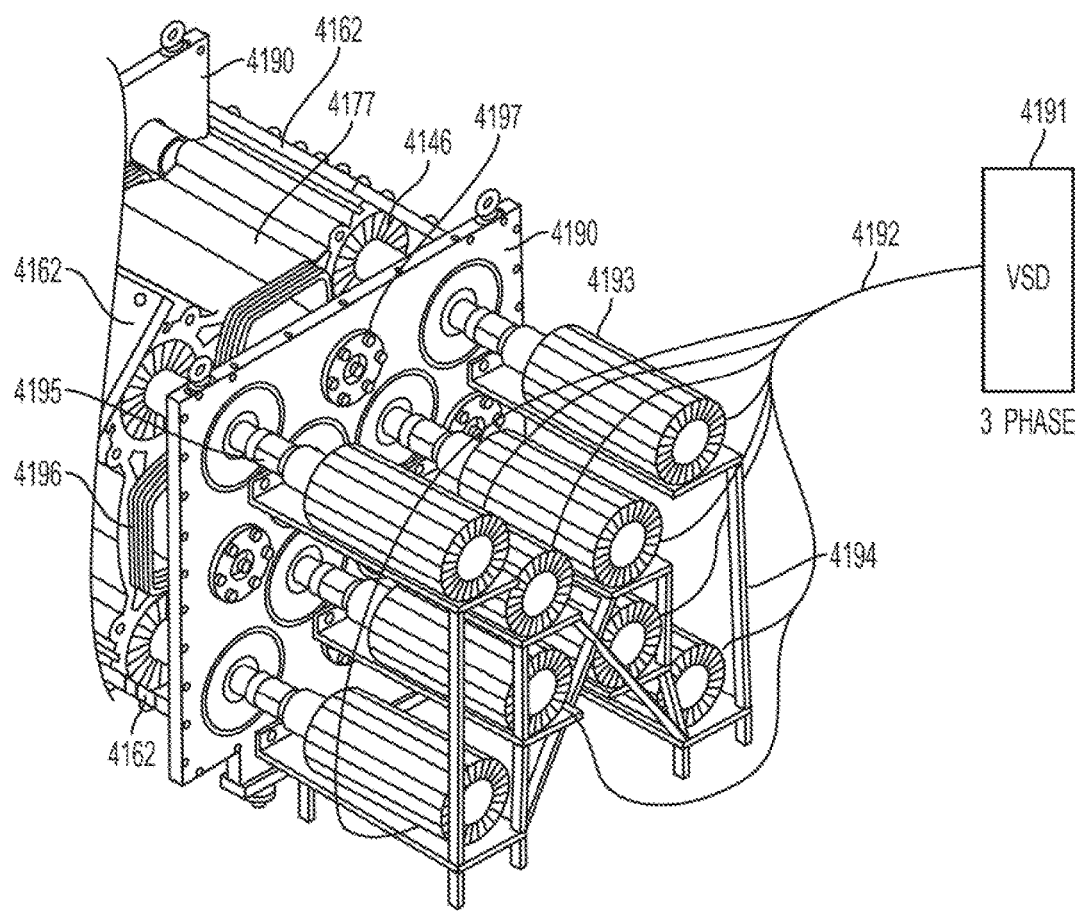
FIG. 29 is a diagram illustrating an end view projection of an exemplary stator, rotor drive motors and a variable speed drive unit in one or more embodiments.

FIG. 29 is a depiction of a superior oblique projection of a preferred stator revealing the rotor drive motors which are all controlled by a single variable speed drive. This projection reveals the stator 4177 which is supported by end support members 4190. Induction coils 4196 are revealed on the proximal end of the stator. Outer circumference rotors 4146 are revealed as are the outer circumference rotor mu metal shield covers 4162. The support plates 4190 are held in place and support the stator via torque support means 4197. The rotors are rotated at the desired speed via individual slot rotor motors 4193. The motors are supported by support frame 4194. The motors are powered by a variable speed drive 4191 through conductor cables 4192.

Figure 30:
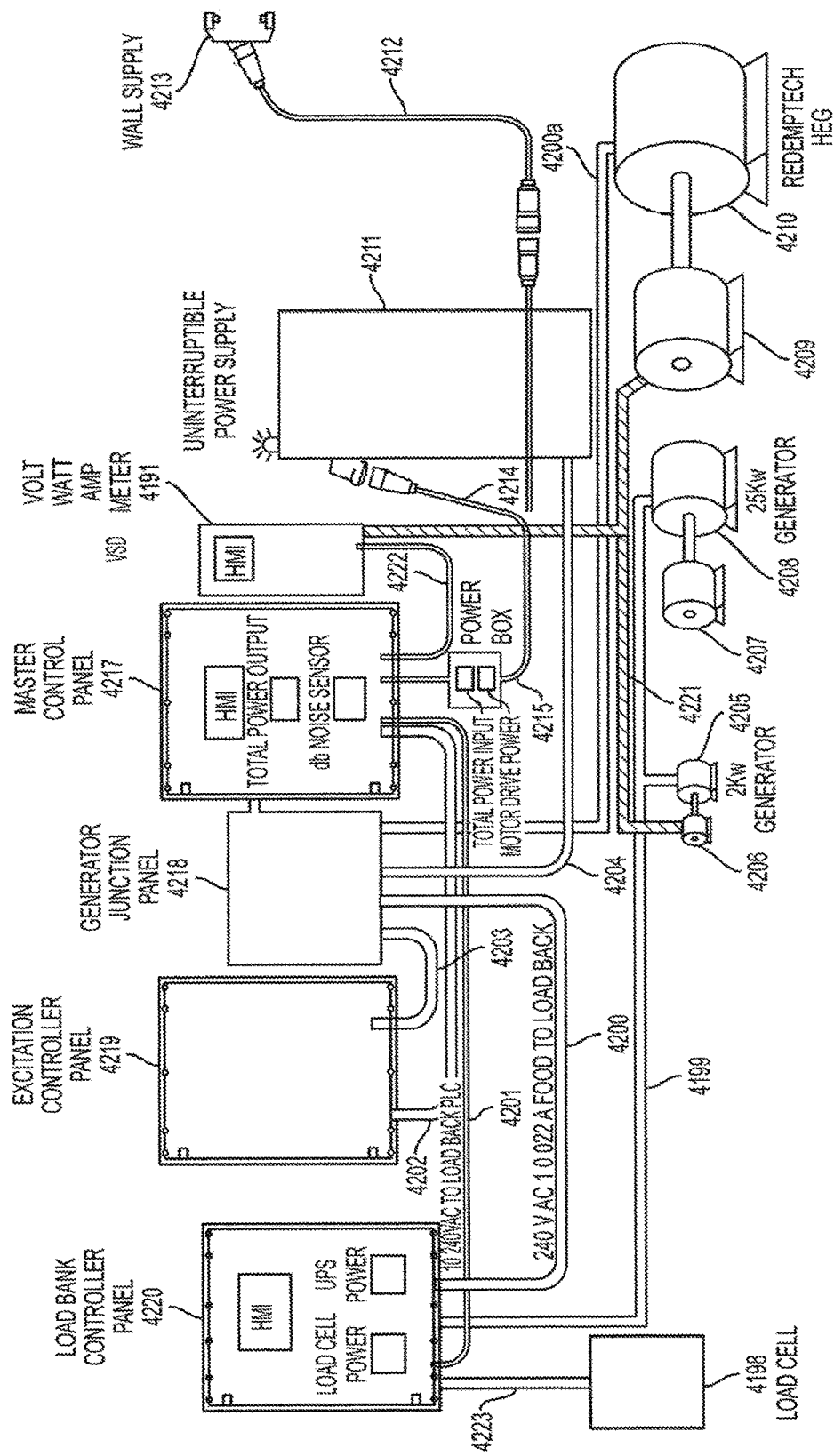
FIG. 30 is a schematic block diagram illustrating an exemplary control and testing system for a high efficiency generator and standard generator in one or more embodiments.

FIG. 30 is a depiction of a schematic of the control and testing system for the high efficiency generator and comparison to standard generators. The high efficiency generator is operated by a computer controlled system with master control, programmable logic centers and solid state rotor excitation system. The efficiency of the generator is determined by monitoring power input wall supply 4213 which enters power box 4216, where voltage, amperage and wattage into the system are measured. The output from generator 4210 (HEG) is fed via conduit 4200*a* to generator junction panel 4218. A voltage meter and current loop inside the Generator Junction Panel are connected to display screen on the master control panel 4217. Conductor 4200 carries power to the programmable load cell control panel. Power is sent to the load panel via a computer program cycle or manually. The load in increased until voltage drop on the system occurs. The two reference generators are tested in the same manner. That is total power input is measured and total power output to the load cell is measured. In the case of the two kW single phase generator 4205, it is driven by an electric 3 phase motor 4206 which is controlled by a variable speed drive 4191. Power output is then measured by the load bank controller panel meters as circuits are opened through conduit 4223 to load cell 4198. Total power input from wall 4213 is measured and recorded from the power box 4216 via volt, amp, watt meters as it passes through the power box en route to a variable speed drive (VSD) 4191.

In the case of the 25 kW single phase generator 4208, it is driven by an electric 3 phase motor 4207 which is controlled via the VSD 191. Power output is then measured by the load bank controller panel meters as circuits are opened through conduit 4223 to load cell 4198. Total power input from wall 4213 is measured and recorded from power box 4216 via volt, watt, amp meters as it passes through the power box en route to the VSD.

The HEG 4210 in FIG. 30 is an illustrative representation only. More details may be presented in the preceding figures. The driver motor 4209 is controlled by the VSD which receives an input single from a rotor encoder through a PLC (programmable logic center) to control speed. A position sensor on one of the rotor end shafts sends a signal to the excitation controller panel which sends a signal to the solid state excitation board which triggers the excitation board to send a DC electrical pulse at the proper time to the coils of the wound electric rotor (FIG. 27). Power input and output are measured in the same manner as in the case of generators 4205 and 4208. The power for the HEG can come either/or from the wall 4213 or from the Uninterruptible Power Supply 4211.

Figure 31:
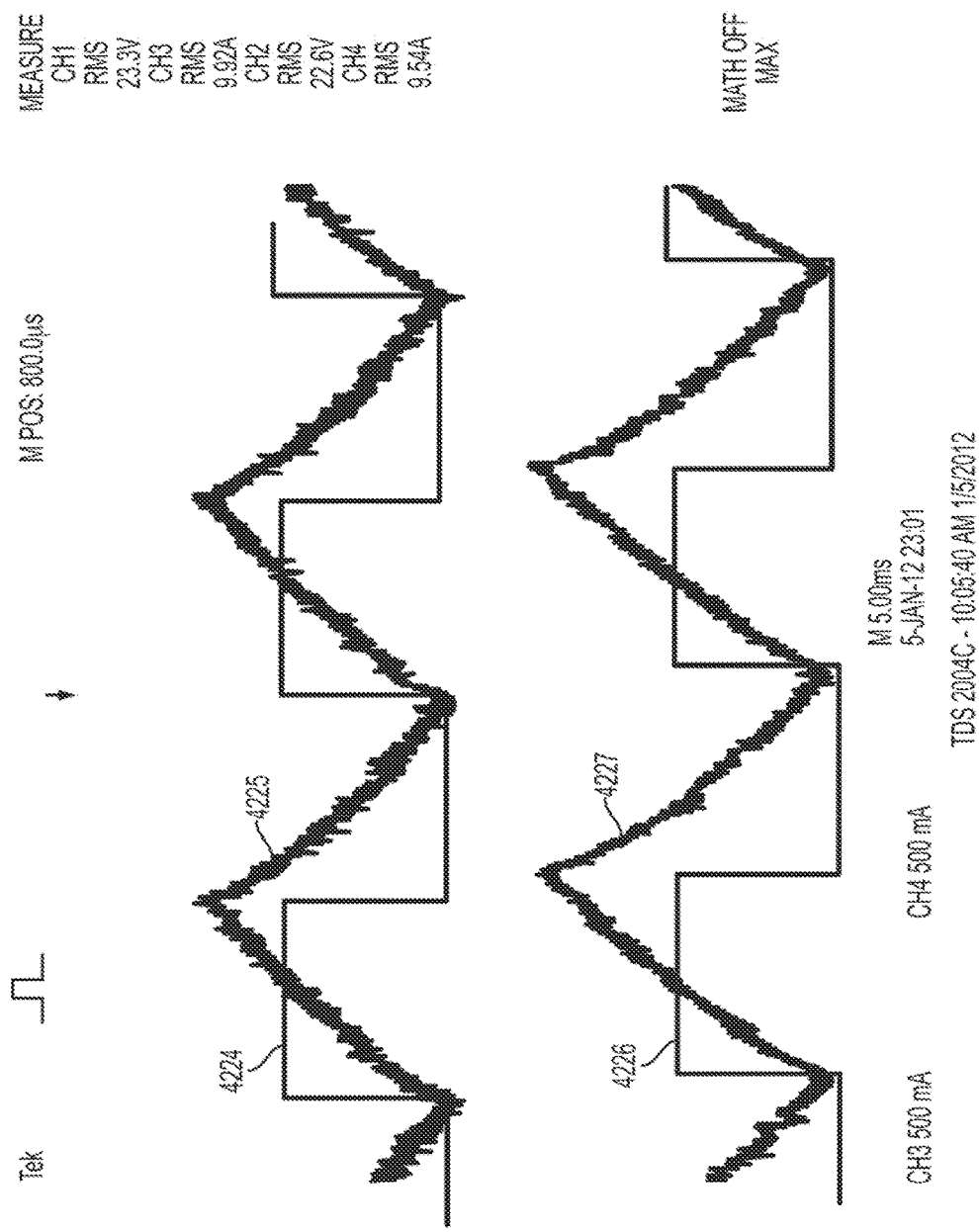
FIG. 31 is a diagram illustrating an oscilloscope trace of an excitation current and voltage from an exemplary activation circuit in one or more embodiments.

FIG. 31 is a diagram illustrating an oscilloscope tracing of the excitation current and voltage from two of the excitation cards which power the rotor coils. Tracing 4224 represents the voltage tracing which in this illustration is on for 180° of the rotational cycle. Tracing 4225 represents the amperage from the same 180° firing angle. Tracing 4226 represents the voltage from a second card and 4227 represents the amperage from the same card.

Figure 32:
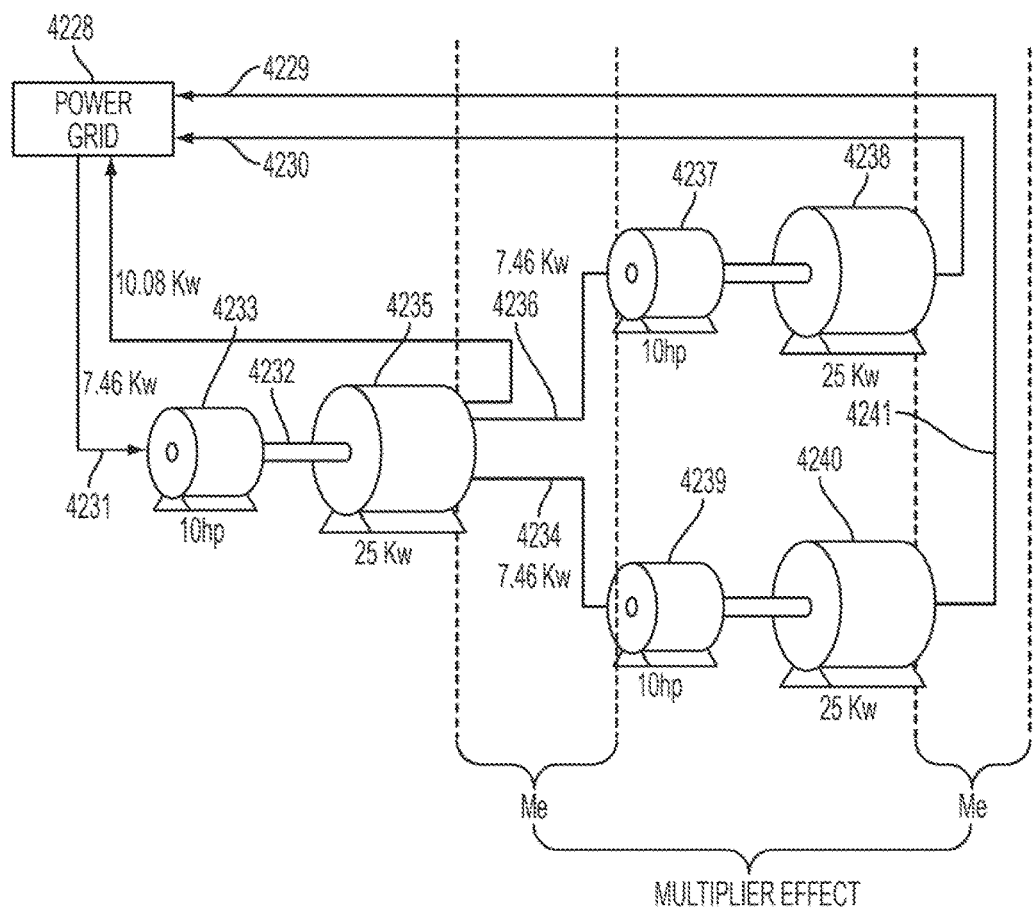
FIG. 32 is a diagram illustrating an exemplary configuration for magnifying electric power including a standard electric motor driving an exemplary high efficiency electric generator in one or more embodiments.

FIG. 32 is a diagram illustrating an exemplary configuration for the magnification of electric power through a standard electric motor driving an electric generator of higher efficiency than the electric drive motor. Electric power is initially taken from the power grid 4228 in an illustrative amount of approximately 7.46 kW through electrical conduit 4231, such as a wire conductor, busbar or the like to drive motor 4233 having an illustrative rating of 10 hp. Motor 4233 is configured to drive a high efficiency (HE) generator such as generator 4235 through a shaft 4232 to produce an illustrative 25 kW of electric power. In the example, approximately 10.08 kW of output of generator 4235 can be fed back to the power grid, while approximately 7.46 kW is fed to each of two 10 hp drive motors 4237 and 4239 respectively, through electrical conduit 4236 and electrical 4234 from generator 4235 constituting a net gain due to the multiplier effect (ME) between the first high efficiency generation stage and the subsequent high efficiency generation stage. Electric motor 4237, in turn, drives another HE generator 4238 to generate 25 kW of energy to feed back to the power grid through electrical conduit 4230. Electric motor 4239 drives HE generator 4240 to generate 25 kW of power to feed back to the power grid through electrical conduit 4241 and electrical conduit 4229. The operation of HE generators 4238 and 4240 constitute a second stage of gain due to the multiplier effect ME.

Figure 33:
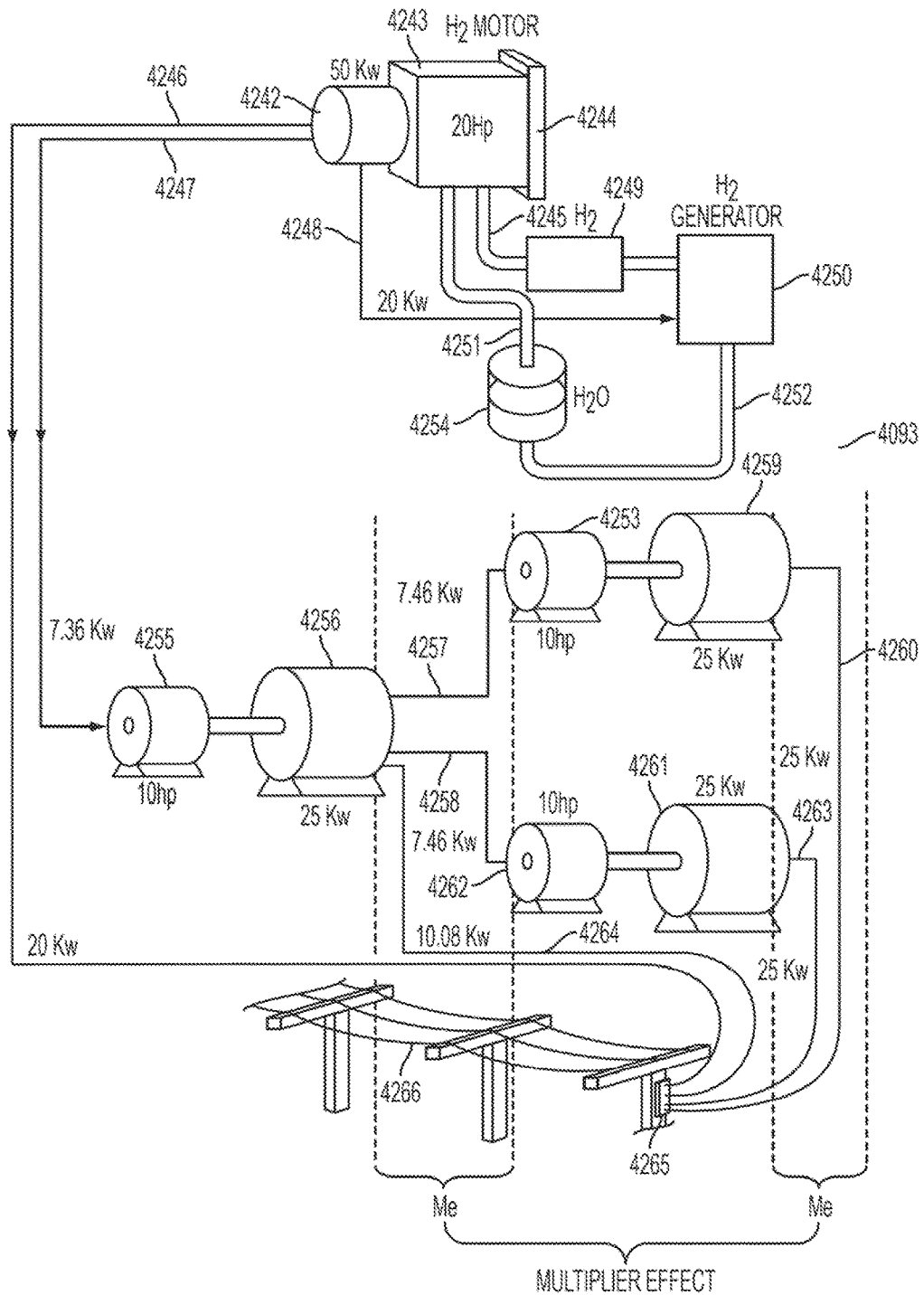
FIG. 33 is a diagram illustrating a high efficiency electric generator, a hydrogen generator and a hydrogen-driven engine in one or more embodiments.

FIG. 33 is a diagram illustrating a high efficiency electric generator HE, a hydrogen generator, and a hydrogen driven standard drive engine. In the example, a 20 hp internal combustion engine 4243 can be configured to drive HE electric generator 4242, which in turn, drives a hydrogen generator 4250, to thereby provide electric power through the feedback utilization of the efficiency gains. The 20 hp hydrogen-fueled internal combustion engine 4243 can be operated through control panel 4244 and fueled by hydrogen generator 4250 and contained in storage tank 4249 through the hydrogen conduit line 4245 into hydrogen-fueled internal combustion engine 4243. The hydrogen-fueled internal combustion engine 4243 drives 50 kW HE generator 4242 that feeds approximately 20 kW of power through electrical conduit 4248 to the hydrogen generator 4250 which in turn, supplies, for example, gaseous hydrogen or the like, to the hydrogen storage tank 4249 from which the hydrogen is supplied to the hydrogen fueled internal combustion motor 4243.

HE generator 4242 supplies an additional 20 kW of power via electrical conduit 4246 to the power grid 4266 via transformer 4265. HE generator 4242 supplies 7.46 kW of electric power via electrical conduit 4247 to a 10 hp electric motor 4255 that drives a 25 kW HE generator 4256 for supplying approximately 10 kW of power to the electric power grid 4266 via electric conduit 4264 and transformer 4265. HE generator 4256 further supplies approximately 7.46 kW to drive motors 4253 and 4262, respectively, through electrical conduits 4257 and 4258 constituting a net gain due to the multiplier effect (Me). The 10 hp drive motors 4253 and 4262 drive 25 kW generators 4259 and 4261, which, in turn, supply 25 kW of electric power via electrical conduit 4260 to the electric power grid 4266 via transformer 4265 constituting an additional gain due to the multiplier effect (ME). HE generator 4261 sends 25 kW of electric power via electrical conduit 4263 to the electric power grid 4266 via transformer 4265.

While the above described embodiments allow for the generation of additional power through diversion of a portion of the HE generator output, in alternative embodiments storage devices can be used to store a portion of the surplus power generated as a result of the gains in efficiency.

Figure 34:
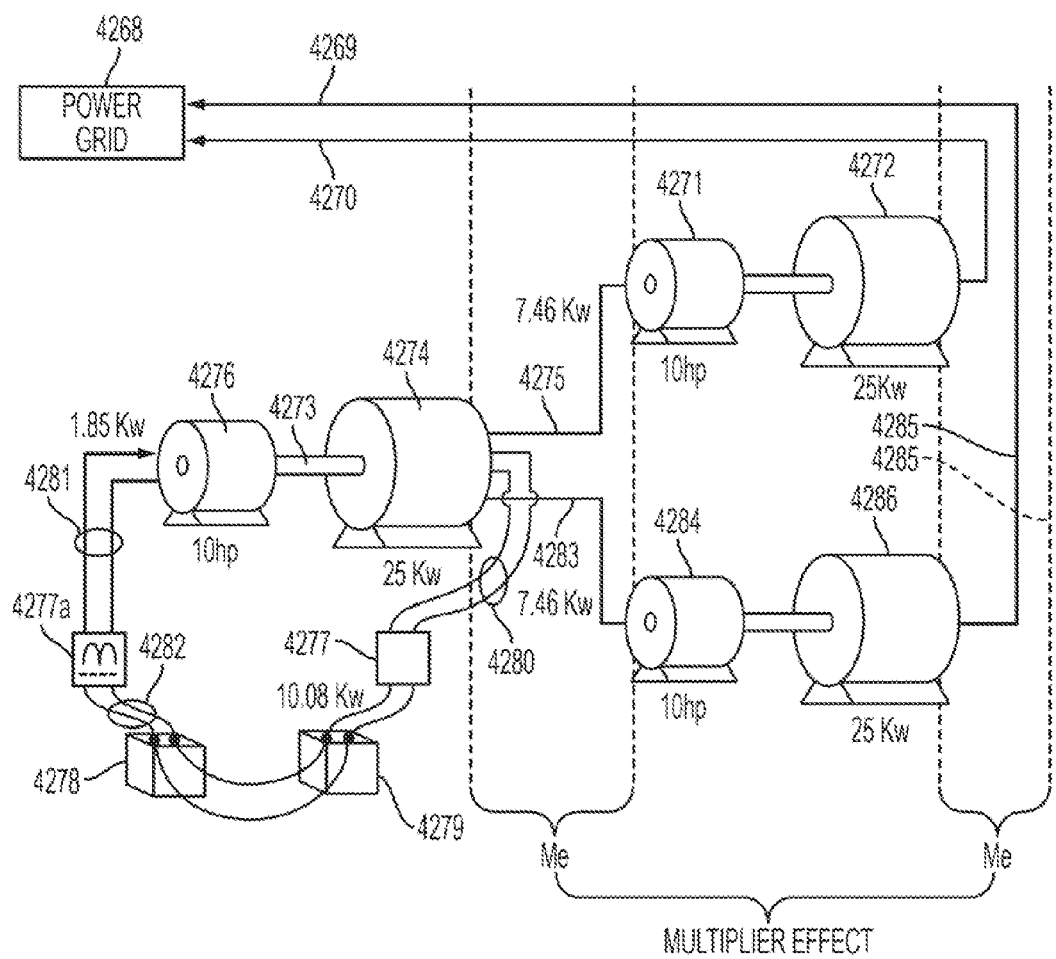
FIG. 34 is a diagram illustrating a high efficiency electric generator, a standard efficiency electric driving motor, and a bank of energy storage devices in one or more embodiments.

FIG. 34 illustrates the exemplary interaction of a HE electric generator, such as HE generator 4274, with a standard efficiency, electric driving motor such as motor 4276, through a bank of batteries, capacitors, electrical energy storage devices or the like such as storage devices 4278 and 4279. In the present example electric motor 4276 can be a 10 hp 3 phase standard induction motor driving a 25 kW HE generator 4274 through shaft 4273. HE generator 4274 supplies 10.08 kW through electrical conduit 80 to a full wave bridge rectifier 4277. The direct current energy output from the full wave rectifier is then stored in storage devices 4278 and 4279, which output stored power, or a combination of stored power and converted power, depending on demand level, through electrical conduit 4282 to a variable frequency drive 4277a which can convert the stored DC power to a square wave DC which is recognized as AC as it drives a 10 hp 3 phase motor 4276 through electrical conduit 4281. HE generator 4274 outputs about 7.46 kW of power to 10 hp motors 4271 and 4284 through electrical conduit 4275 and 4283 respectively. Two 10 hp motors 4271 and 4284 drive HE generators 4272 and 4286 which each put out 25 kW through electrical conduit 4270 and 4285 respectively to the electric power grid or for use at the point of generation constituting a stage of gain due to the multiplier effect Me.

Figure 35:
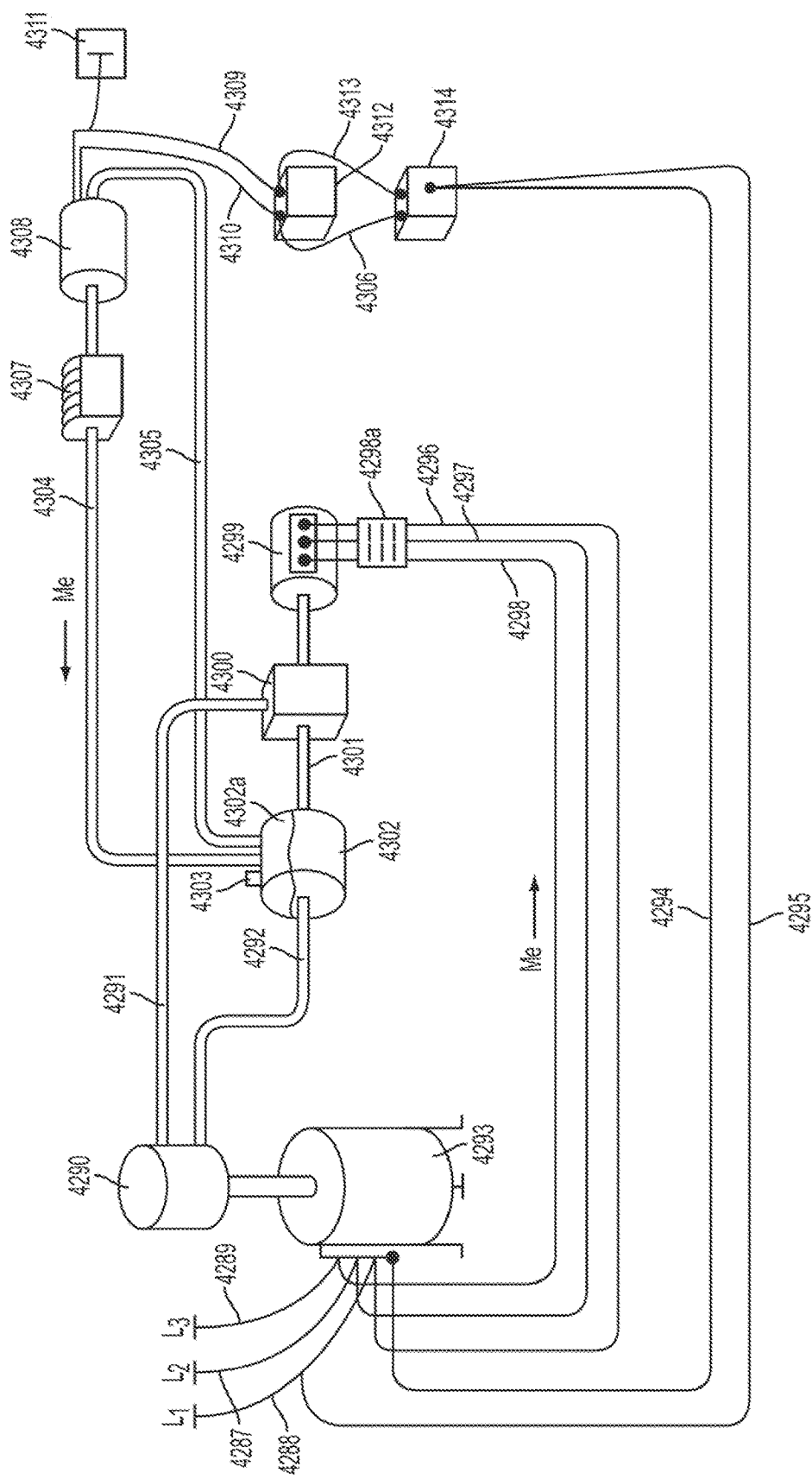
FIG. 35 is a diagram illustrating a high efficiency electric generator, a standard efficiency electric driving motor, and a hydraulic system with a nitrogen accumulator as a short term stored energy supply in one or more embodiments.

FIG. 35 is a diagram illustrating a HE generator, a standard efficiency electric driving motor, and a hydraulic system with a nitrogen accumulator as a short term storage energy supply. FIG. 35 illustrates an exemplary interface between a HE electric generator such as HE generator 4293, a standard efficiency electric drive motor, a hydraulic system and a nitrogen accumulator which serves as a short term storage energy supply. HE generator 4293, which is a 3 phase 150 kW electric generator, can output 100 kW of power through phase legs 4287, 4288, and 4289 to a load point or can be fed to the electric power grid. The remaining power can be fed back and used both in variable frequency drive 4298a and rectifier 4314 to facilitate generation as will be described in greater detail hereinafter constituting stages of gain due to the multiplier effect (Me).

It will be noted that generator 4293 is driven by hydraulic motor 4290 that receives hydraulic power, in the form of pressurized hydraulic fluid supplied through hydraulic conduit 4292 from, for example, a hydraulic storage and pressure tank 4302 which contains a nitrogen accumulator 4302a. The nitrogen accumulator is pressurized by pressure pump 4309 which is driven by DC motor 4308 to supply pressurized nitrogen gas to pressure tank 4302 through gas conduit 4304. In response to sensed pressure levels in the nitrogen accumulator 4302a, DC power lines 4309 and 4310 of a motor power supply circuit can be opened and closed by nitrogen accumulator 4302a pressure switch 4303 through electric conduit 4305. DC motor 4308 is powered from battery 4312, for example, when the power lines 4309 and 4310 are switched on. Battery 4312 can be charged via leads 4306 and 4313 from full wave bridge rectifier 4314 which is powered from phase leg L1 through electrical conduit 4295 and neutral 4294. Hydraulic pressure tank 4302 can be charged by pressurized hydraulic fluid entering through the hydraulic conduit 4301 and pressurized by mechanical pressure pump 4300, which receives return hydraulic fluid from hydraulic motor 4290 through hydraulic conduit 4291. Mechanical pressure pump 4300 can be driven by variable speed electric motor 4299, which is powered through variable frequency drive 4298a with 20 kW of the 3 phase power conducted from HE generator 4293 through 3 phase electrical conduits 4296, 4297 and 4298.

Figure 36:
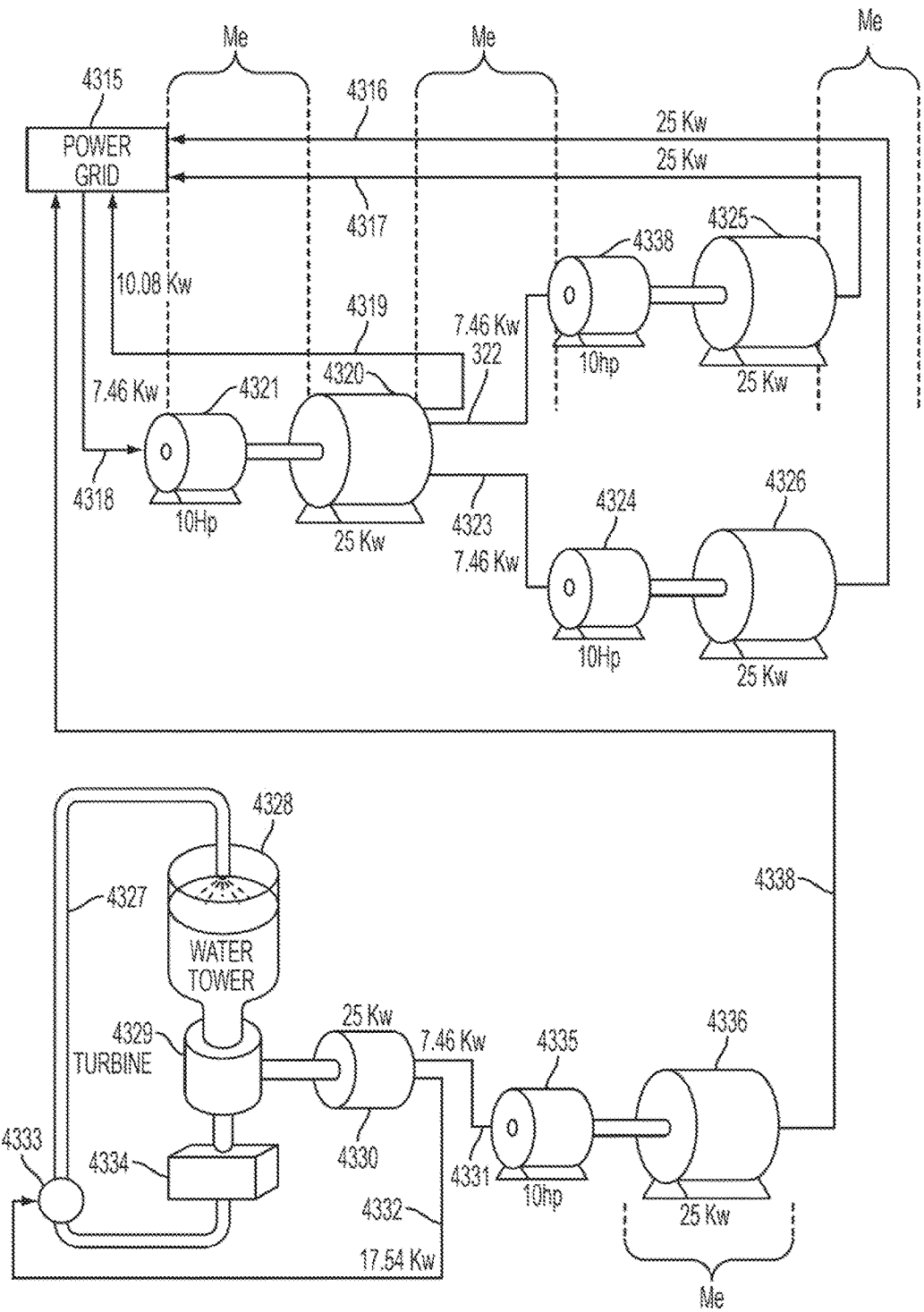
FIG. 36 is a diagram illustrating a high efficiency electric generator, a standard efficiency electric driving motor, and a hydro storage system utilizing a water pump, a water storage reservoir and gravity flow through a generator turbine system in one or more embodiments.

FIG. 36 is a diagram illustrating a HE electric generator, a standard efficiency electric driving motor, and a hydro storage system utilizing a motor pump, water storage reservoir and gravity flow through a generator turbine system. Water tower storage tank 4328 can provide water to turbine 4329 that flows, for example, under gravitational pressure. Turbine 4329 can drive a 25 kW HE generator 4330 which feeds 17.54 kW of 3 phase power back to water pump 4333 for pumping waste water that has passed through turbine 4329, from receiving reservoir 4334 back to the water tower reservoir 4328 through water conduit 4327. HE generator 4330 can also send the remainder of its output power, or 7.46 kW of electric power to 10 hp motor 4335 through electrical conduit 4331. Electric motor 4335 drives generator 4336, which generates 25 kW of electric power to the power grid 4315 through electrical conduit 4337 constituting a stage of gain due to the multiplier effect (Me). It will be appreciated that by supplying an illustrative 25 kW to the power grid 4315, at a cost of 7.46 kW, the hydro power configuration can perpetuate additional self sustaining electric systems due to the combined multiplier effects (Me) associated with various efficiency gain stages. For example, considering the 25 kW input to power grid 4315 from HE generator 4336, electric 10 hp motor 4321 takes 7.46 kW of power from the power grid 4315 through electrical conduit 4318 to power a 25 kW HE generator 4320 constituting a gain stage. A resulting output of 10.08 kW of power is supplied back to the power grid 4315 through electrical conduit 4319. HE generator 4320 also supplies 7.46 kW of electric power to electric motor 4324 and 7.46 kW of electric power to electric motor 4338 respectively, through electrical conduits 4322 and 4323. Electric motors 4324 and 4338 are configured to drive 25 kW HE generator 4325 and 25 kW HE generator 4324 constituting additional gain stages. The power output of HE generators 4325 and 4326 is transmitted to the power grid 4315 through electrical conduits 4316 and 4317.

Figure 37:
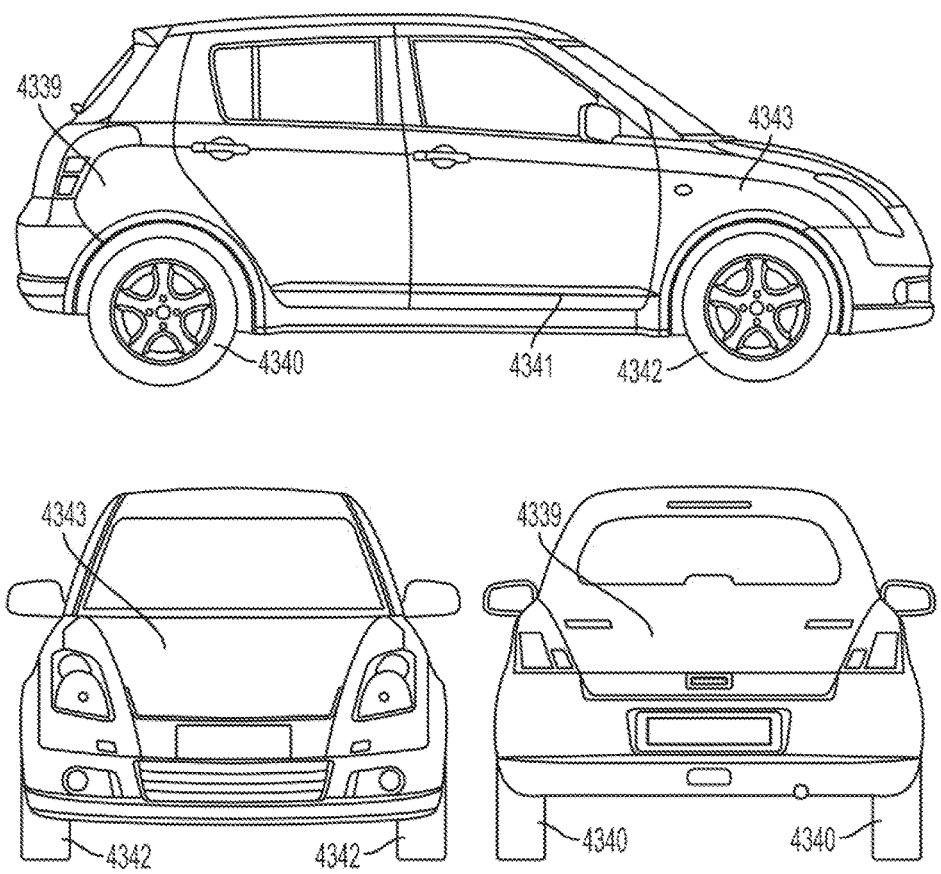
FIG. 37 is a diagram illustrating an automobile using a high efficiency generator as a motive source in one or more embodiments.

FIG. 37 is a diagram illustrating an automobile which utilizes the HE (high efficiency) generator. The HE generator in various embodiments may be used in an automobile to provide the motive force as one application but not limited to only that application. The HE generator may be placed underneath the hood or bonnet 4343 and reserve the trunk or boot 4339 for objects of transport. The HE generator may alternatively be placed in the trunk or boot 4339 and reserve the area underneath the hood or bonnet 4343 for objects of transport. The HE electric power generator could move the vehicle via traction motors in the drive train or directly in the wheel 4340 and 4342.

Figure 38:
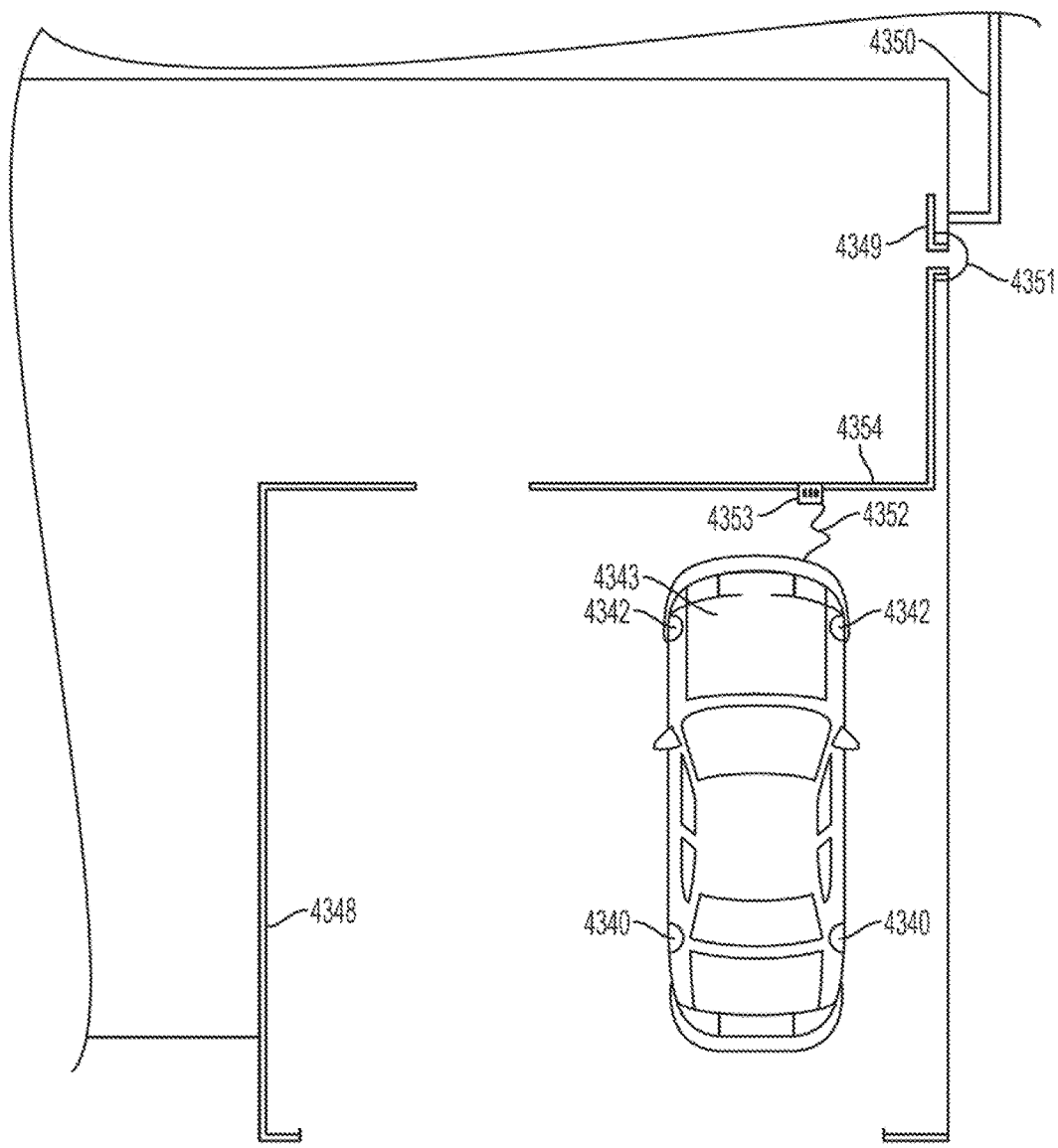
FIG. 38 is a diagram illustrating an automobile using a high efficiency generator both as a motive source and as a power source in one or more embodiments.

FIG. 38 is an illustration of an automobile which in this application utilizes the HE generator both as a motive source and to power a home, office and/or power grid from a plug-in device in the garage, commercial garage, street parking, parking lot and the like. The automobile utilizing the HE generator which is housed underneath the hood 4343 of the automobile with traction motors in the wheels 4349 and 4342 which provides the motive force. The automobile of FIG. 38 is parked inside a garage, carport or the like 4348. The automobile is in the non-motive mode with the HE generator in the power output mode for either single phase or 3 phase to be compatible with the desired application. Power conduit cable 4352 is plugged into receptacle 4353. Conduit 4354 carries power to the power meter 4351 input to the house, where power is fed to the house, office and the like through conduit 4349 and to the electric power grid through conduit 4350.

Figure 39:
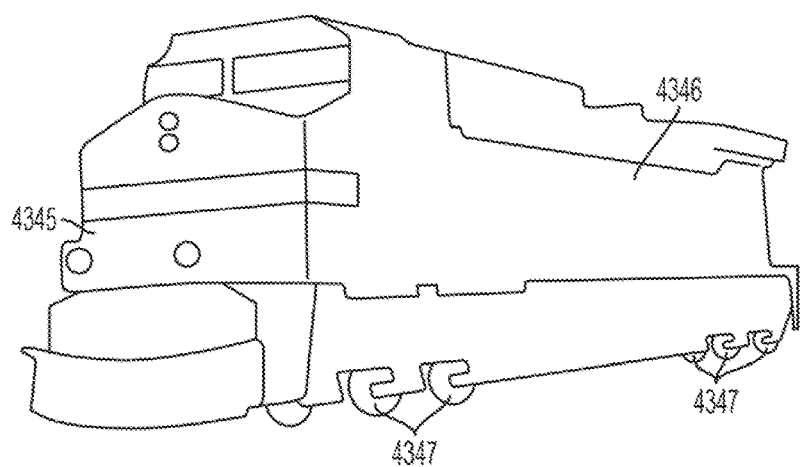
FIG. 39 is a diagram illustrating a train engine using a high efficiency generator in one or more embodiments.

FIG. 39 is a diagram illustrating a train engine device which utilizes the HE generator for locomotion and other power needs of the train. Since trains in current use operate by using diesel power to power electric generators and the trains are moved by electric traction motors 4347, the conversion only requires installation of the generator in the areas currently occupied by diesel engines and diesel fuel storage tanks, such as, but not limited to, areas in the engine of FIG. 39 designated as 4345 and 4346.

Figure 40:
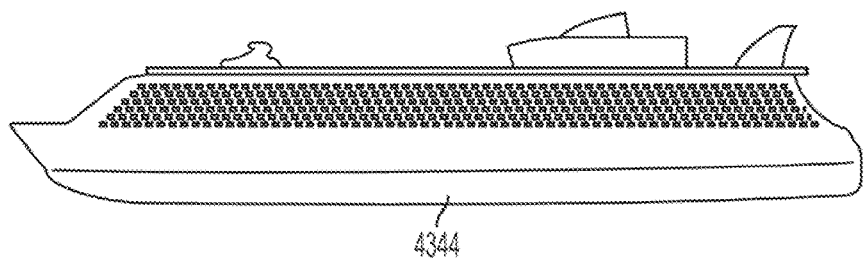
FIG. 40 is a diagram illustrating a water craft using a high efficiency generator in one or more embodiments.

FIG. 40 is a diagram illustrating a water craft which utilizes the HE generator. The craft shown in FIG. 40 is by example only and not limiting. The application is applicable to boats of all sizes, and modes of operations such as small craft, ships, submarines and the like. The boat of FIG. 40 is operated on electric power generated by diesel engines which power electric generators. The HE generator would replace the diesel powered generators in area 4344 by way of example but not limited to this area.

Figure 41:
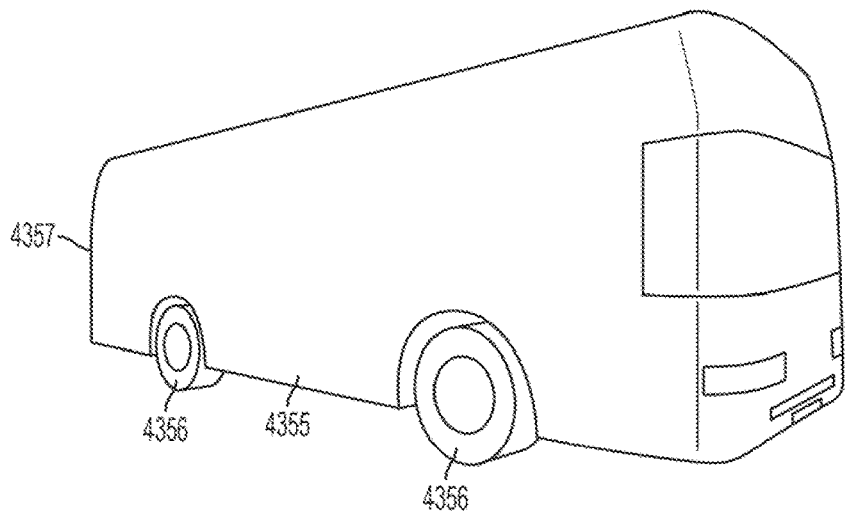
FIG. 41 is a diagram illustrating a bus using a high efficiency generator in one or more embodiments.

FIG. 41 is a diagram illustrating a bus or similar vehicle which utilizes the HE generator. The HE generator is placed in area 4357 or 4355. The electric power provides locomotion via electric traction motors in the wheels 4356 or elsewhere in the power train. Power is also provided for other needs of the bus.

Figure 42:
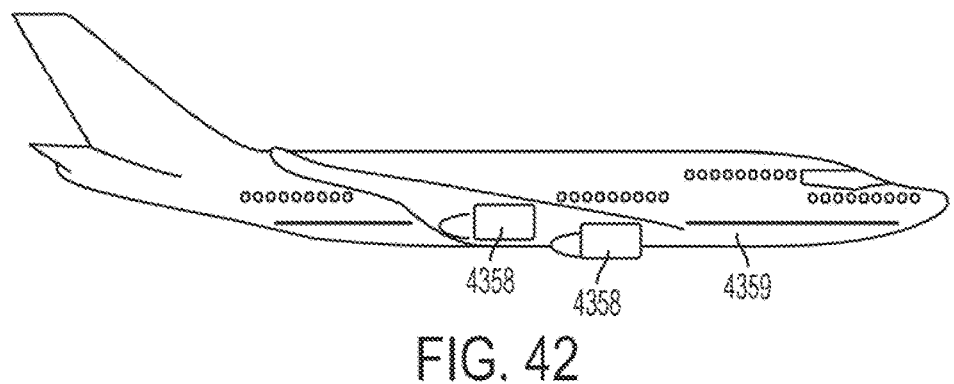
FIG. 42 is a diagram illustrating an aircraft using a high efficiency generator in one or more embodiments.

FIG. 42 is a diagram illustrating an aircraft or similar flying machine or like vehicle which utilizes the HE generator. The HE generator is placed in an area 4359, for example, but not limited to this area. The power generated may be used to power electric propellers or to compress ambient air which is fed into the electric hot sections of a jet flying craft to provide thrust. The compressed air may be augmented by water which is fed into the "hot sections" where both the compressed air and water expands under the intense heat of the hot sections thereby providing thrust.

Figure 43:
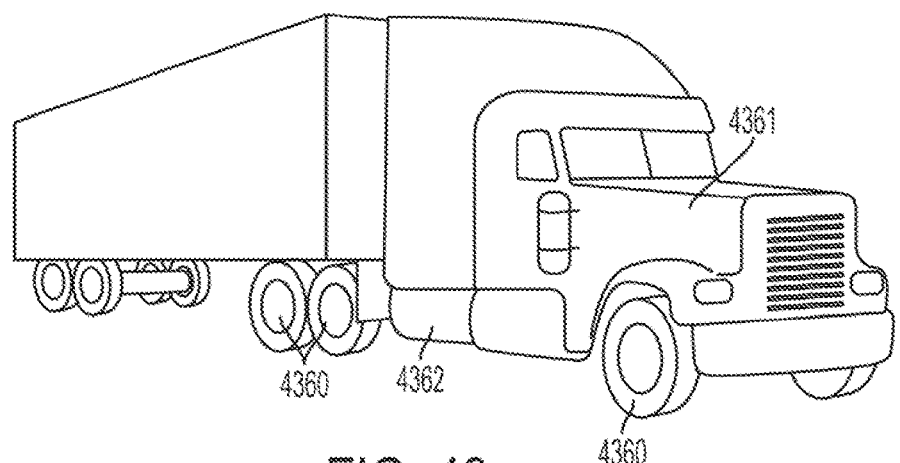
FIG. 43 is a diagram illustrating a transport truck using a high efficiency generator in one or more embodiments.

FIG. 43 is a diagram illustrating a transport truck or similar vehicle which utilizes the HE generator to provide locomotion and other power needs. The HE generator may be, by example, placed underneath the hood 4361, the area currently occupied by diesel or other internal combustion engines. This locomotion is by example and not limiting. The vehicle is powered by traction motors in the wheels or elsewhere on the drive train 4362 by example. The remaining power needs of the vehicle are also supplied.

While embodiments have been described and illustrated, it will be understood by those skilled in the art and technology concerned that many variations or modifications in details of design or construction may be made without departing from the present invention. For example, while high efficiency motors are described herein as powering standard efficiency electric generators, in an alternative embodiment, a high efficiency electric generator can be driven with a standard efficiency electric motor and thereby produce net increases in electric power output to the efficiency gains of the high efficiency configuration. If a high efficiency electric motor drives a high efficiency electric generator, even greater gains may be realized. Further, while standard motors are described herein as powering HE generators, in an alternative embodiment, a standard efficiency electric generator can be driven with a HE electric motor and thereby produce net increases in electric power output to the efficiency gains of the HE configuration.

It is apparent to anyone schooled in the art that the technology described herein has numerous applications in addition to the power generation applications just described.

In accordance with various exemplary embodiments discussed and described herein, rotor reaction force i.e. electromagnetic drag may be reduced and eliminated in an embodiment whereby a series of rotatable, bipolar, quadrapolar or unipolar electromagnetic s, electrical armatures, rotors, and the like, can be diagnosed or otherwise inserted on their axis into recesses in a stator in which recesses may be completely surrounded by slots containing laminated electrical steel which is wound with coils of magnet wire or the like. The preferred embodiment provides recesses in a stator in which the rotors may be inserted which are geometrically isolated from the center of the magnetic poles which form in the stator as the stator coils are connected to an electrical load, as an increasing current flows through the stator coils. This geometric escalation reduces the interaction between the rotor and rotor magnetic field and in combination with unique winding patterns along with mu metal shielding greatly reduces or eliminates the motor reaction force or electromagnetic drag. The maximum induction flux density in the stator iron is obtained in accordance with an embodiment whereby the wire slots on an inner stator circumference and on an outer stator circumference are each provided with slot rotors forming an exemplary dual slot rotor pair. Also dual stator configuration is provided such that the stator side iron and back iron are exposed to both rotors to allow the desired magnetic coupling between the rotor iron and the stator iron to generate the desired magnetic movement across the conductors in the wire slots.

The following detailed description provides an understanding of embodiments as illustrated and described herein below. The high efficiency generator is provided that shields, cancels or separates the drag creating magnetic forces between the rotors and stator, from one another so that upwards of 80% of the driving energy which conventionally is consumed and/or dissipated by electromagnetic drag is converted to electric power.

In accordance with embodiments as will be described in greater detail, in connection with the illustrations below, the classic rotor armature and stator have been replaced by a laminated electrical steel dual stator having a stator section with an outer circumference and stator sections with an inner circumference. Each stator section has slotted rotor cavities as in one example the rotor cavities are geometrically spaced in a corner of a square or rectangle or the like and are magnetically coupled to the stator iron. The stator iron of the rotor cavities may contain for example 18 wire slots which may be wound such that when an electric load is applied to the generator, lap coils in each slot section carry current in opposite directions, thereby canceling any destructive stator load poling.

Each slot rotor armature can be energized and the individual rotor assembly can be rotated to provide alternating fields of north and south pole magnetic flux field energy into the open wire slots and side iron in the stator and this flux field will magnetically couple with the side iron and back iron of the stator. The magnetic poles are activated with DC current via a slip ring/brass and solid state or mechanical commentator apparatus or other appropriate mechanism such that the magnetic poles are activated either continually or in pulsed fashion. In other operational modes, the rotor can be excited all north pole and/or all south pole to generate DC current.

In an exemplary bipolar stator cavity rotor, one of the two pole sections is north pole charged and the opposite section is south pole charged. In one embodiment, the north pole section can be 180° and the south pole can be constituted by an opposite 180° section. In another embodiment, the rotor is unipolar i.e. the entire rotor is north pole for half of the frequency cycle, thus the current flow is reversed via the excitation controller and the entire rotor becomes south pole i.e. north pole then south pole for 360°. Pole sections can be shielded with mu metal shielding behind the back iron. Each of the slot rotor arrangements are preferably contained in a longitudinal cylindrical cavity that is located in a close proximity to and extends lengthwise along the opening of the stator winding slots. The slot rotor mechanism, including mu metal back shielding can be contained within a laminated electrical slotted steel cylinder of the rotor. The steel cylinder is a partial cylinder so as to allow installation of the stator windings and is closed by use of a removable slotted laminated electrical steel stator section. The cylinder has an opening that corresponds and is in communication with the opening of the stator wire slots.

It would be appreciated that the slot rotors may be fashioned, for example, as wound electromagnetic armatures or permanent magnet armatures that are positioned as pairs of rotors around the circumference of a dual wound stator. Different numbers of slot rotor pairs can be used preferably in even numbers such as 4, 8, etc. slot rotor pairs, which is by way of example and different numbers of slot rotor pairs or numbers unpaired can be used. An individual slot rotor armature may be made by fashioning a series of laminated steel pole pieces upon a shaft in a manner similar to that of a conventional generator armature. Completed pole pieces may be wound in a conventional manner with insulated wire to suitable winding specifications for the operating demands of the generator. Power can be applied to the armatures via a control system.

To drive the shafts of the rotor mechanism, a central gear mechanism may be employed at one end of the individual slot rotor shafts over the inner and/or outer circumference of the stator. As the slot rotor pairs are rotated on both sides of the stator in a synchronized manner by the gear mechanism, power can be generated with greatly reduced drag as compared with a single, central rotating armature of a conventional generator.

In another preferred embodiment in the case of a unipolar (single north pole and followed by a single south pole for 360° of surface) rotor, the shafts of the rotor mechanism may be driven by employing a single 3-phase motor at one end of the individual slot rotor shafts over the inner surface and/or outer surface of the stator. The slot rotor motors are controlled by a single variable speed drive. As the slot rotor pairs are rotated on both sides of the stator in a synchronized manner, power can be generated with greatly reduced drag as compared with a single, central rotating armature of a conventional generator.

A stator in accordance with the embodiments discussed and described herein can contain wire slots around the periphery of the cavities on the inner circumference as well as the outer circumference. It should be noted however that, by use of the terms "inner" and "outer", illustrative reference is made to a circular shape stator embodiment. It will be appreciated and should be emphasized that the dual stator need not be circular and can be linear or planar, or can be of a semi-circular or other functional shape and have dual stator sections but not confined to dual stator sections with the same effect of the embodiment specifically illustrated and described herein. In such an embodiment where the stator is not circular, the terms "inner circumference" and "outer circumference" can be replaced by terms such as "first outer periphery" and "second outer periphery". Further, since an exemplary stator in various embodiments is described herein as a dual stator arrangement, the first outer periphery and second outer periphery can include the stator surface containing the slot rotors. The respective inner peripheries of the stator sections can be adjacent to and can face each other either directly or with an intervening member such as a segment of side iron and back iron or the like.

Figure 44:
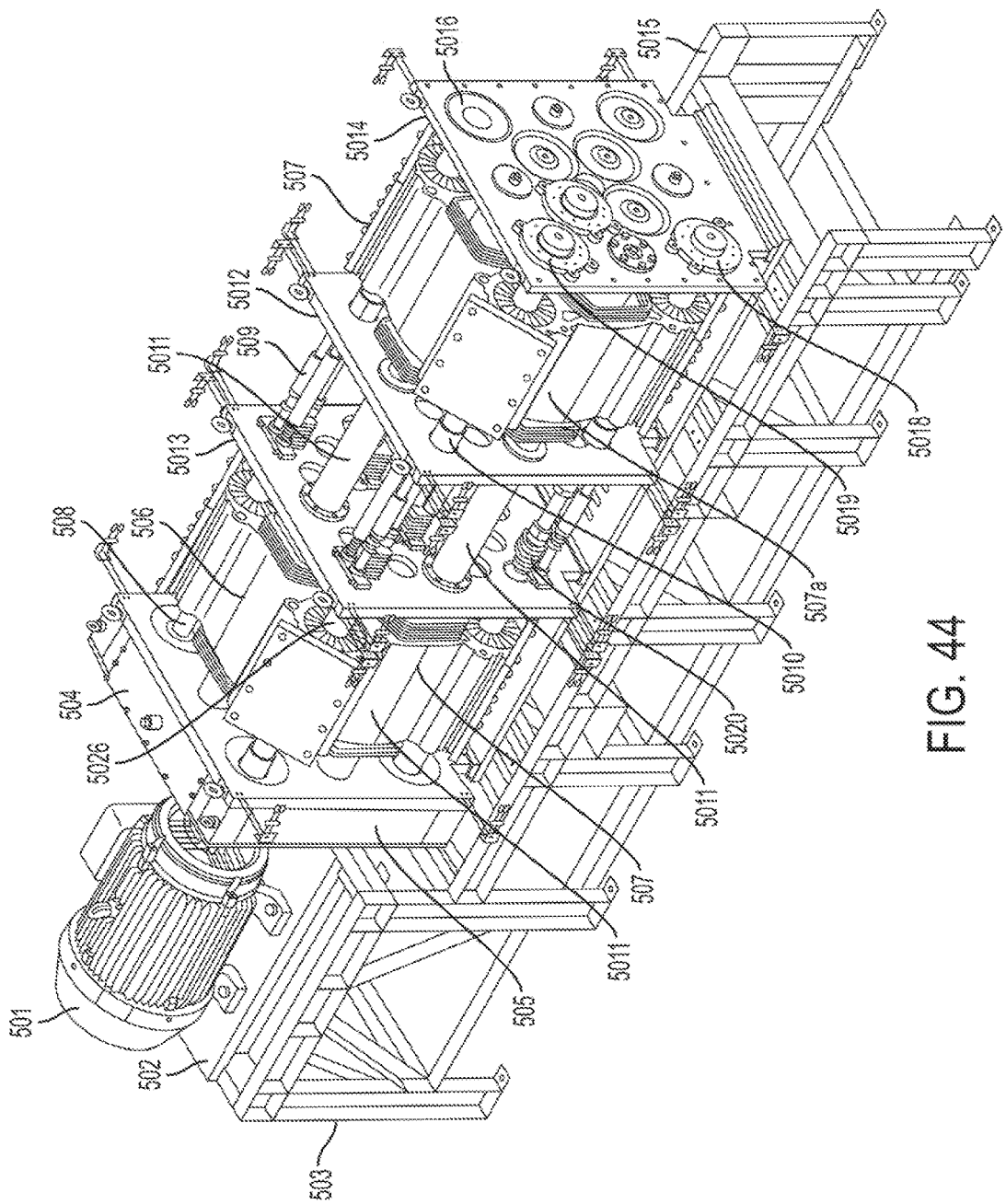
FIG. 44 is a diagram illustrating a superior oblique projection of an exemplary arrangement in one or more embodiments.

With reference to the figures, FIG. 44 shows a superior oblique projection of one embodiment. Driver motor 5001 is configured to be placed on support plate 5002 which is attached to frame 5003, driver rotor shafts 5008, through transmission 5004 to open rotors 5026 which transverse stator cavity 5021 which contains wire slots 5041, which contains stator windings. Stator 5007 and 5007a are held in place by support posts 5011 which contain torque bolts. The two stators are supported upon frame 5015. The rotor shafts in stator 5007 drive the rotor shafts in stator 5007a via a spline coupling 5009. End supports 5012, 5013, and 5014 along with transmission wall support the stators and rotors. The DC current to the rotors is transferred via brushes and slip rings 5020.

Figure 45:
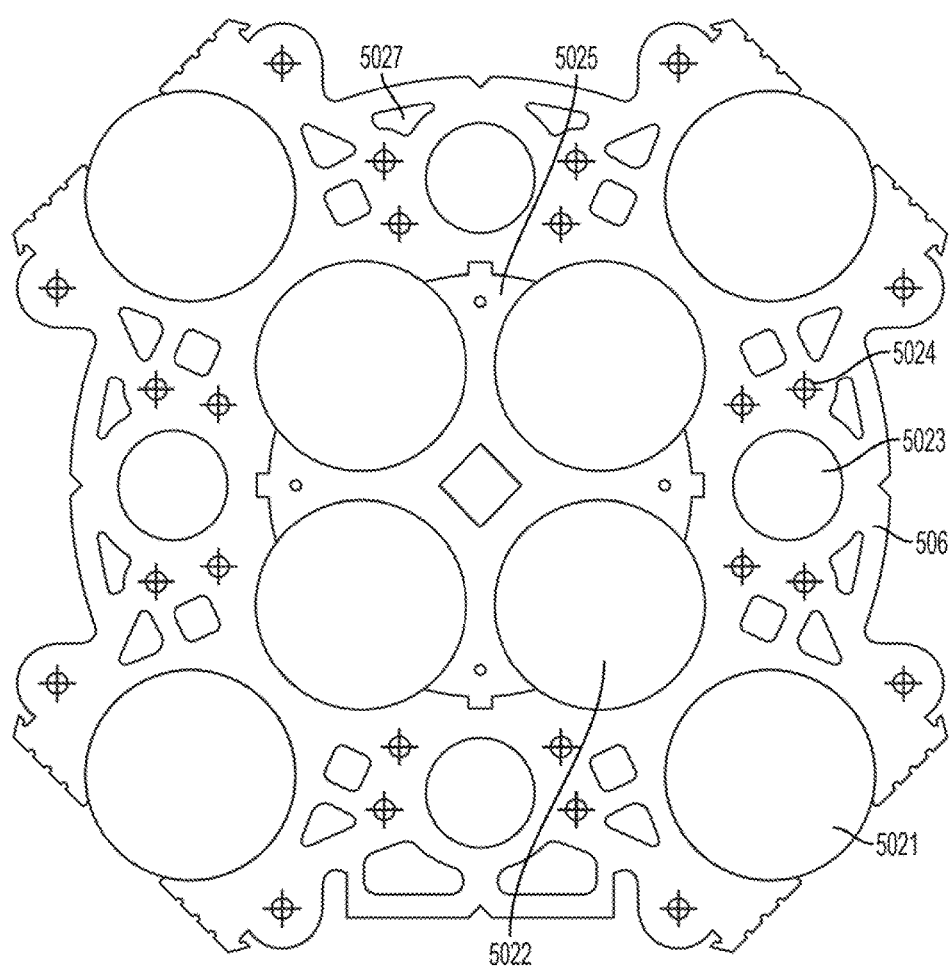
FIG. 45 is a diagram illustrating an exemplary laminate of a main stator section and middle stator section prior to formation of wire slots in one or more embodiments.
Figure 46:
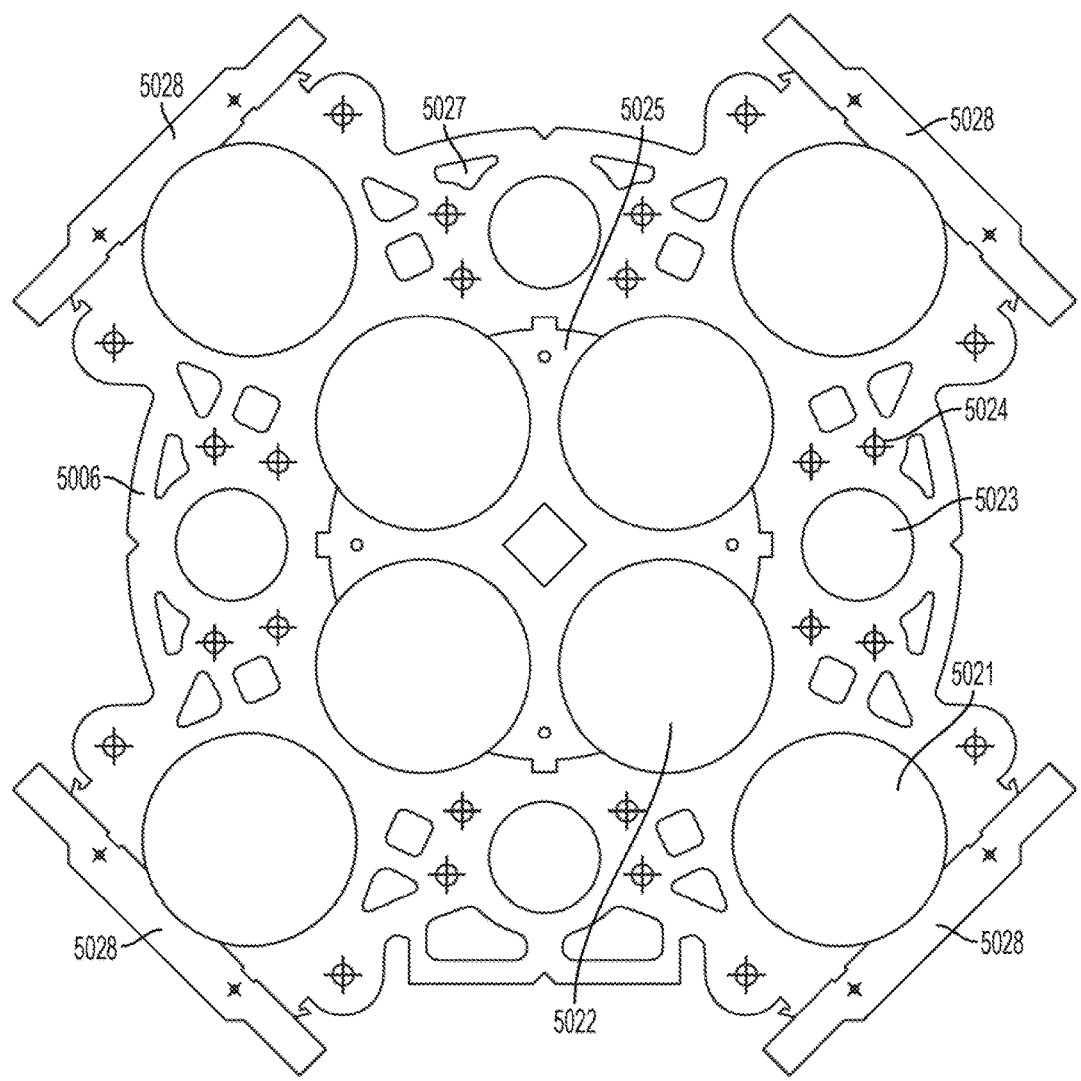
FIG. 46 is a diagram further illustrating an exemplary laminate of a main stator section, middle stator section and outer stator section prior to formation of wire slots in one or more embodiments.

With reference to FIG. 45 a cross-sectional view is presented of a stator laminate without stator inductor wire slots. The main stator laminate section 5006 is connected to the center section 5025. Rotor cavities are further shown including outer cavity 5021 and inner cavity 5022, and torque bolt hole 5024 in support post hole 5023. FIG. 46 illustrates the addition of outer laminated stator pieces 5028 which attach the main laminate 5006 and closes an outer cavity 5021.

Figure 47:
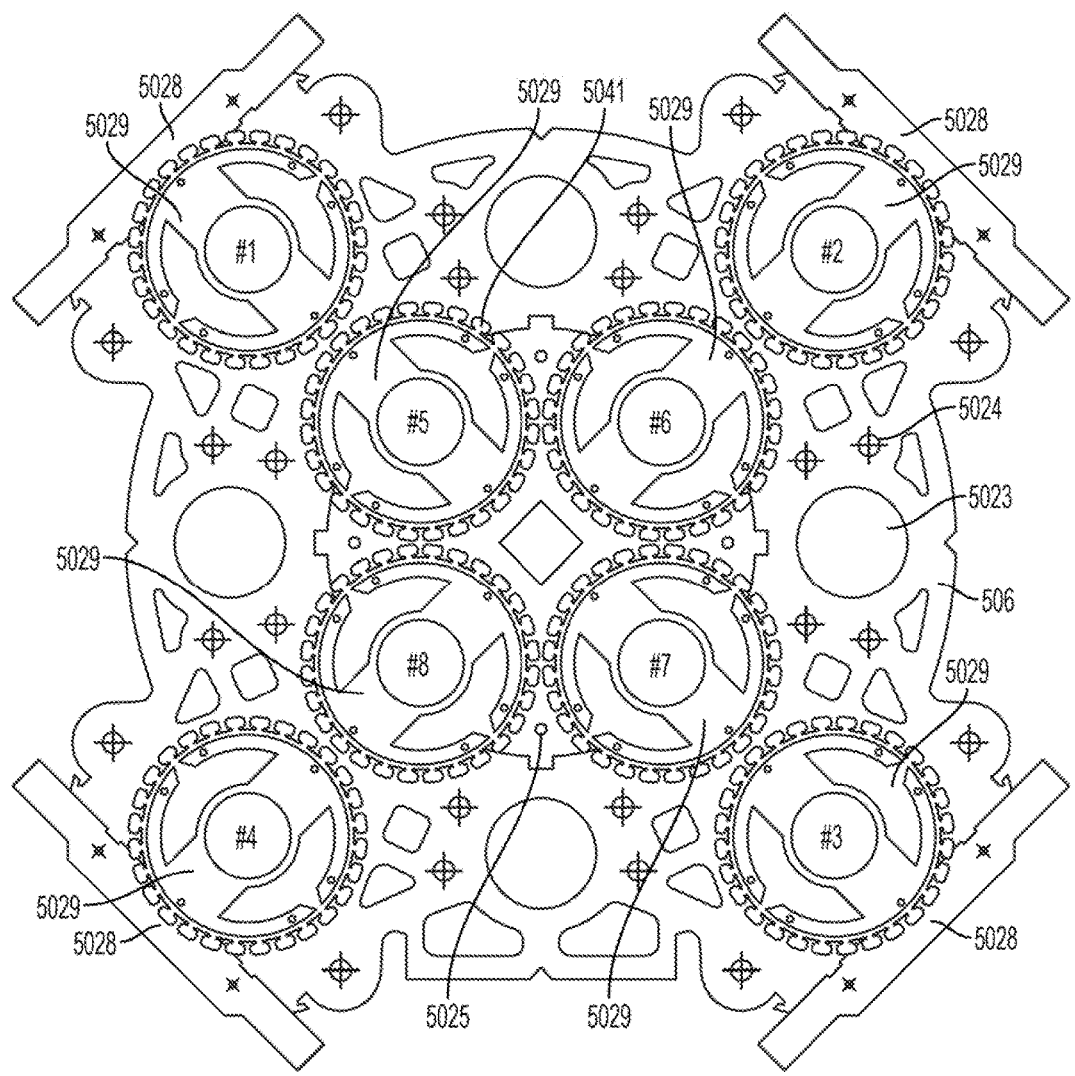
FIG. 47 is a diagram illustrating a cross-sectional view of a stator and rotors including an exemplary laminate of the main stator section, middle stator section and outer rotor cavity corners with skewed stator induction coil wire slots and dipole rotor laminates in one or more embodiments.

FIG. 47 is a diagram illustrating laminates of one embodiment. The illustrated laminate may be used for a single-phase 28 slot generator. Slotted outer laminate 5028 attaches to main laminate 5006, which attaches to a center slotted laminate 5025. Dipole rotor laminates 5028 are depicted in rotor cavities #1, #2, #3, #4, #5, #6, #7, and #8. The dipole rotor laminates 5028 are contemplated for single-phase AC operation.

Figure 48:
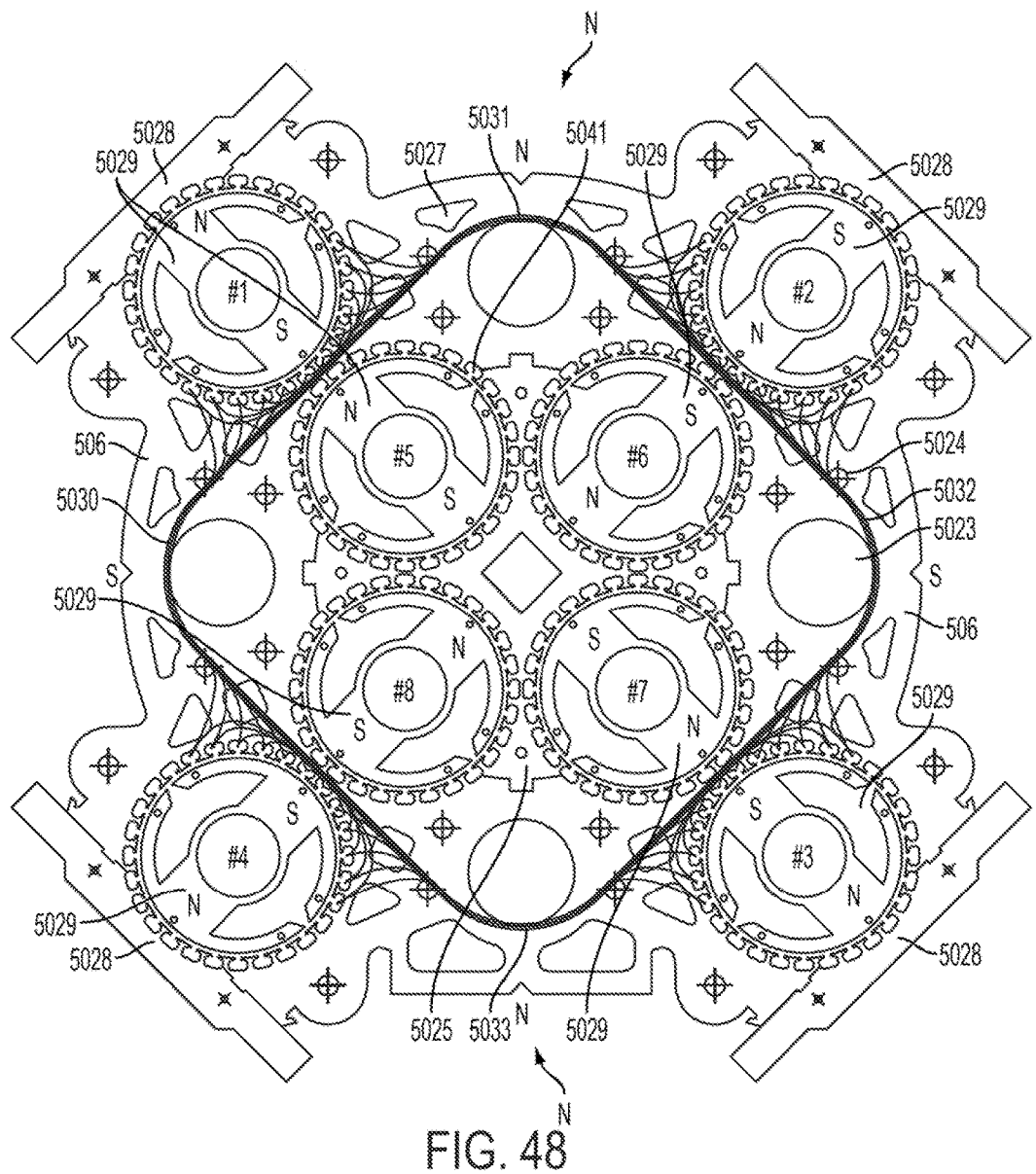
FIG. 48 is a diagram illustrating a cross-sectional view of a stator and rotors including an exemplary laminate of the main stator section, middle stator section and outer rotor cavity corners with skewed stator induction wire slots wired in the outer rotor cavities and dipole rotor laminates in an exemplary single-phase embodiment and other embodiments.

FIG. 48 is a diagram illustrating the cross-section of a generator constructed of laminates, for example, as shown in FIG. 44. The outer rotor cavities 5021 are wound with single-phase coils. The winding pattern in the present and other embodiments may be configured to cancel magnetic drag in the area of the induction slots by lapping north pole and south pole winding coils; e.g. coil 5031 is wound as a north pole, coil 5032 is wound as a south pole, coil 5033 is wound as a north pole, and coil 5030 is wound as a south pole. The above described arrangement places the center of the stator induction magnetic pole midway between the rotors in stator iron 6, e.g. in a position that is advantageously geometrically removed from the rotors.

Figure 49:
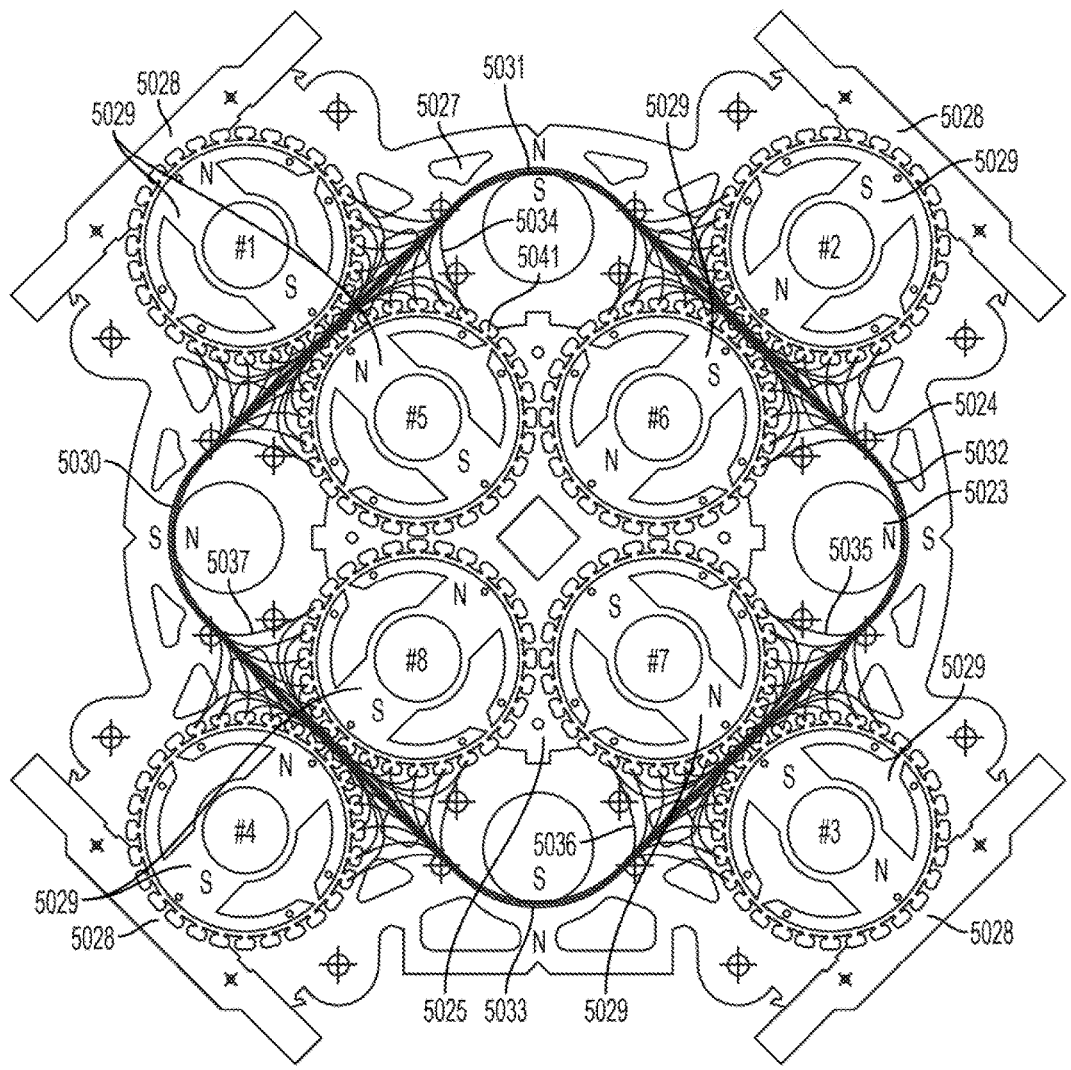
FIG. 49 is a diagram illustrating a cross-sectional view of a stator and rotors including an exemplary laminate of the main stator section, middle stator section and outer rotor cavity corners with skewed stator induction wire slots with magnet wire coils in the inner and outer rotor cavities and dipole rotor laminates in an exemplary single-phase alternating current (AC) embodiment and other embodiments.

FIG. 49 is a diagram illustrating the cross-section of a generator constructed of laminates as in FIG. 47 and FIG. 48. The outer rotor cavities 5021 are wound with single-phase coils. The winding pattern cancels magnetic drag forces in the area of the induction slots by lapping north pole and south pole winding coils. Coil 5031 is north pole wound, coil 5032 is south pole wound, coil 5033 is north pole wound and coil 5030 is south pole wound. The inner rotor cavities 5022 are wound with single-phase coils. The winding pattern cancels magnetic drag forces in the area of the induction slots by lapping north pole and south pole winding coils. Coil 5034 is south pole wound, coil 5035 is north pole wound, coil 5036 is south pole wound and coil 5037 is north pole wound, therefore the inner and outer coil winding patterns cancel the "effective" inductive poling in the stator. This pole cancellation and geometric isolation removes only effective load drag forces on this generator.

Figure 50:
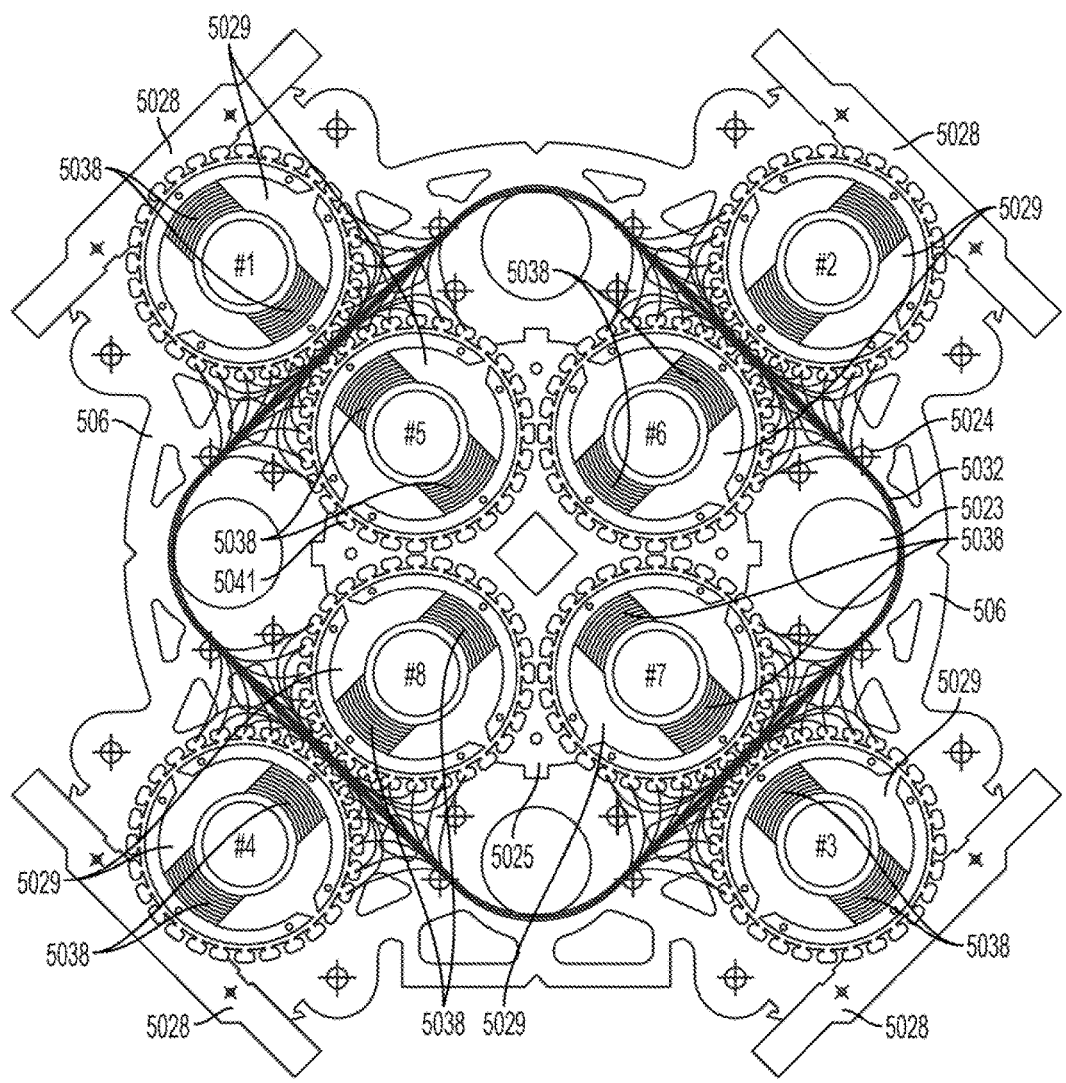
FIG. 50 is a diagram illustrating a cross-sectional view of a stator and rotors including an exemplary laminate of the main stator section, middle stator section and outer rotor cavity corners with skewed stator induction wire slots with magnet wire coils in the inner and outer rotor cavities, and dipole rotor laminates with dipole magnet wire windings in an exemplary single-phase AC embodiment and other embodiments.

FIG. 50 is a further depiction of the generator cross-section of FIG. 48 and FIG. 49, and depicts the rotor winding 5038 which is employed in the dipole rotor 5029.

Figure 51:
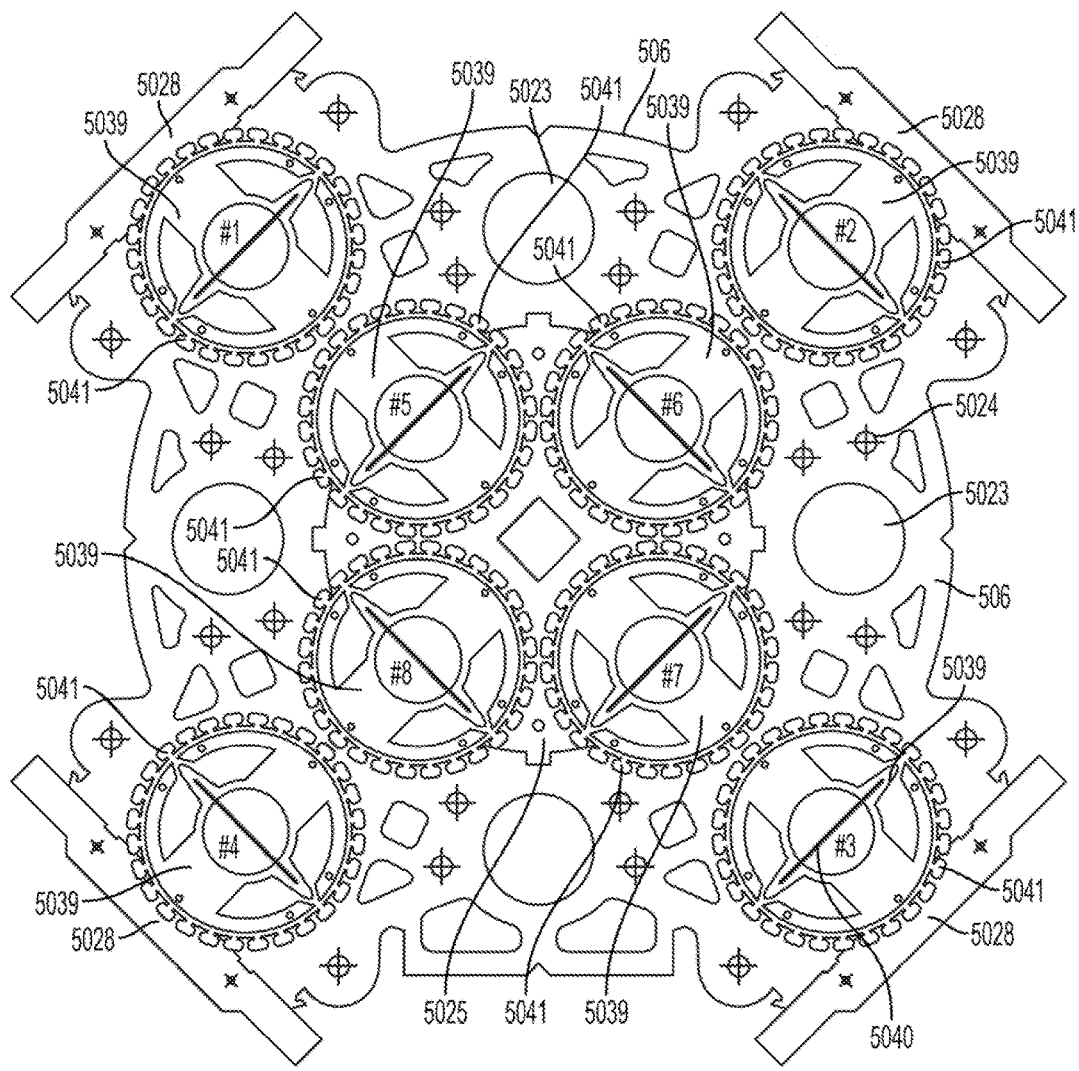
FIG. 51 is a diagram illustrating a cross-sectional view of a stator and rotors including an exemplary laminate of the main stator section, middle stator section and outer rotor cavity corners with skewed stator induction wire slots, and rotor laminates in one or more embodiments.

FIG. 51 is a further depiction of the generator cross-section of FIG. 48, FIG. 49 and FIG. 50, and depicts a different rotor laminate 5039. This rotor contains a slot 5040 for a mu metal shield that diverts the magnetic field from the rotor pole to close a flux circuit back to the pole face rather than penetrating through the shaft to the opposite pole to complete the magnetic circuit. The mid-shaft shielding provided by the mu-metal shield allows the use of a functional unipolar rotor having the same first pole or second pole, e.g. N or S pole, continuously throughout 360° of the rotor surface.

Figure 52:
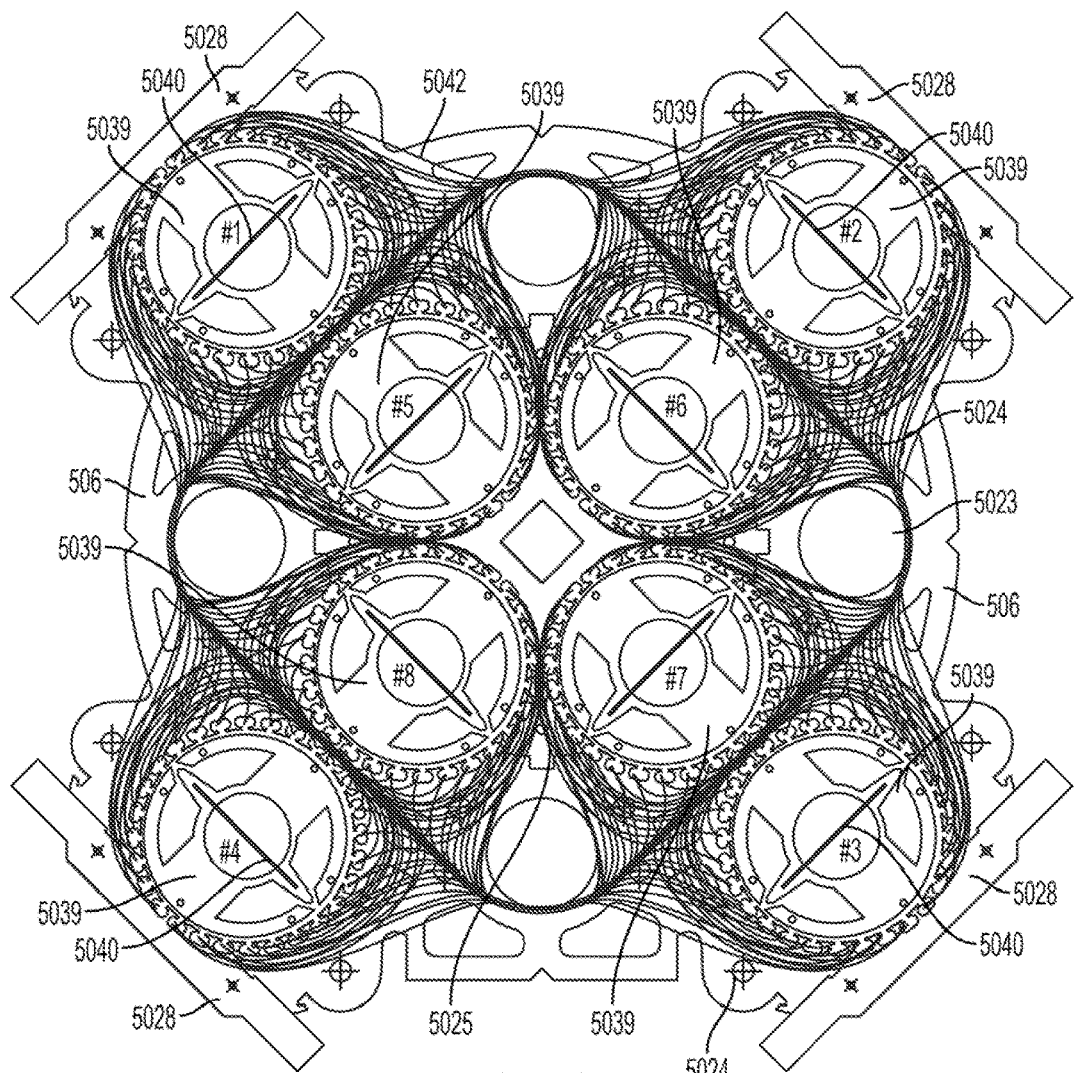
FIG. 52 is a diagram illustrating a cross-sectional view of a stator and rotors including an exemplary laminate of the main stator section, middle stator section and outer rotor cavity corners with skewed stator induction wire slots, rotor laminates with a center mu metal shield forming an operational rotor in one or more embodiments.

FIG. 52 is a further depiction of the generator stator and rotors of FIG. 51 in an exemplary single-phase arrangement, with a unipole rotor alternating first polarity and second polarity for AC power. The windings are also as in FIG. 50 wound in such a fashion to cancel load induction polarity in the stator which is a major factor in load drag forces.

Figure 53:
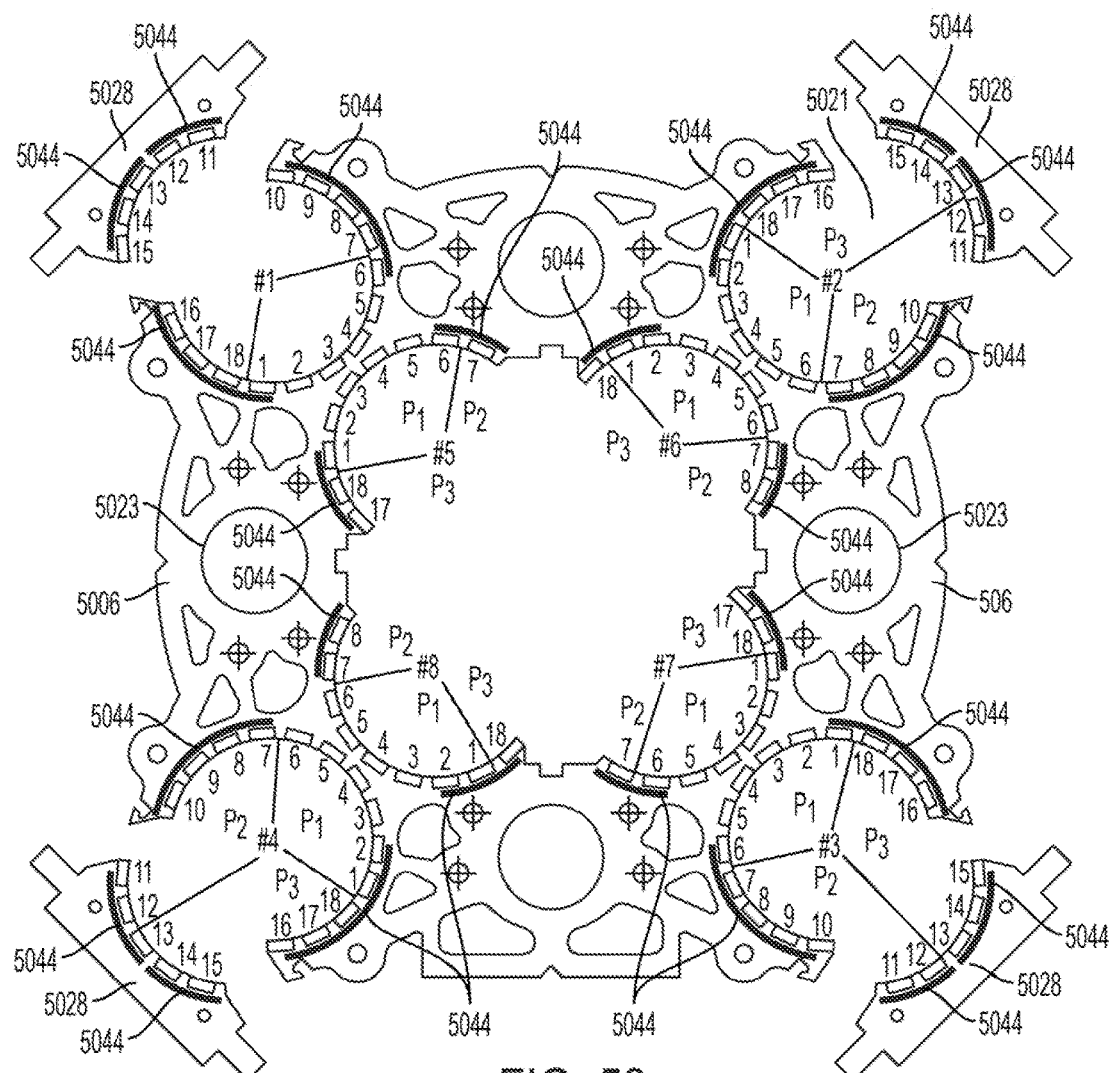
FIG. 53 is a diagram illustrating a cross-sectional view of a portion of a stator in one or more embodiments.
Figure 54:
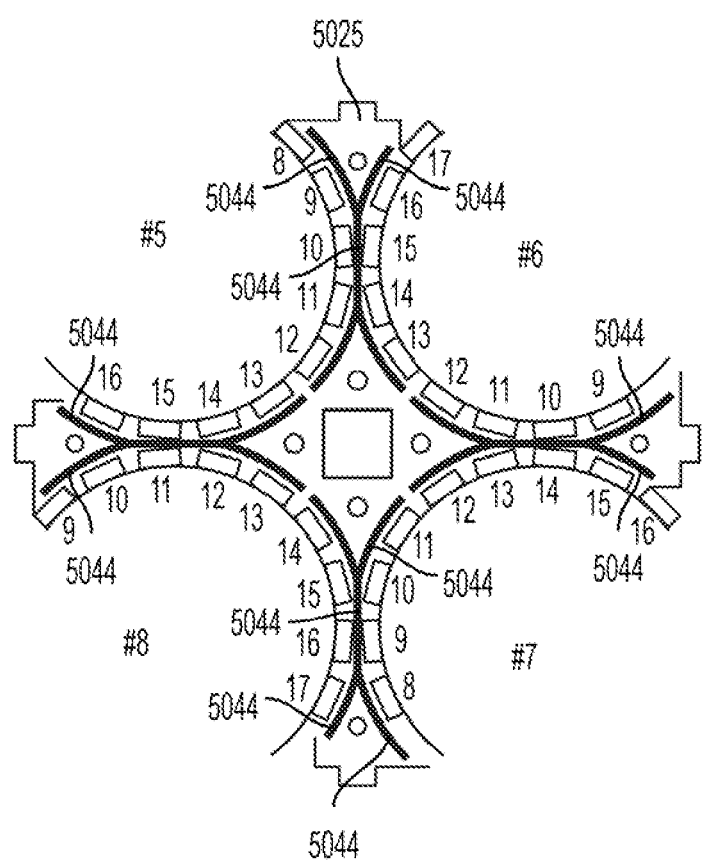
FIG. 54 is a diagram illustrating a cross-sectional view of a middle stator in one or more embodiments of FIG. 53.

FIG. 53 illustrates a cross-sectional view of one embodiment, which when utilized in the generator may be operated as the single-phase or 3-phase or as a DC generator. This embodiment contains 18 induction wire slots per stator rotor cavity. Mu metal shielding 5044 is advantageously placed behind the back iron. The stator induction coils must be in the cavity prior to placement of the previously described outer sections 5028 and center section 5025 as illustrated in FIG. 54. After the sections are attached together, the coils are placed in insulated slots.

FIG. 54 illustrates the stator center section 5025 with induction wire slots 5041 and mu metal shields 5044.

Figure 55:
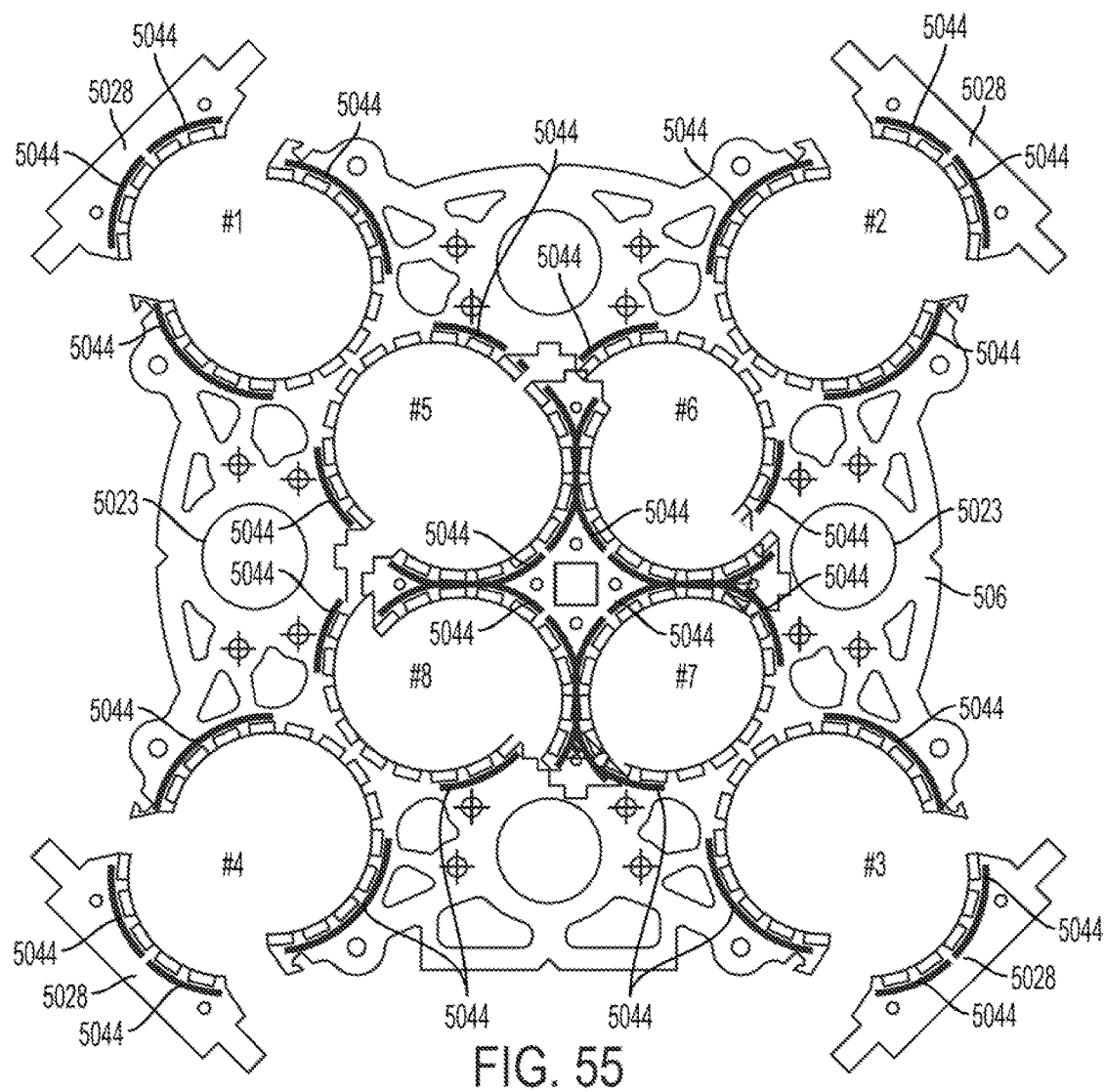
FIG. 55 is a diagram illustrating a cross-sectional view of a pre-assembly of stator components in one or more embodiments.

FIG. 55 illustrates the three stator laminate sections 5006, 5025 and 5044. The sections are separated prior to placing the stator induction coils into the rotor cavities. Once the coils are in place, section 5044 is attached to section 5006. Section 5025 is then attached to section 5006. The coils may then be placed in the insulated slots.

Figure 56:
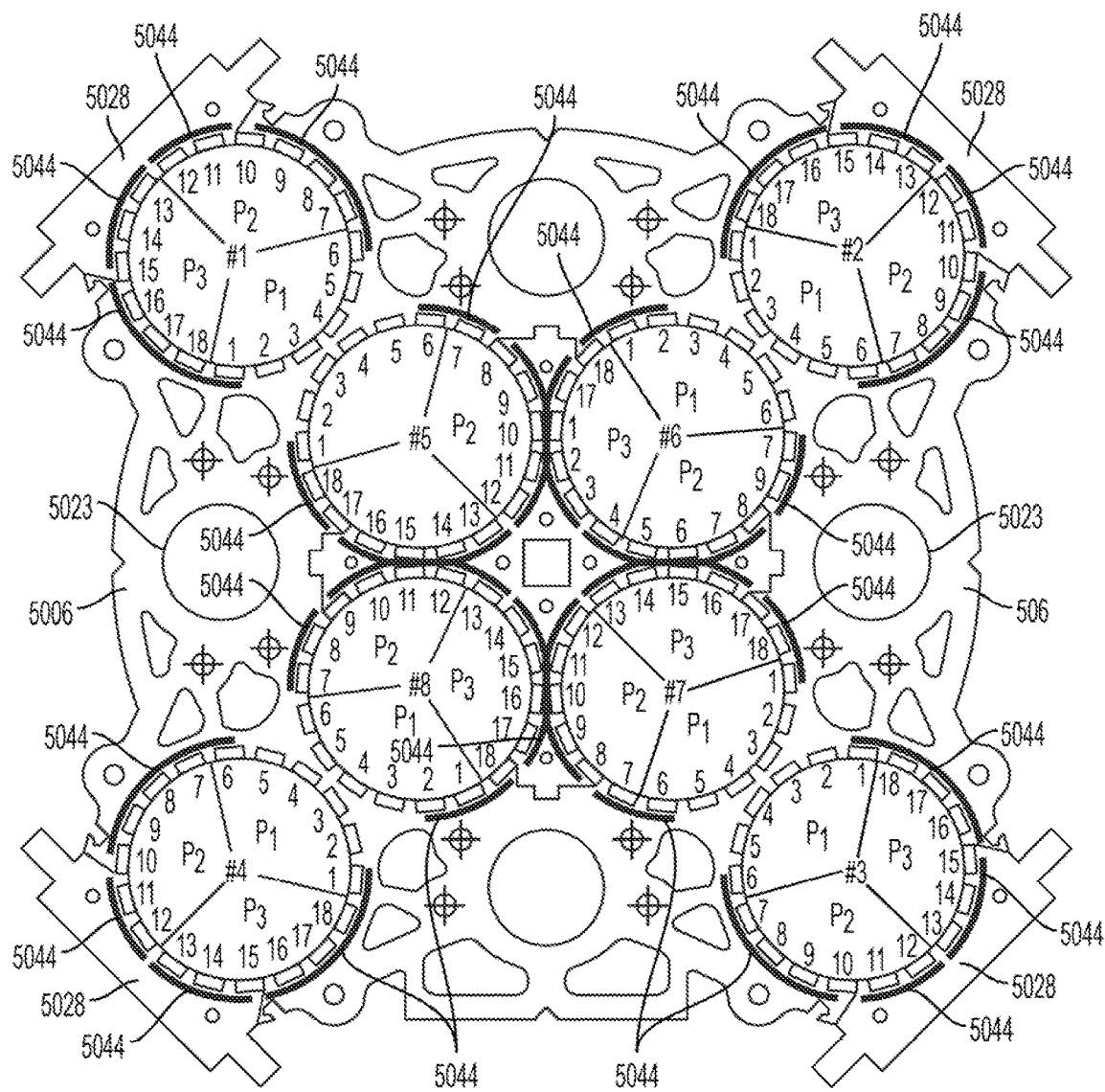
FIG. 56 is a diagram illustrating a cross-sectional view of an assembled stator laminate in one or more embodiments.

FIG. 56 is a view of stator of FIG. 55 with the stator sections assembled but without the induction windings having been placed in the slots. Mu metal shields 5044 dispersed in vital locations behind the back iron.

Figure 57:
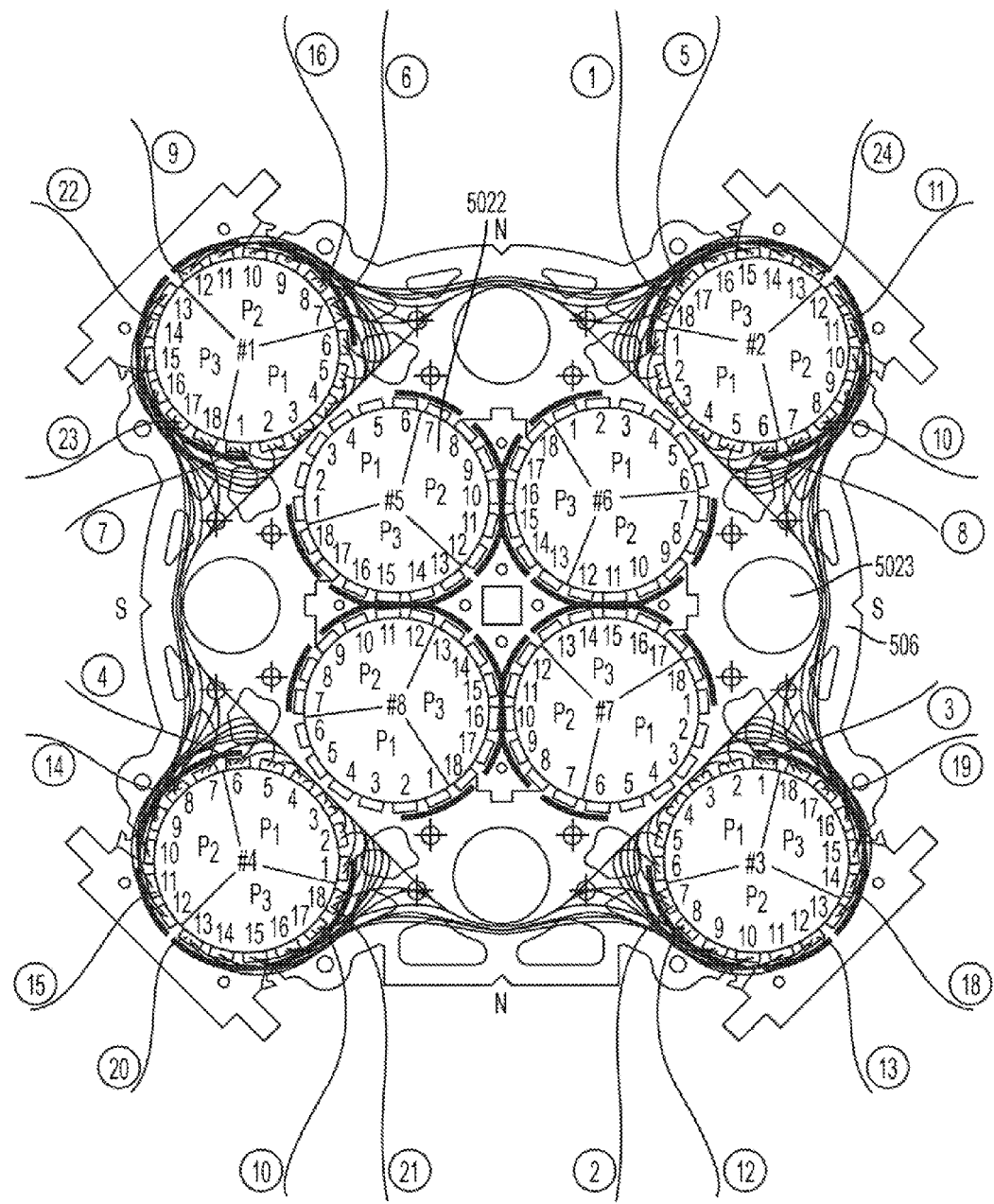
FIG. 57 is a diagram illustrating a cross-sectional view of an assembled stator laminate including representative outer stator windings and leads in one or more embodiments.

FIG. 57 is a view of the stator laminates of FIG. 55 and FIG. 56 with 3-phase winding in rotor cavities 5021. The windings are as is shown in FIG. 49, e.g. wound such that electromagnetic drag forces are cancelled by coils that are in the same sector but with current running in the opposite direction. In the illustrated 3-phase example, Phase 1 in and out leads include circled numbers—(1), (2), (3), (4), (5), (6), (7) and (8). Phase 2 in and out leads include circled numbers (9), (10), (11), (12), (13), (14), (15) and (16). Phase 3 in and out leads include circled numbers (17), (18), (19), (20), (21), (22), (23) and (24). An exemplary generator with the above described configuration may operate with a dipole rotor at 50 or 60 Hz and may be connected in series and/or in parallel.

Figure 58:
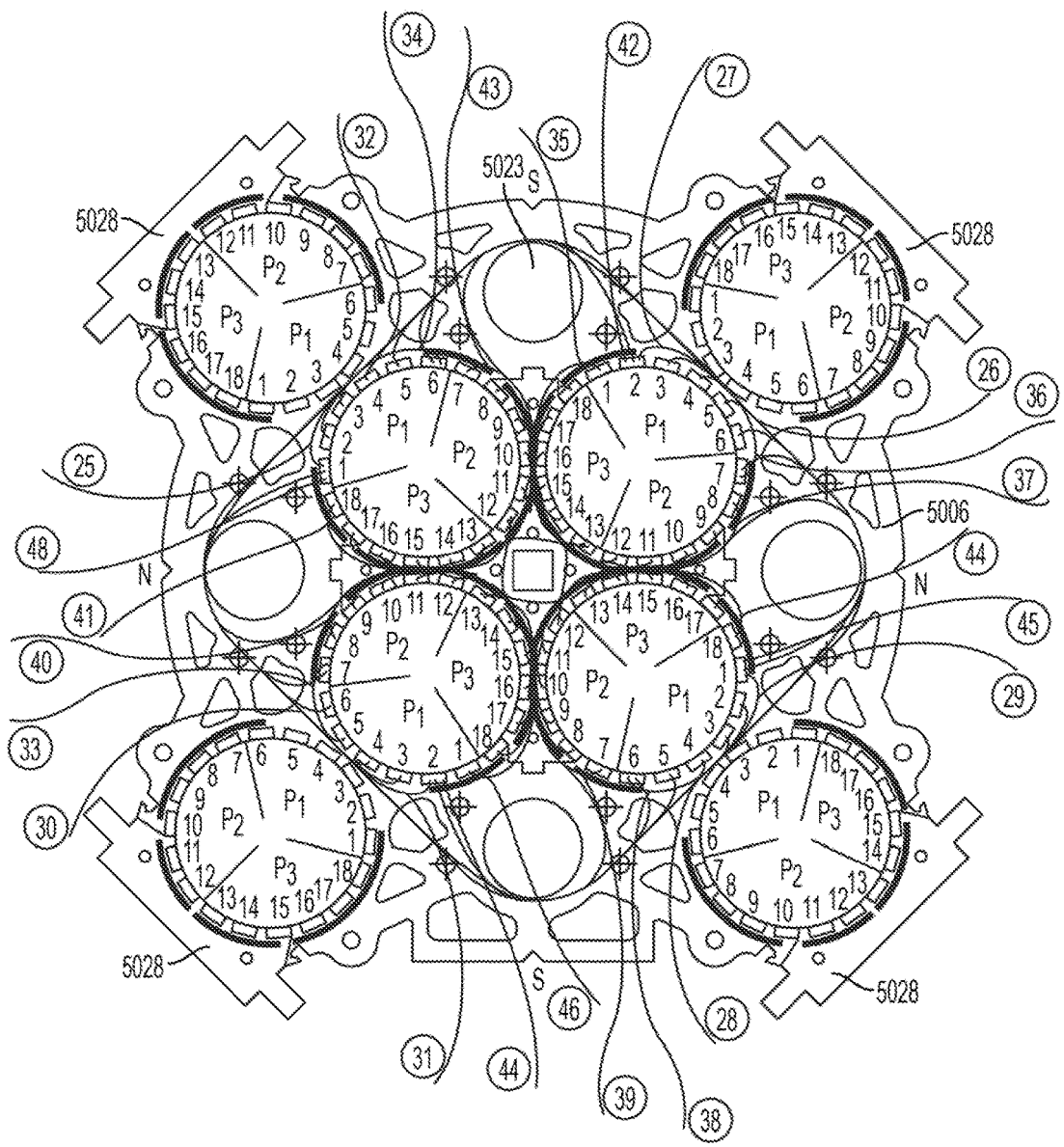
FIG. 58 is a diagram illustrating a cross-sectional view of an assembled stator laminate including inner stator section, main laminate and outer stator section, and representative inner stator windings and leads in one or more embodiments.

FIG. 58 is a view of the stator laminates of FIG. 12 and FIG. 13 with 3-phase windings in rotor cavities 5022. The windings are as is shown in FIG. 49, e.g. wound such that electromagnetic drag forces are cancelled by coils that are in the same sector but with current running in the opposite direction. This is a 3-phase winding. Phase 1 in and out leads include circled numbers—(25), (26), (27), (28), (29), (30), (31) and (32). Phase 2 in and out leads include circled numbers—(33), (34), (35), (36), (37), (38), (39) and (40). Phase 3 in and out leads include circled numbers—(41), (42), (43), (44), (45), (46), (47) and (48).

Figure 59:
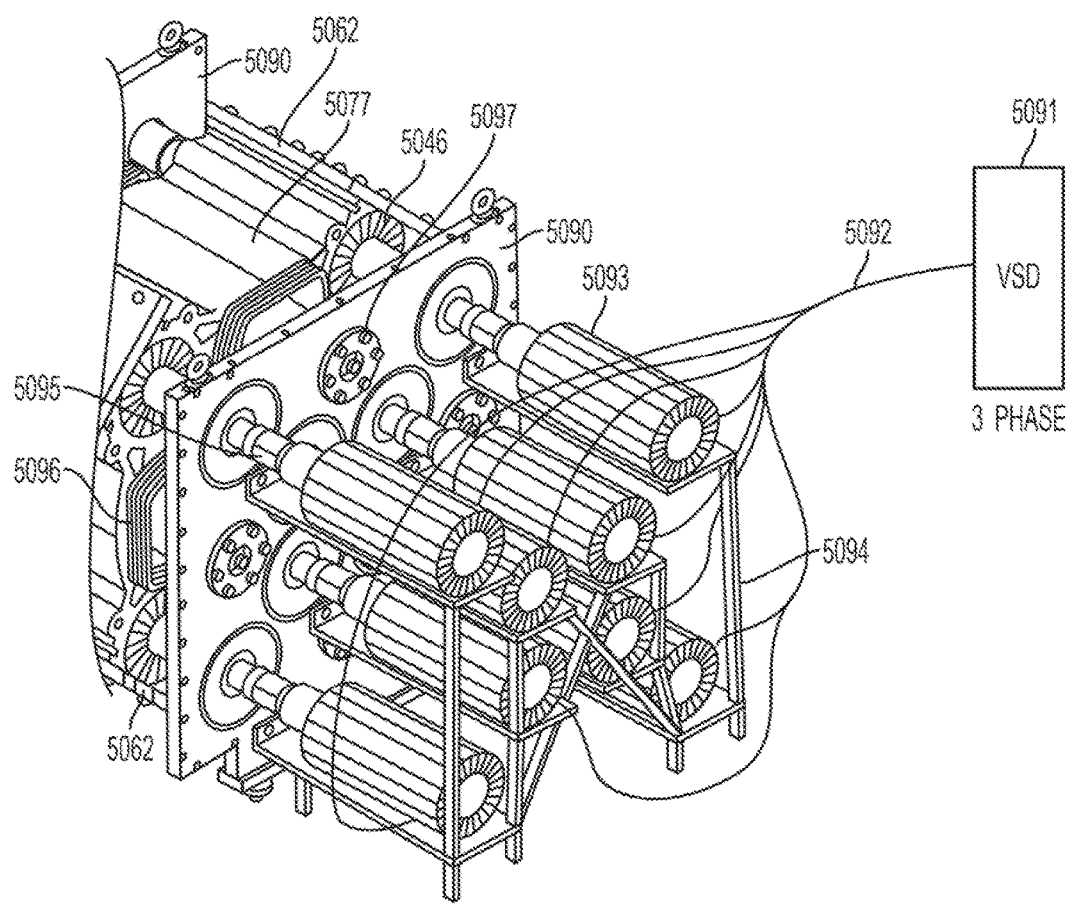
FIG. 59 is a diagram illustrating exemplary rotor sets operated by individual drive motors in synchronized operational control using a variable speed drive in one or more embodiments.

FIG. 59 is a depiction of the single rotor drive motors 5046 positioned on a support stand 5047 driven by a variable speed drive 5049 through cable 5048.

Figure 60:
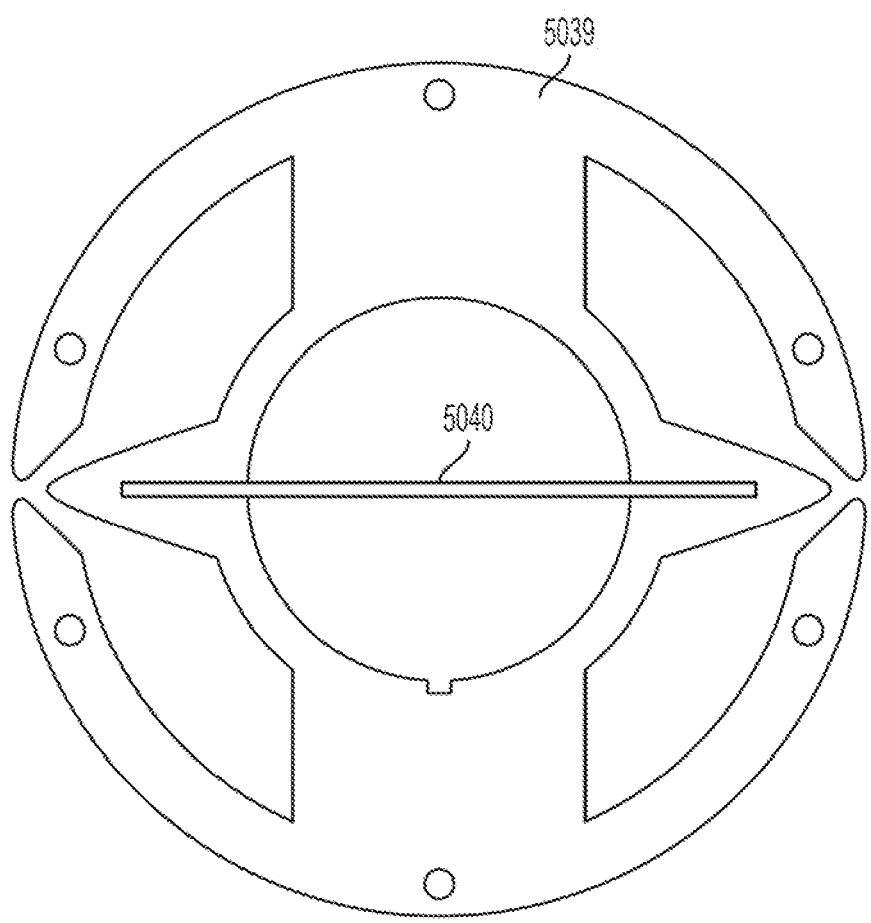
FIG. 60 is a diagram illustrating a cross-sectional view of a rotor laminate including a rotor laminate, a shaft cross-section and a mu metal shield in one or more embodiments.

FIG. 60 is a depiction of a laminate 5039 of a unipole/dipole rotor with mu metal shield slot 5040 which deflects the magnetic pole from either pole to avoid N/S cancelling effects when operated as a unipole.

Figure 61:
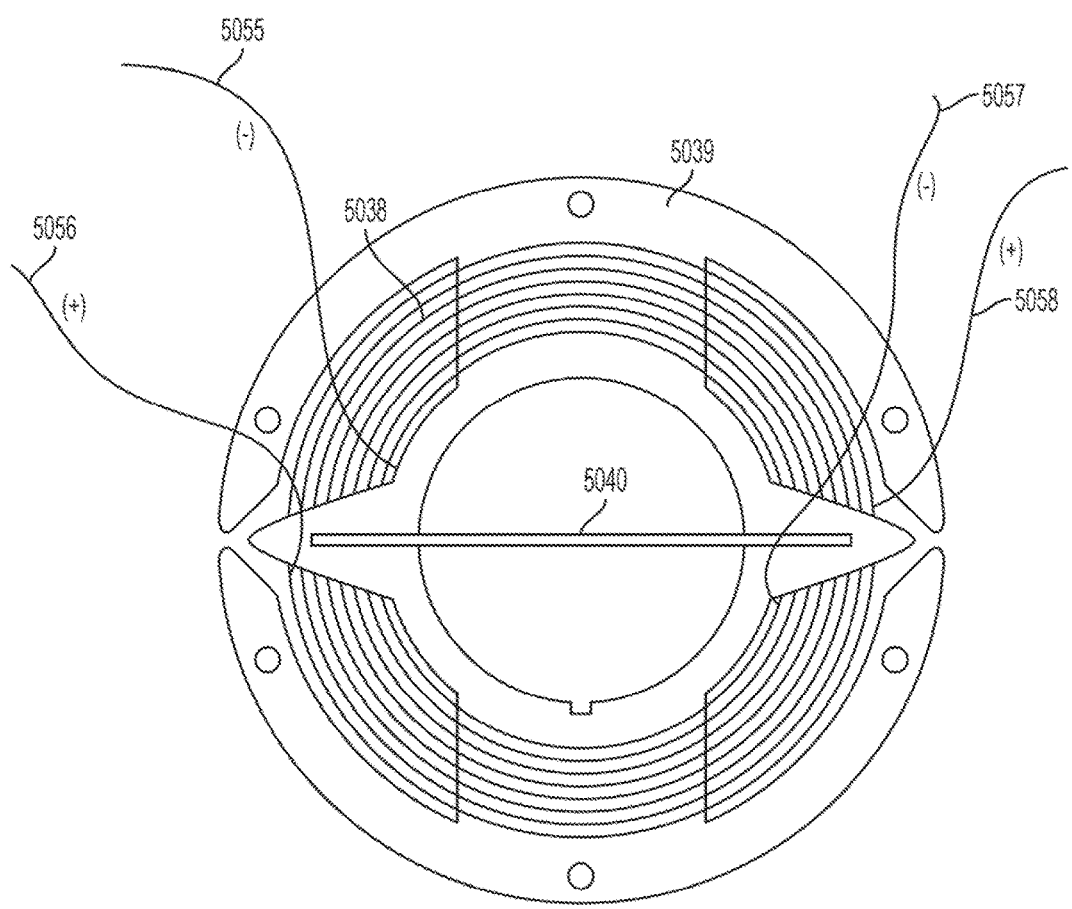
FIG. 61 is a diagram further illustrating a cross-sectional view of a rotor laminate including a rotor laminate, shaft cross-section, mu metal shield and a representative pole winding with leads in one or more embodiments.

FIG. 61 is a depiction of a laminate 5039 of a unipole/dipole rotors with winding 5038 and leads 5055, 5056, 5057, 5058 and Mu metal shield slot 5040.

Figure 62:
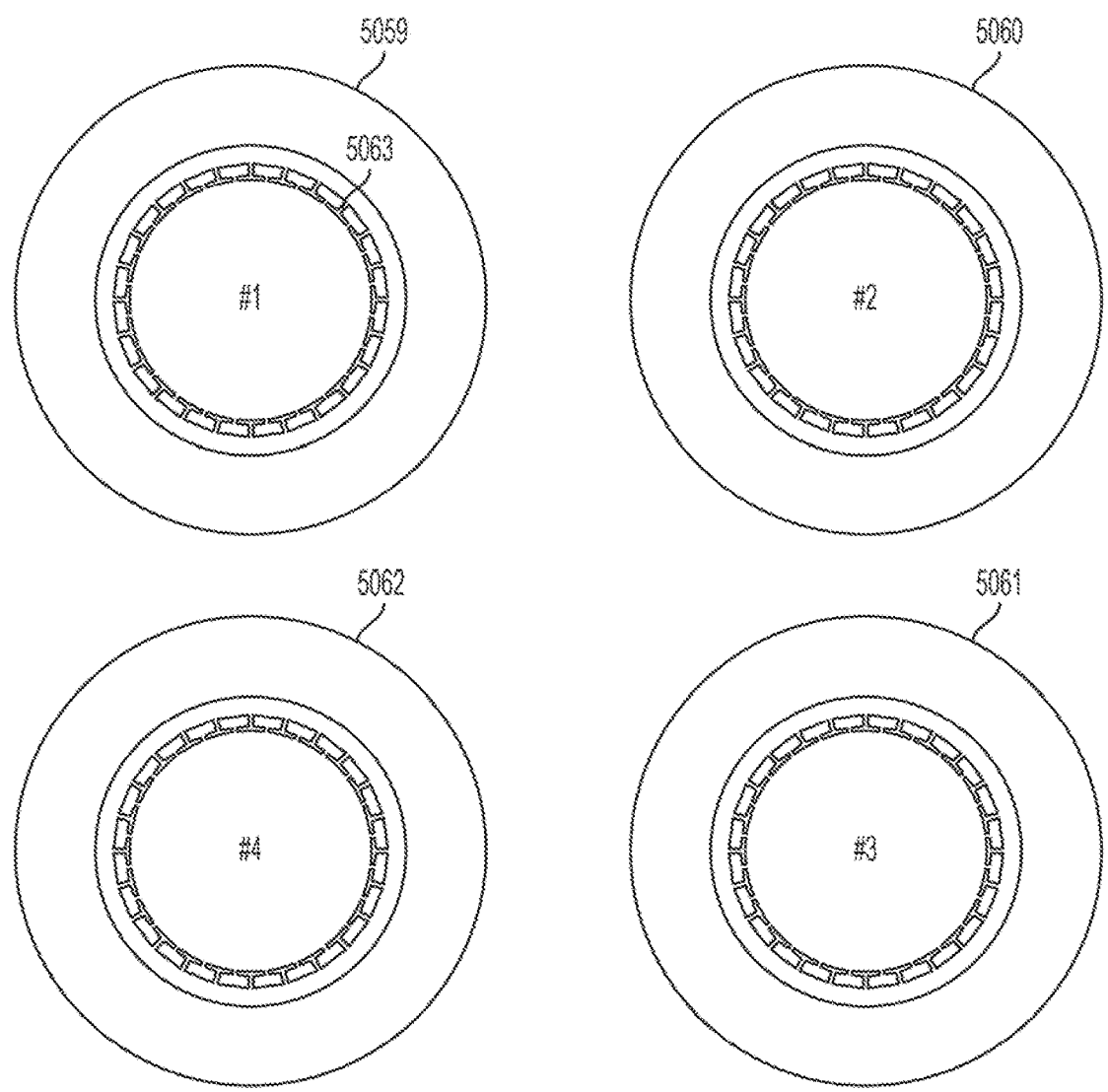
FIG. 62 is a diagram illustrating a cross-sectional view of rotor cavities in one or more embodiments.

FIG. 62 is a depiction of 4 standard stators 5059, 5060, 5061, and 5062 which may be retrofitted such that the windings 63 may be wound according to the above described teachings.

Figure 63:
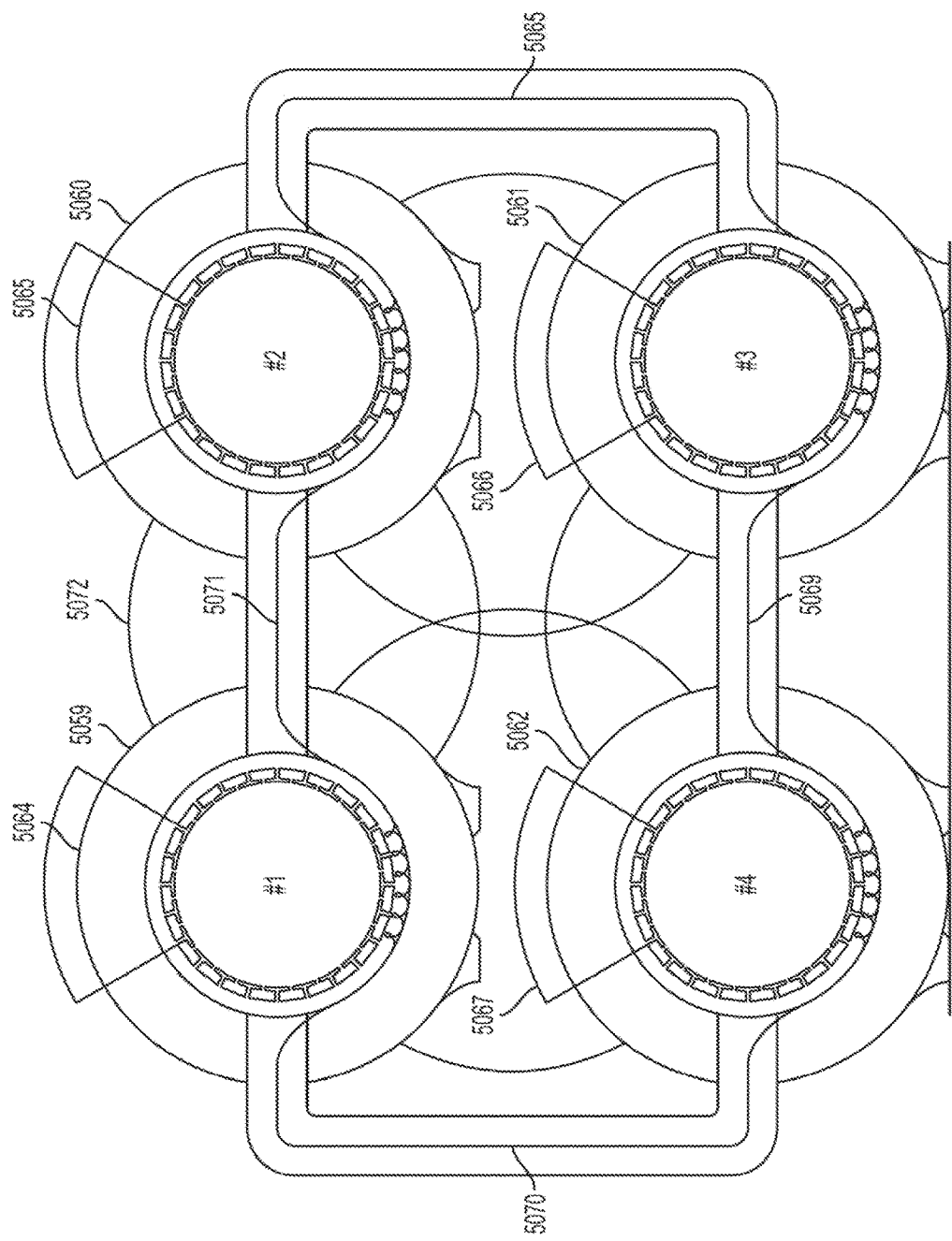
FIG. 63 is a diagram illustrating a cross-sectional view of rotor cavities contained in a support means in one or more embodiments.

FIG. 63 depicts a generator system for an exemplary commercial embodiment. The standard generator stators 5059, 5060, 5061, and 5062 of FIG. 62 may be retrofitted and supported by a support frame 72 composed of a lightweight material. The stators 5059, 5060, 5061, and 5062 may be connected by wire coil conduits 5068, 5069, 5070 and 5071, with similar conduits (not shown) on the opposite end to accommodate the backside of the coil loop. Removable segments 5064, 5065, 5066, and 5067 are removed to allow introduction of the coils during the winding process and are wound in the same manner as the stator in FIGS. 48, 49, 50, 51, and 57. While a coil associated with one of the coil phases is illustrated, it will be appreciated that coils for the remaining phases may also be wound and placed in the stators 5059, 5060, 5061, and 5062. After the phase windings are completed, connected, tied down, dipped and baked, rotors may be inserted and end bells may be attached. Individual driver motors, such as those shown in FIG. 59 may be attached to the end bells. Slip rings and brushes may be coupled to the shaft on the opposite ends of double shafts as part of the rotor excitation mechanism as shown in FIG. 64, which is a depiction of an assembly of standard stators in retrofit stage to be wound according to any of the above described teachings.

Figure 64:
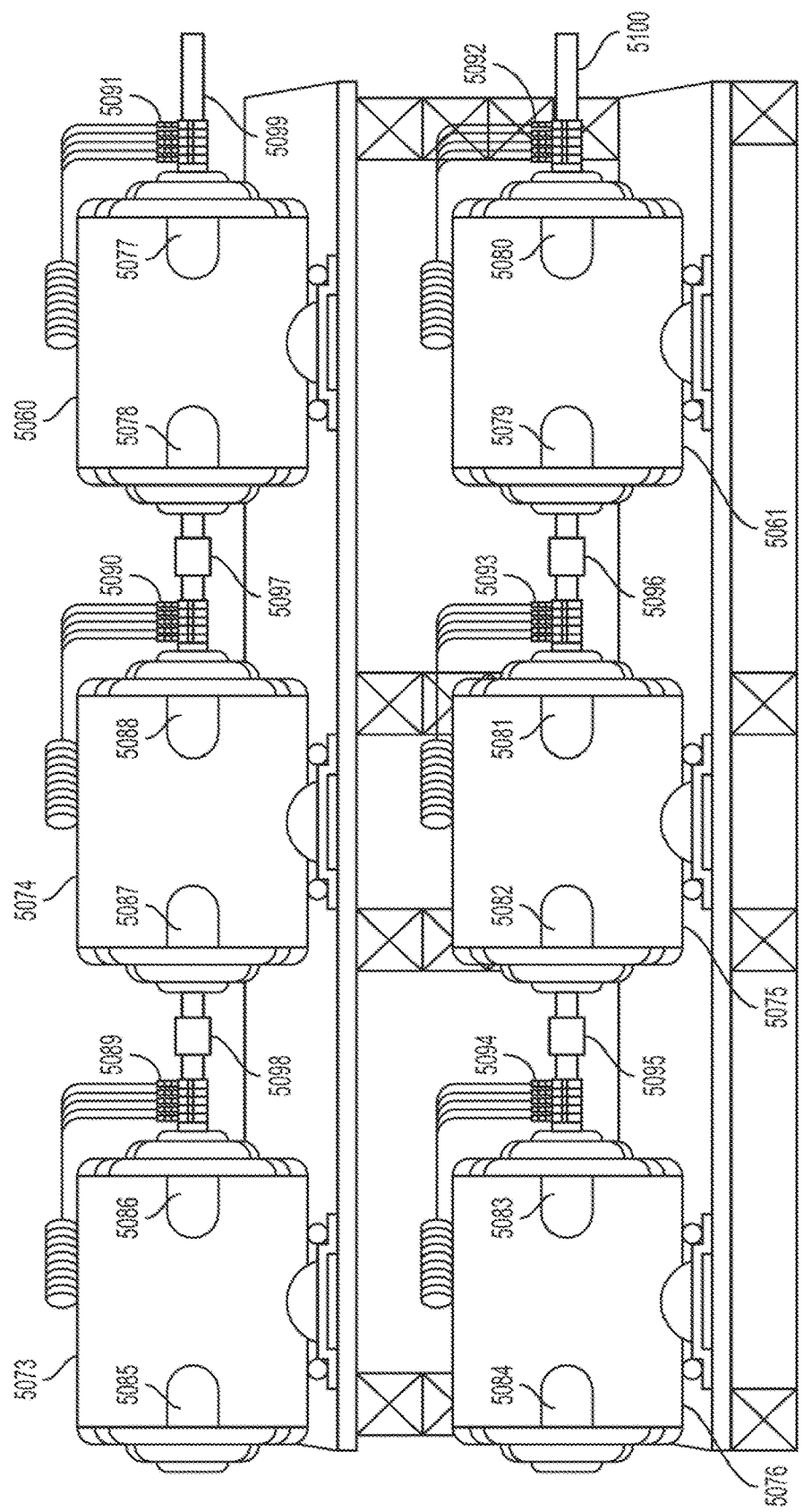
FIG. 64 is a diagram illustrating a side view of a longitudinal series of standard generator housings retrofitted in one or more embodiments.

FIG. 64 illustrates an embodiment whereby a number, such as 12, of retrofitted standard generator housings shown as stators 5060, 5061, 5073, 5074, 5075, and 5076 may be supported by a lightweight support structure. Conduit ports 5077, 5078, 5079, 5080, 5081, 5082, 5083, 5084, 5085, 5086, 5087 and 5088 are provided, which may accommodate wiring for winding coils and coil groups that passes between stators 5060, 5061, 5073, 5074, 5075, and 5076, and including those not shown. End bells may be used to support rotors and shafts. Spline couplings 5095, 5096, 5097 and 5098 connect the shafts between the individual units. Slip rings and brush mechanisms 5089, 5090, 5091, 5092, 5093 and 5095 may be utilized to carry an excitation current to the rotors windings. The illustrated embodiment may use unipole rotors, therefore each gang of four housings in a system with 12 retrofitted housings, will represent one phase of a 3-phase generator.

Figure 65:
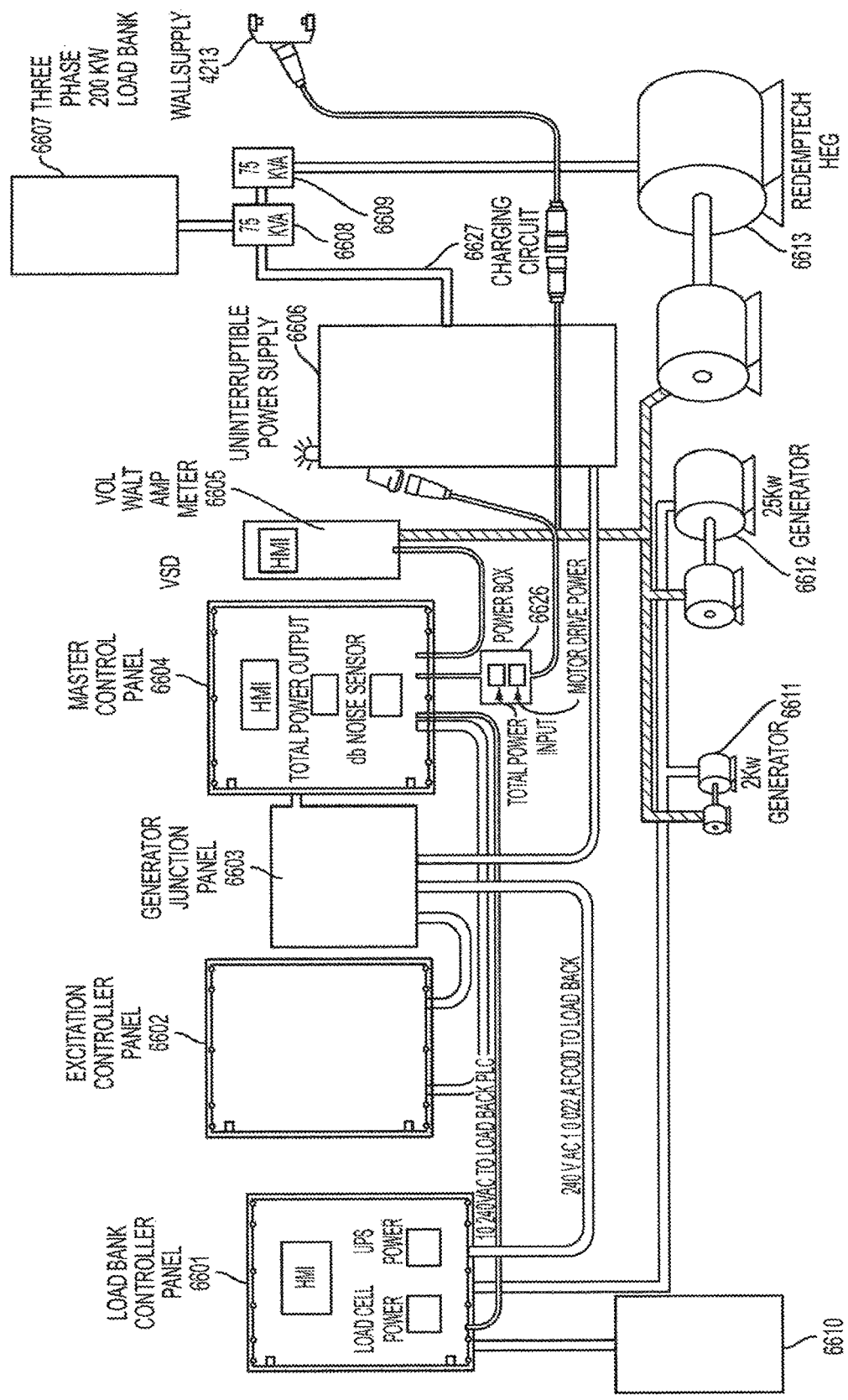
FIG. 65 is a schematic diagram illustrating a layout of an exemplary load testing system of an exemplary generator in one or more embodiments.

FIG. 65 represents the details of a layout for exercising a test protocol to certify operation as a stand-alone power plant and to compare to standard generators.

Figure 66:
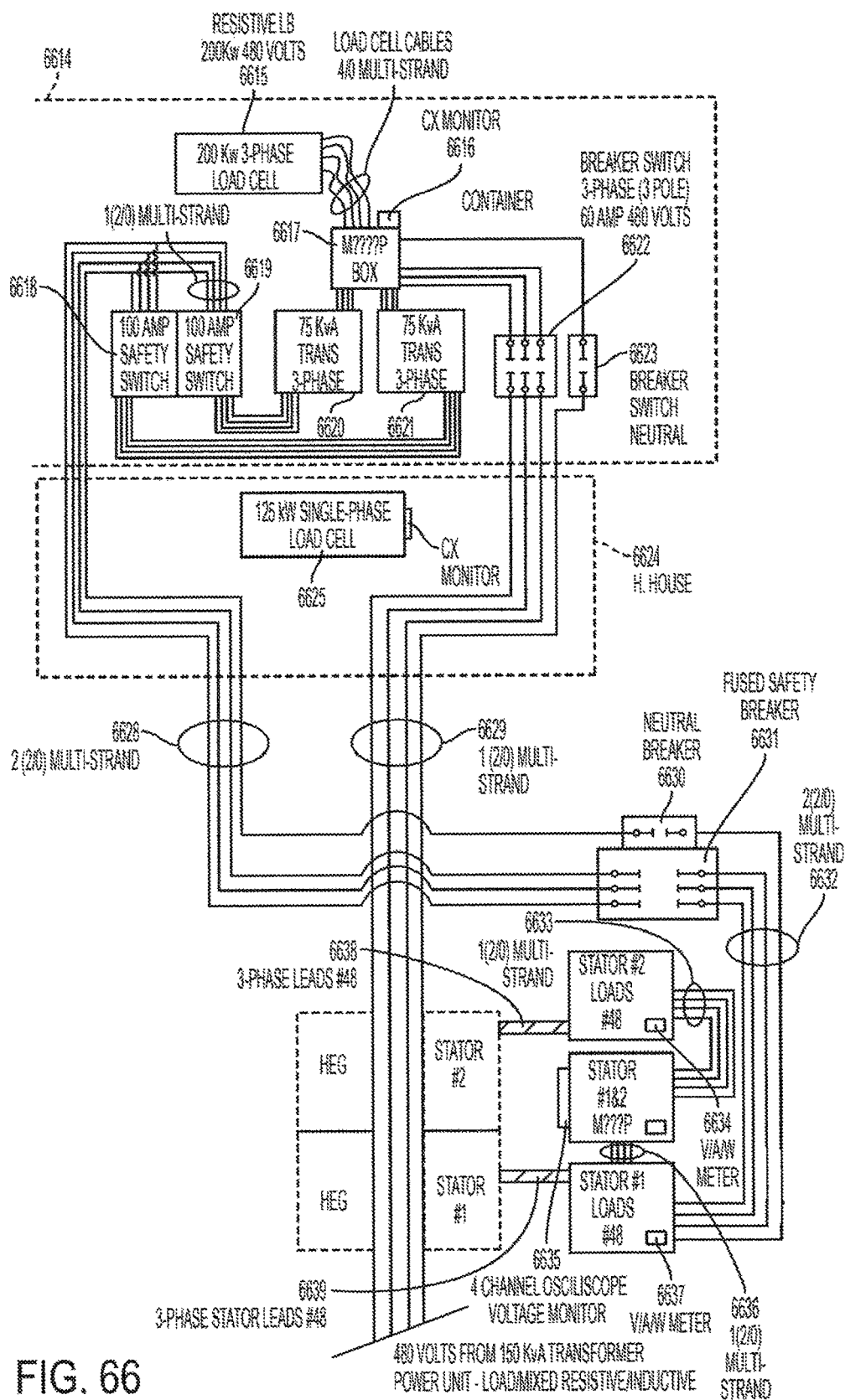
FIG. 66 is a schematic diagram illustrating a portion of electrical wiring of the load testing system of FIG. 65 in one or more embodiments.

FIG. 66 further illustrates the details of a layout for exercising a test protocol to certify operation as a stand-alone power plant and to compare to standard generators.

Figure 67:
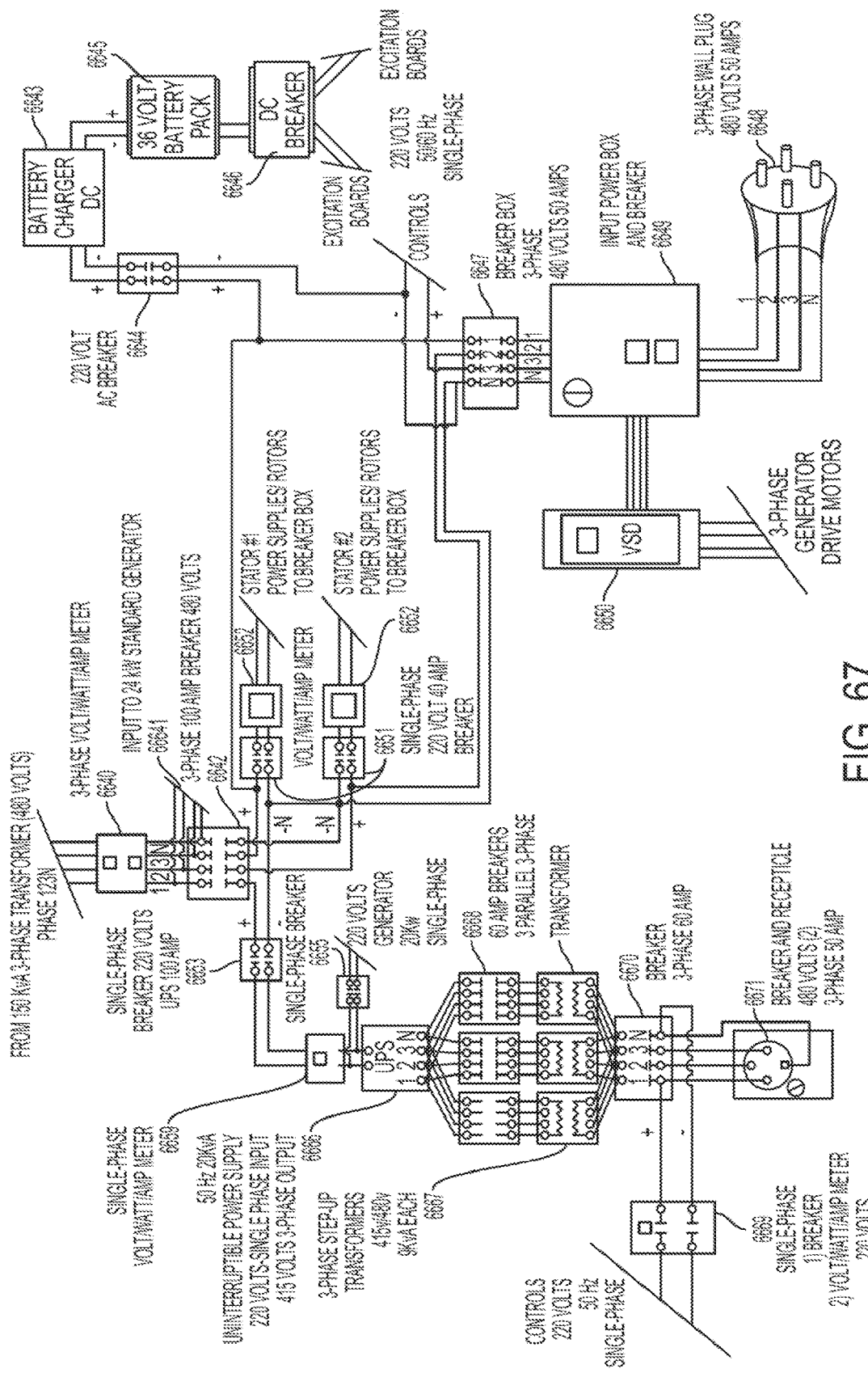
FIG. 67 is a schematic diagram illustrating a portion of the electrical wiring for a stand-alone power producing high efficiency generator in one or more embodiments.

FIG. 67 further illustrates the details of a layout for exercising a test protocol to certify operation as a stand-alone power plant and to compare to standard generators.

Figure 68:
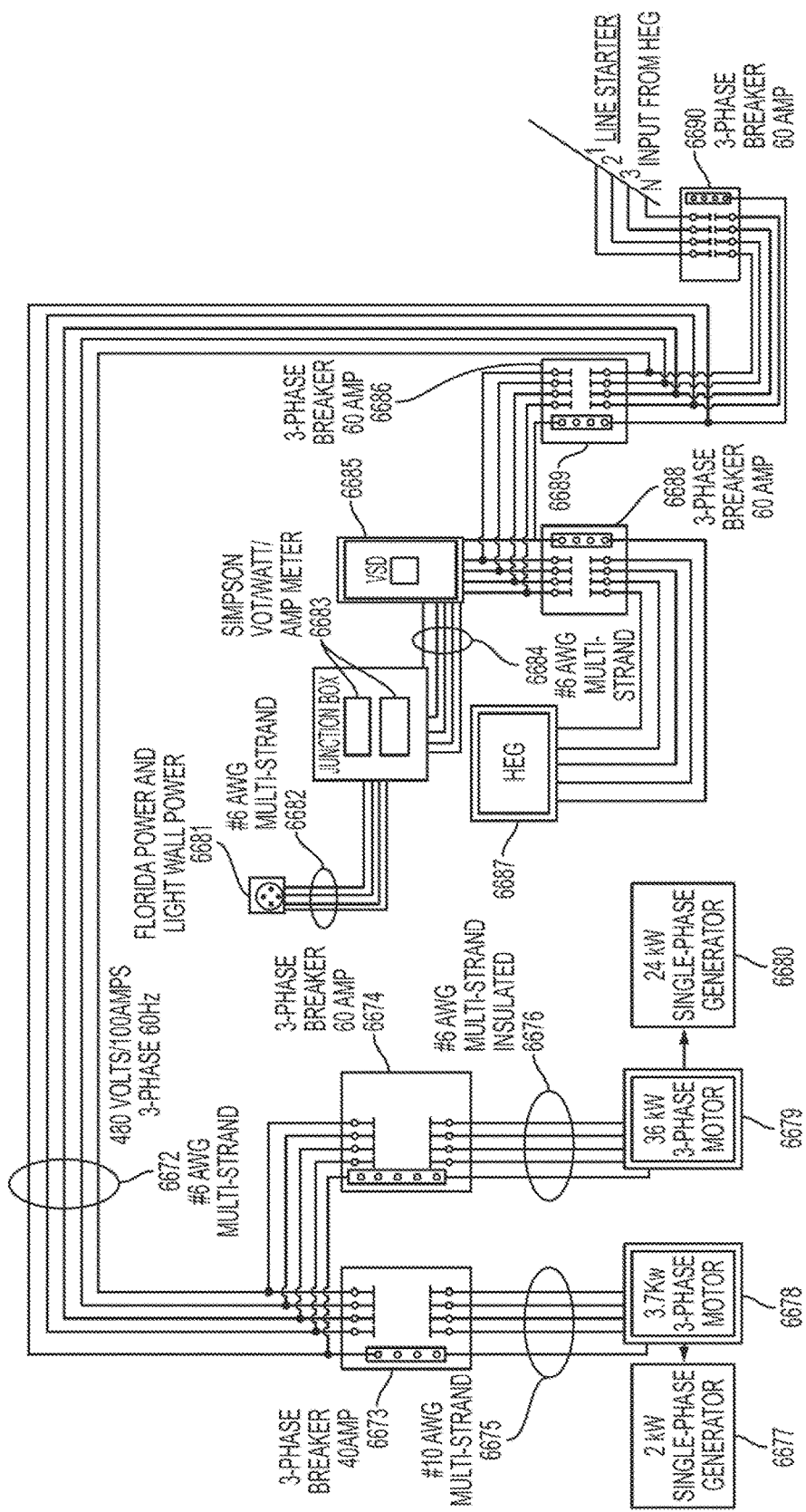
FIG. 68 is a schematic diagram illustrating exemplary input power supply wiring for two standard single-phase generators and a stand-alone high efficiency generator.

FIG. 68 further illustrates the details of a layout for exercising a test protocol to certify operation as a stand-alone power plant and to compare to standard generators.

Figure 69:
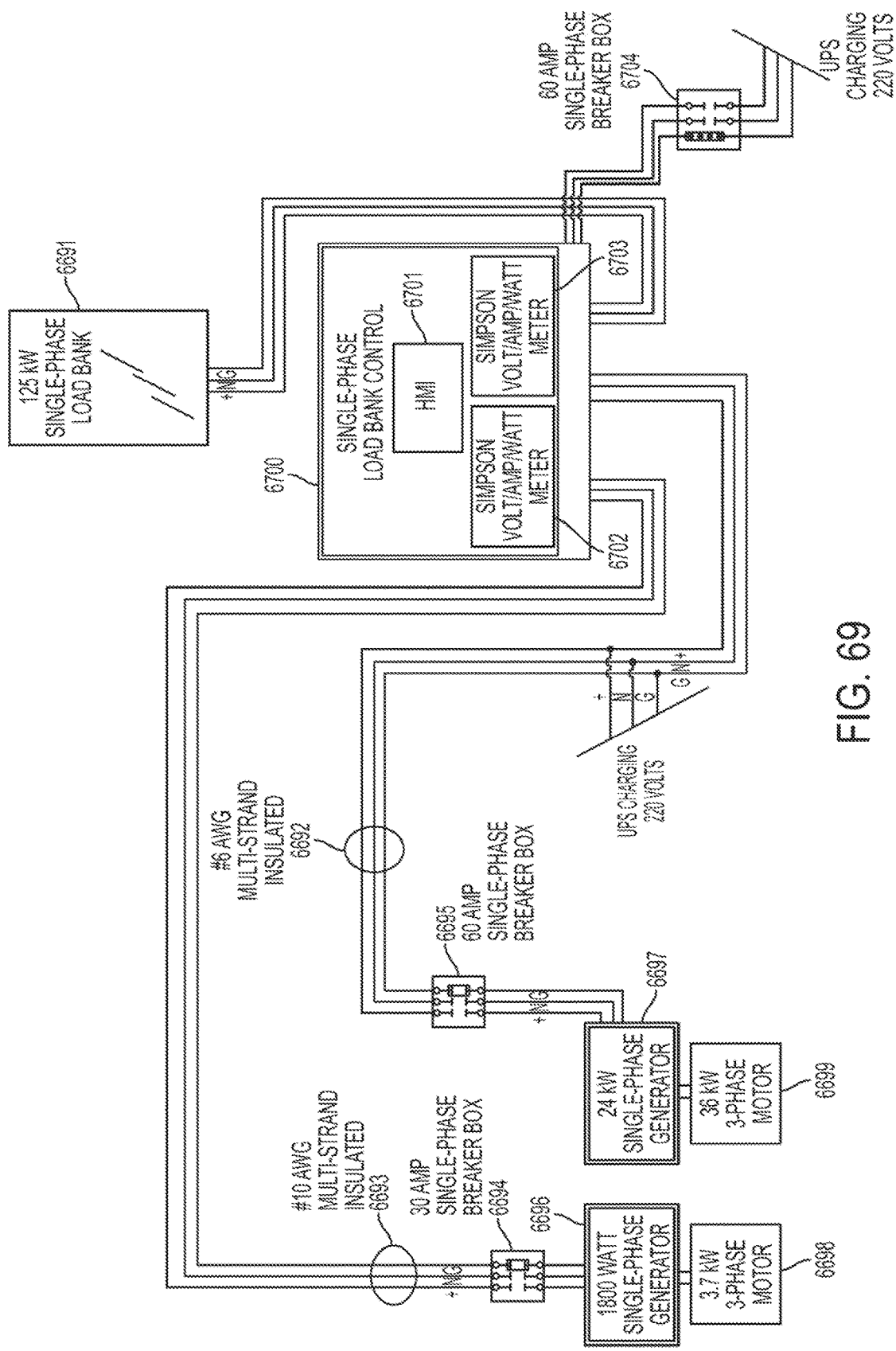
FIG. 69 is a schematic diagram illustrating exemplary output power wiring for two standard single-phase generators and a stand-alone high efficiency generator.

FIG. 69 further illustrates the details of a layout for exercising a test protocol to certify operation as a stand-alone power plant and to compare to standard generators.

What is claimed is:

1. A method of reducing electromagnetic drag in a variable speed electric motor unit the operating speed of which is capable of being varied, the variable speed electric motor comprising:
   a laminated stator having wire slots disposed around the inner periphery spaced into N equally spaced sectors separated by a pole iron support structure, the slots containing induction windings;
   a series of wound lateral pole irons arranged around the inner periphery of the stator, the first ends of the lateral pole irons extending into the slots spaced in the N sectors around the inner periphery of the stator;
   a support structure that supports the lateral pole irons, the support structure forming a circular opening concentric with the inner periphery of the stator, with the lateral pole irons second ends attached to the inner ring portion of the support structure and the second ends of the lateral pole irons are flush with the ring structure;
   a rotor inserted into the circular opening of the lateral pole iron support structure and supported at the stator lateral pole iron ends by a support means;
   a plurality of rotor inserts containing free-wheeling permanent magnet inserts, the plurality of rotor inserts spaced along an outer periphery of the rotor, the rotor inserted into the circular opening of the lateral pole iron support structure, the free-wheeling permanent magnet inserts inserted into cavities along the outer periphery of the rotor, the free-wheeling permanent magnet inserts having a pair of pole sections of a first magnetic polarity and a second magnetic polarity and free-wheeling electromagnetic pole stabilizing inserts; and electromagnetic rotor pole inserts inserted into cavities along the outer periphery of the rotor; and an activation circuit, the method comprising:

sequentially energizing the windings of the lateral pole irons in the N sectors, each of the N sectors being energized so as to provide a moving magnetic field to generate a torque applied to rotate the rotor, pole sections of the free-wheeling permanent magnet inserts rotating into alignment with ones of the second ends of the lateral pole irons to increase a flux linkage with the lateral pole irons and the corresponding one of the N sectors, the first ends of the lateral pole irons inducing a current flow in the stator induction windings of the corresponding one of the N sectors; and sequentially energizing one of a north pole or a south pole of the electromagnetic pole inserts in synchronization with the activation of the lateral pole irons.

2. The method of claim 1, wherein:

the stator includes a laminated steel stator, divided into an equal number of spaced slot sectors containing lateral pole irons supported by a support structure forming a circular opening concentric with the inner periphery of the stator, the slot sectors and the rotor sectors are spaced into N equally spaced sectors by radii emanating from a common center point on a common central longitudinal axis, the free-wheeling permanent magnet inserts are inserted into positions along the outer periphery of the rotor, the ratio of lateral pole irons to inserts is N: 1/N; forming N/2 groups of at least two of the N equally spaced sectors; and windings in each sector lateral pole iron windings in first ones of the sectors in the N/2 groups are wound such that the lateral pole irons of that first sector are all wound to have a first polarity and the lateral pole irons in the second ones of the sector are wound to have a second polarity, the polarity alternating in every other sector sequentially around the circumference.

3. The method of claim 1, wherein the rotor is constructed of non-ferrous material with equally spaced rotor slots which contain either free-wheeling permanent magnet poles with electromagnetic stabilizing inserts or electromagnetic pole inserts.

4. The method of claim 1, wherein the second ends of the lateral pole irons are energized in synchronization with the electromagnetic rotor pole inserts, the second ends of the lateral pole inserts are of the first polarity, the electromagnetic rotor pole inserts are of the second polarity.

5. The method of claim 1, wherein the second ends of the lateral pole iron are energized in synchronization with the free-wheeling permanent magnet pole stabilizing inserts wherein the second ends of the lateral pole inserts are of the first polarity, and the electromagnetic free-wheeling electromagnetic pole stabilizing inserts are of the second polarity.

6. The method of claim 1, wherein the slots of the lateral pole irons, the free-wheeling permanent magnet inserts, the electromagnetic free-wheeling permanent magnet pole stabilizing inserts, and the electromagnetic rotor pole inserts are axially aligned along a respective lengthwise axis thereof such that a lengthwise axis of the free-wheeling permanent inserts or the electromagnetic rotor pole inserts are in normal alignment with a depthwise axis of the slots and the lateral pole irons.

7. The method of claim 1, where the free-wheeling permanent magnet inserts are shielded within the rotor such that flux generated by the free-wheeling permanent magnet inserts is magnetically coupled directly into the second ends of the lateral pole irons so as to minimize flux leakage and magnetic drag.

8. The method of claim 1, wherein the electromagnetic rotor pole inserts and the electromagnetic free-wheeling permanent magnet pole stabilizing inserts are shielded within the rotor, such that flux generated the electromagnetic rotor pole inserts and the electromagnetic free-wheeling permanent magnet pole stabilizing inserts is magnetically coupled directly into the second ends of the lateral pole irons so as to minimize flux leakage and magnetic drag.

9. The method of claim 1, wherein the circular openings are arranged in lengthwise alignment with the slots and the lateral pole irons, the circular openings aligned with a longitudinal opening of the slots, to provide magnetic communication with the corresponding second ends of the lateral pole irons.

10. The method of claim 1, wherein the circular openings are aligned with a longitudinal opening of the slots, to provide magnetic communication with the corresponding second ends of the lateral pole irons.

11. The method of claim 1, wherein the sequentially energizing the windings of the lateral pole irons in the N sectors further comprises arranging at least the first ones of the free-wheeling permanent magnet inserts such that, as the torque is provided to rotate the rotor, alignment is maintained with the first ones in the sector of the second ends of the lateral pole irons such that, as the rotor rotates sequentially past the second ends of the lateral pole irons, a maximum flux density associated with the moving field is maintained so as to induce a maximum current flow in the induction windings and reduce a magnetic drag associated with the rotation.

12. The method of claim 1, wherein the wherein the sequentially energizing the windings of the lateral pole irons in the N sectors further comprises arranging the first ones of the electromagnetic pole inserts such that, as the torque is provided to rotate the rotor, alignment is maintained with the first ones in the sector of the second ends of the lateral pole irons such that, as the rotor rotates sequentially past the second ends of the lateral pole irons, a maximum flux density associated with the moving field is maintained so as to induce the maximum current flow in the induction windings and reduce a magnetic drag associated with the rotation.

13. The method of claim 1, wherein the activation circuit comprises a programmable logic unit coupled to a DC excitation circuit, and wherein:

sequentially energizing the windings of the lateral pole irons further comprises sequentially providing a first pulsed sequenced excitation current to the lateral pole irons in the N sectors with the DC excitation circuit such that first magnetic poles are sequentially excited therein, sequentially energizing one of a north pole era south pole of the electromagnetic pole inserts in synchronization with the activation of the lateral pole irons further comprises sequentially providing a second pulsed sequenced excitation current simultaneously with the sequentially energizing the windings of the lateral pole irons, to the electromagnetic pole inserts; and maintain the one of a north pole or a south pole of the electromagnetic pole inserts in each individual sector for a predetermined delay period, and switching polarity of the magnetic poles of the electromagnetic pole inserts after the electromagnetic pole inserts rotates into alignment with ones of the second ends of the lateral pole irons of the next sector.

14. The method of claim 1, wherein N is equal is 12.

15. The method of claim 1, wherein the rotor pole sections are formed of neodymium.

16. The method of claim 1, wherein the rotor pole sections are formed of samarium-cobalt.

17. The method of claim 1, wherein the rotor pole sections include wound steel electromagnets.

18. The method of claim 1, further comprising feeding back a portion of the power generated by the stator induction windings to the activation circuit and to at least partially power the induction windings of the variable speed electric motor unit.

19. An electromagnetic assembly for a variable speed electric motor and power cogeneration unit comprising:

a stator having a plurality of slots arranged on a stator periphery with an inner stator opening thereof;

a plurality of lateral pole irons coupled to the stator such that the first ends of the plurality of lateral pole irons are coupled to respective ones of the plurality of slots, the slots and lateral pole irons aligned along a lengthwise and depthwise axis, the plurality of lateral wound pole irons supported by a support structure that is positioned within the inner stator openings on a common central axis, the support structure having a support structure opening in the center thereof the lateral pole irons having windings and second ends directed toward the support structure openings;

a rotor positioned with the support structure opening, the rotor having a plurality of cavities on a rotor outer periphery, the rotor coupled to a central power shaft; and a plurality of free-wheeling permanent magnet inserts inserted into the cavities, each of the plurality of free-wheeling permanent magnet inserts having a pair of magnetic pole sections having a first magnetic polarity and a second magnetic polarity, each of the free-wheeling permanent magnet inserts, when in operation, rotating about a longitudinal axis, a magnetic polarity of the free-wheeling permanent magnet inserts being oriented and stabilized by a free-wheeling permanent magnet electromagnetic stabilizing insert;

wherein the windings of the plurality of lateral pole irons are wound sequentially to create, during operation, a moving field and torque on the rotor causing a rotation of the rotor and shaft, the free-wheeling permanent magnetic inserts rotating into alignment with the second ends of the energized ones of the lateral pole irons, the free-wheeling permanent magnet inserts maintaining alignment with lateral pole iron during rotation so as to provide maximum flux density in the lateral pole iron and the induction windings in a corresponding one of the plurality of slots to induce a current flow therein;

wherein the windings of the plurality of lateral pole irons are sequentially energized to create a moving field and a torque on the rotor causing a rotation of the rotor and shaft, the electromagnetic pole inserts rotating into alignment with the second ends of energized ones of the lateral pole irons, the electromagnetic pole inserts maintaining alignment with the second ends of the energized ones of the lateral pole irons as the rotor and field rotates so as to provide maximum flux density in the wound lateral pole irons and the induction windings in a corresponding one of the plurality of slots to induce a current flow therein.

20. The electromagnetic assembly of claim 19 wherein the stator, the support structure and the rotor are divided into N equally spaced sectors by radii emanating from a common center point on a common central longitudinal axis.

21. The electromagnetic assembly of claim 20 wherein N is equal to 12.

22. The electromagnetic assembly of claim 19, further comprising an activation circuit coupled to the windings of the lateral pole irons, the activation circuit applying pulsed DC current from a solid state activation system in which the rate of the repetitive sequential pulses is varied so as to vary a rotational speed of said electromagnetic assembly.

23. The electromagnetic assembly of claim 19, further comprising an activation circuit coupled to the windings of the electromagnetic pole inserts, the activation circuit configured so as to control a direction of current flow and a timing so as to generate alternating DC pulses alternating north-south pole direction every other pulse and in timing sequence with the lateral pole irons.

24. The electromagnetic assembly of claim 19, further comprising an activation circuit coupled to the windings of a free-wheeling permanent magnet electromagnetic stabilizing insert, a direction of current flow and a timing of the activation circuit controlled so as to supply DC pulses which alternate north-south pole directions every other pulse and in timing sequence with the lateral pole irons.

25. The electromagnetic assembly of claim 19, wherein each of the plurality of lateral pole irons are disposed respectively above each of the plurality of the slots such that the induction coil windings disposed in the plurality of slots are exposed to a concentrated amount of magnetic flux generated when the windings of the lateral pole irons are energized sequentially and repetitively for each pole sector and the magnetic circuit is completed with the magnetic rotor poles.

26. The electromagnetic assembly of claim 19, wherein the plurality of free-wheeling permanent magnet inserts, during operation, rotate in synchronized relation with the magnetic field such that when the windings of the free-wheeling permanent magnet electromagnetic stabilizing inserts and the lateral pole irons are sequentially energized, the free-wheeling permanent magnet inserts are rotated into alignment with the second ends of the lateral pole irons so as to provide torque and maximum flux density in the induction windings to induce current flow therein and to reduce magnetic drag on the rotor by said synchronized sequencing of the rotor pulses and the lateral pole irons.

27. The electromagnetic assembly of claim 19, wherein the plurality of electromagnetic rotor pole inserts, during operation, rotate in synchronized relation with the magnetic field such that when the windings of the lateral pole irons are sequentially energized, the electromagnetic rotor poles rotate into alignment with the second ends of the lateral pole irons so as to provide torque and maximum flux density into the induction windings, to induce current flow therein, and to reduce magnetic drag on the rotor.

28. The electromagnetic assembly of claim 19, wherein each of the rotor cavities has an opening that, during operation, is positioned adjacent to the second ends of the lateral pole irons.

29. The electromagnetic assembly of claim 19, wherein each of the plurality of free-wheeling permanent magnet inserts is contained within a containment sleeve that contains a magnetic flux associated with the permanent magnet inserts.

30. The electromagnetic assembly of claim 29, wherein the containment shielding sleeve is made from alternating layers of mu metal and carbon or other steel.

31. The electromagnetic assembly of claim 19, wherein each of the stator and the support structure has substantially a circular shape.

32. The electromagnetic assembly of claim 19, wherein each of the plurality of free-wheeling permanent magnet inserts is contained within a containment sleeve having one or more bearings to support rotation of the free-wheeling permanent magnet insert.

33. The electromagnetic assembly of claim 19, wherein the rotor pole sections are formed from neodymium.

34. The electromagnetic assembly of claim 19, wherein the rotor pole sections are formed from samarium-cobalt.

* * * * *